United States Patent
Kudrynski et al.

(10) Patent No.: US 11,274,928 B2
(45) Date of Patent: Mar. 15, 2022

(54) METHODS AND SYSTEMS FOR GENERATING AND USING LOCALIZATION REFERENCE DATA

(71) Applicant: TomTom Global Content B.V., Amsterdam (NL)

(72) Inventors: Krzysztof Kudrynski, Amsterdam (NL); Krzysztof Miksa, Amsterdam (NL); Rafal Jan Gliszczynski, Amsterdam (NL); Blazej Kubiak, Amsterdam (NL)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 244 days.

(21) Appl. No.: 15/743,550

(22) PCT Filed: Aug. 3, 2016

(86) PCT No.: PCT/EP2016/068595
§ 371 (c)(1),
(2) Date: Jan. 10, 2018

(87) PCT Pub. No.: WO2017/021475
PCT Pub. Date: Feb. 9, 2017

(65) Prior Publication Data
US 2018/0209796 A1    Jul. 26, 2018

Related U.S. Application Data

(60) Provisional application No. 62/218,538, filed on Sep. 14, 2015, provisional application No. 62/200,613,
(Continued)

(51) Int. Cl.
*G01C 21/30*    (2006.01)
*G06F 16/29*    (2019.01)
(Continued)

(52) U.S. Cl.
CPC ............. *G01C 21/30* (2013.01); *G01C 21/28* (2013.01); *G01C 21/32* (2013.01); *G01C 21/367* (2013.01);
(Continued)

(58) Field of Classification Search
CPC ...... G01C 21/30; G01C 21/28; G01C 21/367; G01S 13/865; G01S 13/867; G01S 13/89;
(Continued)

(56) References Cited

U.S. PATENT DOCUMENTS 4,700,307 A    10/1987    Mons et al.
5,684,695 A    11/1997    Bauer
(Continued)

FOREIGN PATENT DOCUMENTS

CN    101641610 A    2/2010
CN    101952688 A    1/2011
(Continued)

OTHER PUBLICATIONS

Barth A., Siegemund J., and J. Schwehr, 2013: Fast and Precise Localization at Stop Intersections, in Proc. of the IEEE Intelligent Vehicles Symposium, 2013, pp. 75-80.
(Continued)

*Primary Examiner* — Behrang Badii
*Assistant Examiner* — Daniel L Greene
(74) *Attorney, Agent, or Firm* — Park, Vaughan, Fleming & Dowler LLP

(57) ABSTRACT

Methods and systems for improved positioning accuracy relative to a digital map are disclosed, and which are preferably used for highly and fully automated driving applications, and which may use localisation reference data associated with a digital map. The invention further extends
(Continued)

to methods and systems for the generation of localisation reference data associated with a digital map.

14 Claims, 29 Drawing Sheets

Related U.S. Application Data filed on Aug. 3, 2015, provisional application No. 62/200,611, filed on Aug. 3, 2015.

(51) Int. Cl.

| | |
|---|---|
| G01S 17/89 | (2020.01) |
| G01S 13/89 | (2006.01) |
| G01C 21/28 | (2006.01) |
| G01S 13/86 | (2006.01) |
| G06T 7/50 | (2017.01) |
| G01C 21/36 | (2006.01) |
| G06T 7/55 | (2017.01) |
| G06T 7/521 | (2017.01) |
| G01C 21/32 | (2006.01) |
| G06K 9/00 | (2006.01) |
| G06T 7/73 | (2017.01) |
| G01C 21/34 | (2006.01) |

(52) U.S. Cl.
CPC .......... *G01S 13/865* (2013.01); *G01S 13/867* (2013.01); *G01S 13/89* (2013.01); *G01S 17/89* (2013.01); *G06F 16/29* (2019.01); *G06K 9/00798* (2013.01); *G06T 7/50* (2017.01); *G06T 7/521* (2017.01); *G06T 7/55* (2017.01); *G06T 7/74* (2017.01); *G01C 21/3415* (2013.01); *G06T 2207/10028* (2013.01); *G06T 2207/30248* (2013.01); *G06T 2207/30252* (2013.01)

(58) Field of Classification Search
CPC ... G01S 17/89; G06T 7/55; G06T 7/74; G06T 7/50; G06T 7/521; G06F 16/29; G06K 9/00798
See application file for complete search history.

(56) References Cited

U.S. PATENT DOCUMENTS

| | | | |
|---|---|---|---|
| 5,893,043 A | 4/1999 | Moehlenbrink et al. | |
| 5,961,571 A | 10/1999 | Gorr et al. | |
| 6,047,234 A | 4/2000 | Cherveny et al. | |
| 6,138,062 A | 10/2000 | Usami | |
| 6,233,361 B1 | 5/2001 | Downs | |
| 6,266,442 B1 | 7/2001 | Laumeyer et al. | |
| 6,292,721 B1* | 9/2001 | Conner | G01C 5/005 340/970 |
| 6,363,161 B2 | 3/2002 | Laumeyer et al. | |
| 6,449,384 B2 | 9/2002 | Laumeyer et al. | |
| 6,453,056 B2 | 9/2002 | Laumeyer et al. | |
| 6,453,223 B1 | 9/2002 | Kelly | |
| 6,516,267 B1 | 2/2003 | Cherveny et al. | |
| 6,526,352 B1 | 2/2003 | Breed | |
| 6,608,913 B1 | 8/2003 | Hinton | |
| 6,625,315 B2 | 9/2003 | Laumeyer et al. | |
| 6,671,615 B1 | 12/2003 | Becker et al. | |
| 6,728,608 B2 | 4/2004 | Ollis | |
| 6,745,123 B1 | 6/2004 | Petzold et al. | |
| 6,836,724 B2 | 12/2004 | Becker et al. | |
| 6,847,887 B1 | 1/2005 | Casino | |
| 6,847,906 B2 | 1/2005 | Ozawa | |
| 6,856,897 B1 | 2/2005 | Phuyal et al. | |
| 6,990,407 B1 | 1/2006 | Mbekeani et al. | |
| 7,035,733 B1 | 4/2006 | Alwar et al. | |
| 7,050,903 B1 | 4/2006 | Shutter et al. | |
| 7,085,637 B2 | 8/2006 | Breed et al. | |
| 7,092,548 B2 | 8/2006 | Laumeyer et al. | |
| 7,096,115 B1 | 8/2006 | Groth et al. | |
| 7,098,909 B2 | 8/2006 | Hayano | |
| 7,139,659 B2 | 11/2006 | Mbekeani et al. | |
| 7,251,558 B1 | 7/2007 | McGrath | |
| 7,269,503 B2 | 9/2007 | McGrath | |
| 7,307,513 B2 | 12/2007 | Shutter et al. | |
| 7,392,151 B2 | 6/2008 | Makela | |
| 7,398,154 B2 | 7/2008 | Phuyal et al. | |
| 7,418,346 B2 | 8/2008 | Breed et al. | |
| 7,433,889 B1 | 10/2008 | Barton | |
| 7,444,003 B2 | 10/2008 | Laumeyer et al. | |
| 8,244,457 B2 | 8/2012 | Milark | |
| 8,301,374 B2 | 10/2012 | Surampudi | |
| 8,588,471 B2 | 11/2013 | Hsieh | |
| 8,630,805 B2 | 1/2014 | Becker | |
| 8,996,172 B2* | 3/2015 | Shah | G01S 7/4813 356/3.1 |
| 9,140,792 B2 | 9/2015 | Zeng | |
| 9,194,949 B2 | 11/2015 | Becker | |
| 9,652,031 B1* | 5/2017 | Savastinuk | G06F 3/012 |
| 2003/0128182 A1* | 7/2003 | Donath | B60R 1/00 345/156 |
| 2003/0214502 A1* | 11/2003 | Park | G06T 17/005 345/420 |
| 2004/0041805 A1 | 3/2004 | Hayano | |
| 2004/0138817 A1 | 7/2004 | Zoken et al. | |
| 2005/0060069 A1 | 3/2005 | Breed et al. | |
| 2005/0089212 A1* | 4/2005 | Mashitani | H04N 13/398 382/154 |
| 2005/0149251 A1 | 7/2005 | Donath et al. | |
| 2006/0023197 A1* | 2/2006 | Joel | G03B 35/24 355/77 |
| 2007/0021915 A1 | 1/2007 | Breed et al. | |
| 2007/0055441 A1 | 3/2007 | Retierath et al. | |
| 2007/0219720 A1 | 9/2007 | Trepagnier et al. | |
| 2008/0243374 A1 | 10/2008 | Hatazawa | |
| 2008/0247670 A1* | 10/2008 | Tam | H04N 13/257 382/298 |
| 2009/0086022 A1 | 4/2009 | Finn et al. | |
| 2009/0153652 A1* | 6/2009 | Barenbrug | H04N 13/122 348/54 |
| 2009/0228204 A1 | 9/2009 | Zavoli | |
| 2010/0183192 A1 | 7/2010 | Fritsch et al. | |
| 2010/0232639 A1* | 9/2010 | Ibrahim | G01S 5/163 382/100 |
| 2010/0323793 A1* | 12/2010 | Andall | H04S 7/303 463/35 |
| 2011/0054791 A1 | 3/2011 | Surampudi | |
| 2011/0109745 A1 | 5/2011 | Nakatani | |
| 2011/0178610 A1 | 7/2011 | O'Connor et al. | |
| 2011/0255741 A1 | 10/2011 | Jung et al. | |
| 2011/0293137 A1 | 12/2011 | Gurman et al. | |
| 2012/0044241 A1 | 2/2012 | Chen et al. | |
| 2012/0310516 A1 | 12/2012 | Zeng | |
| 2013/0103298 A1 | 4/2013 | Becker | |
| 2013/0121562 A1 | 5/2013 | Barnum | |
| 2013/0135435 A1 | 5/2013 | D'Amato et al. | |
| 2013/0155058 A1 | 6/2013 | Golparvar-Fard et al. | |
| 2014/0028678 A1 | 1/2014 | Chmielewski et al. | |
| 2014/0118716 A1 | 5/2014 | Kaganovich | |
| 2014/0379254 A1 | 12/2014 | Miksa et al. | |
| 2015/0261184 A1 | 9/2015 | Mannion et al. | |
| 2015/0378359 A1* | 12/2015 | Bonefas | A01D 43/087 701/41 |
| 2016/0035140 A1* | 2/2016 | Bickerstaff | A63F 13/26 345/633 |

FOREIGN PATENT DOCUMENTS

| | | |
|---|---|---|
| CN | 102918358 A | 2/2013 |
| DE | 10202756 A1 | 7/2003 |
| DE | 102005008185 A1 | 8/2006 |
| DE | 102004055069 B4 | 2/2007 |
| DE | 102009009047 | 8/2010 |
| EP | 1734341 A1 | 12/2006 |
| EP | 2034271 A1 | 3/2009 |

(56) References Cited

FOREIGN PATENT DOCUMENTS

| EP | 2372309 | A2 | 10/2011 |
|---|---|---|---|
| JP | 2008076252 | A | 4/2008 |
| WO | 0148683 | A1 | 7/2001 |
| WO | 02097195 | A2 | 12/2002 |
| WO | 2006132522 | A1 | 12/2006 |
| WO | 2007011522 | A2 | 1/2007 |
| WO | 2007148546 | A1 | 12/2007 |
| WO | 2008002126 | A1 | 1/2008 |
| WO | 2008003272 | A1 | 1/2008 |
| WO | 20080118578 | A2 | 10/2008 |
| WO | 2008150153 | A1 | 12/2008 |
| WO | 20090098154 | A1 | 8/2009 |
| WO | 20110023246 | A1 | 3/2011 |
| WO | 2012089263 | | 7/2012 |

OTHER PUBLICATIONS

Brenner C., 2010: Vehicle localization using landmarks obtained by a LIDAR mobile mapping system, Proceedings of the ISPRS Commission III Symposium on Photogrammetric Computer Vision and Image Analysis, Paris, pp. 139-144.

Hofman S., Schulze M.J., Sester M., and C. Brenner, 2011: Quality Assessment of landmark based positioning using stereo cameras, in Stilla U. et al. PIA11—International Archives of Photogrammetry, Remote Sensing and Spatial Information Sciences, pp. 85-90.

Schindler, A. 2013: Vehicle Self-localization with High-Precision Digital Maps, in Proc of the IEEE Intelligent Vehicles Symposium 2013, pp. 141-146.

Schubert R., Schlingelhof M., Cramer H. and G. Wanielik, 2007: Accurate Positioning for Vehicular Safety Applications—The SAFESPOT Approach, Vehicular Technology Conference, 2007. VTC2007-Spring. IEEE 65th, pp. 2506-2510.

U.S. Appl. No. 61/236,547 to Velde et al., as published by WIPO on Mar. 3, 2011, 104 pages.

McCarthy, P.L. et al., "Shaft or Decline? An Economic Comparison", Open Pit to Underground: Making the Transition, AIG Bulletin 14, 1993, pp. 45-56.

Weiß, Gerhard, "Keeping track of position and orientation of moving indoor systems by correlation of range-finder scans", Proceedings of the IEEE/RSJ/GI International Conference on Intelligent Robots and Systems '94. 'Advanced Robotic Systems and the Real World', I ROS '94, Sep. 12-16, 1994, vol. 1, pp. 595-601.

"Use cases, functional specifications and safety margin applications for the SAFESPOT Project," SP8-HOLA-SP Horizontal Activities, SAFESPOT Cooperative Systems for Roadway Safety, pp. 1-54.

National Highway Traffic Safety Administration,"Cooperative Intersection Collision Avoidance System Limited to Stop Sign and Traffic Signal Violations," Midterm Phase I Report, May 2006-Apr. 2007, Oct. 2008, pp. 1-41, DOT HS 811 048.

Cooperative Intersection Collision Avoidance System—Stop Sign Assist (CICAS-SSA), Concept of Operations, Version 1.0, Mar. 18, 2008, pp. 1-34.

International search report for international application No. PCT/EP2016/068595 dated Nov. 4, 2016.

* cited by examiner

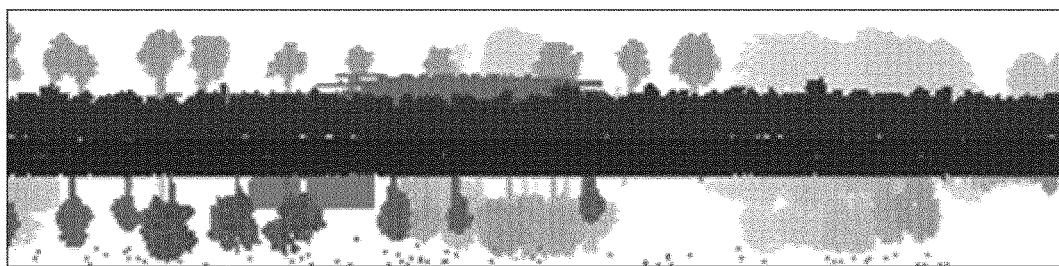
Figure 14A
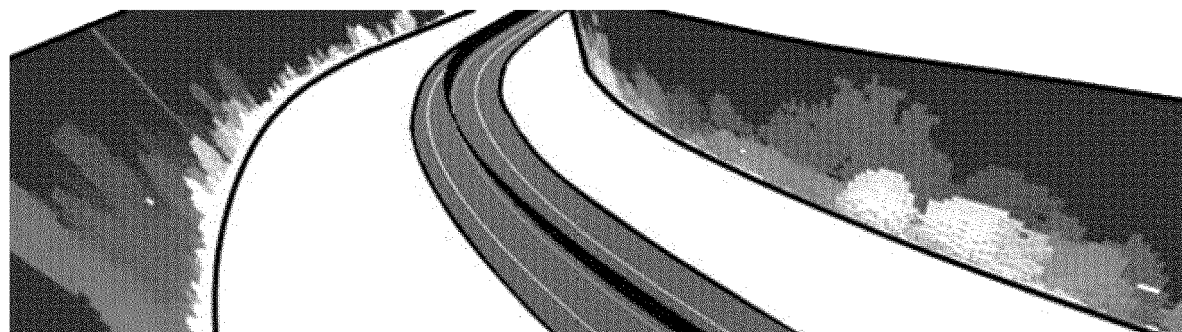
Figure 14B
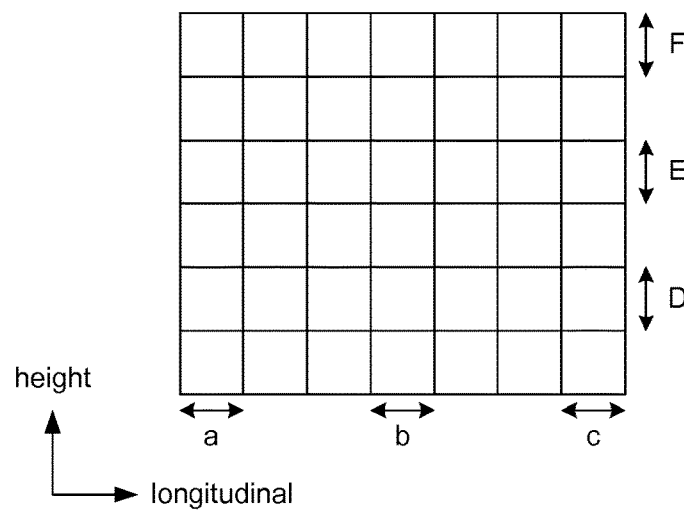
Figure 15A
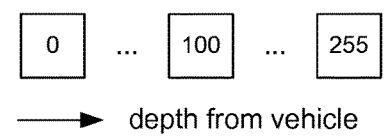
depth from vehicle

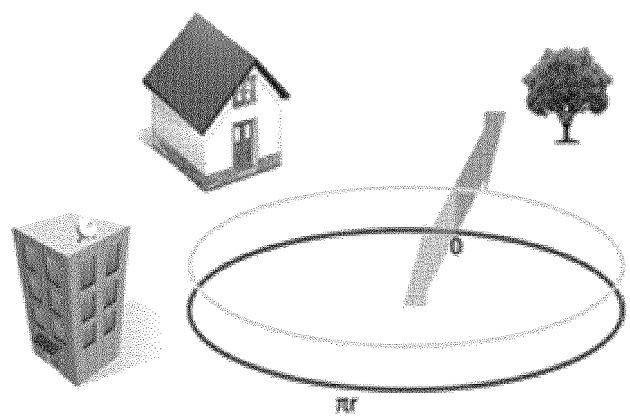
Figure 19A
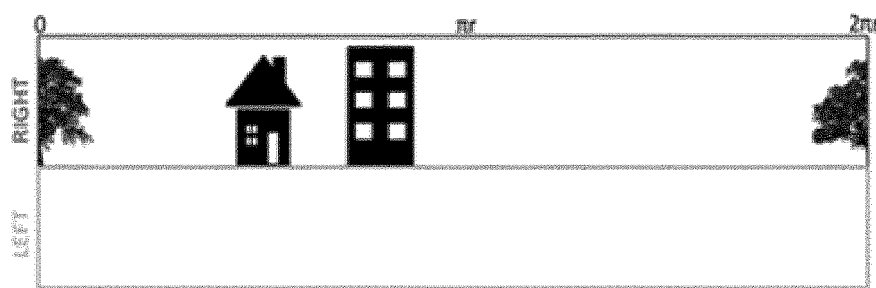
Figure 19B
Figure 20A
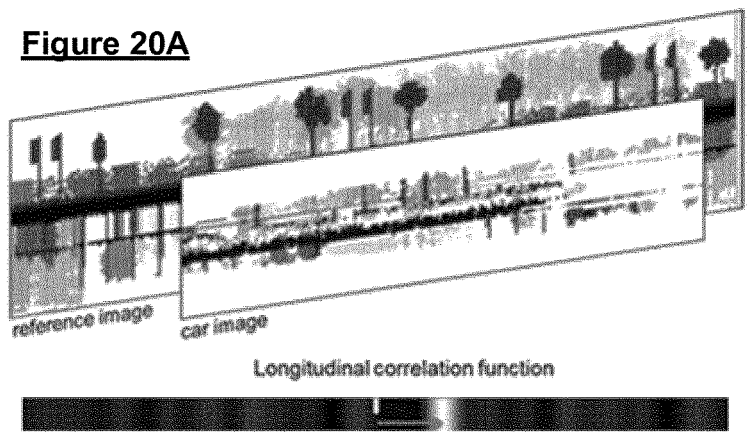
Figure 20C
Figure 20B
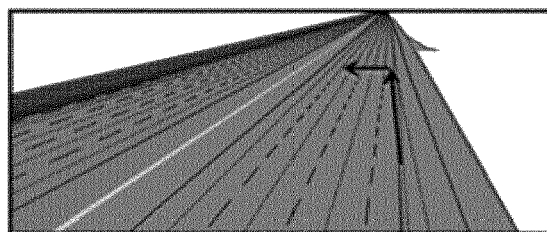
Figure 20D

Repeat
1) Move step toward maximum longitudinal correlation (and recompute depth map)
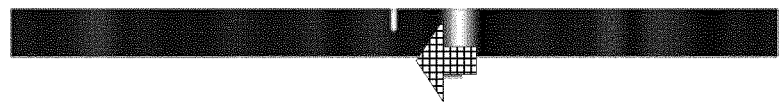
2) Move step toward 0 mean lateral offset (and recompute depth map)
3) Step rotation against indicated skew between images (and recompute depth map)
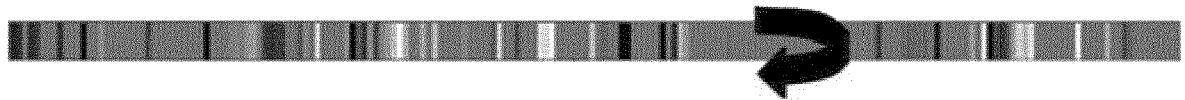
Until
Figure 23A

Example use case 1

Approach 1:
Create depth maps from the laser point cloud as seen by the car and correlate it with the reference data Approach 2:
Laser point cloud as seen by the car is correlated with the laser point cloud reconstruction from the reference data

Example use case 2

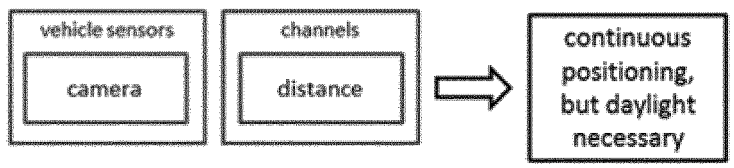

Figure 26A

Approach 1:
Disparity 3D model is built from the vehicles's stereovision cameras and it is correlated with the laser point cloud reconstruction from the reference data

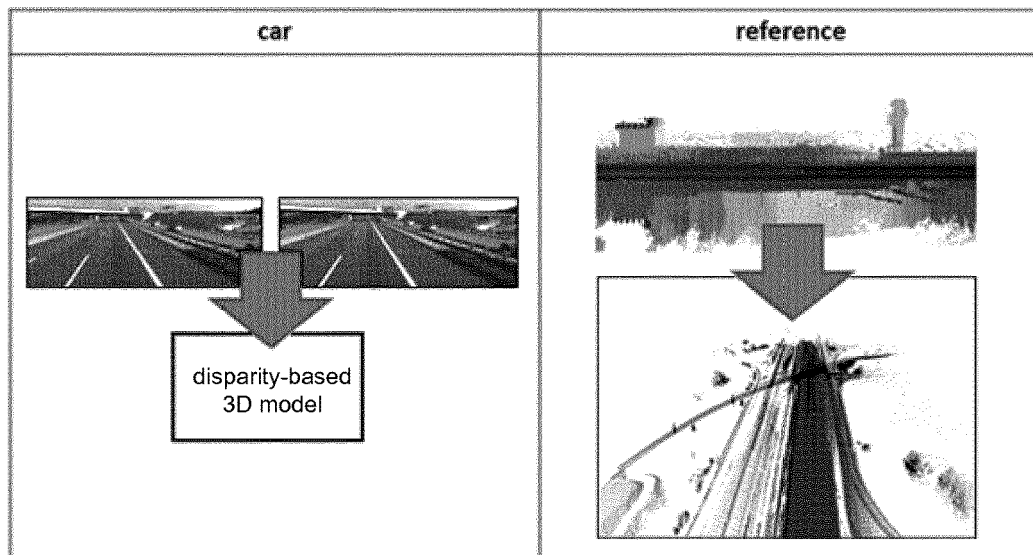

Figure 26B

Approach 2:
Using "Structure from Motion" technique a sequence of images from vehicle camera are used to reconstruct a 3D scene and correlate it with a 3D reconstrucion of the reference data

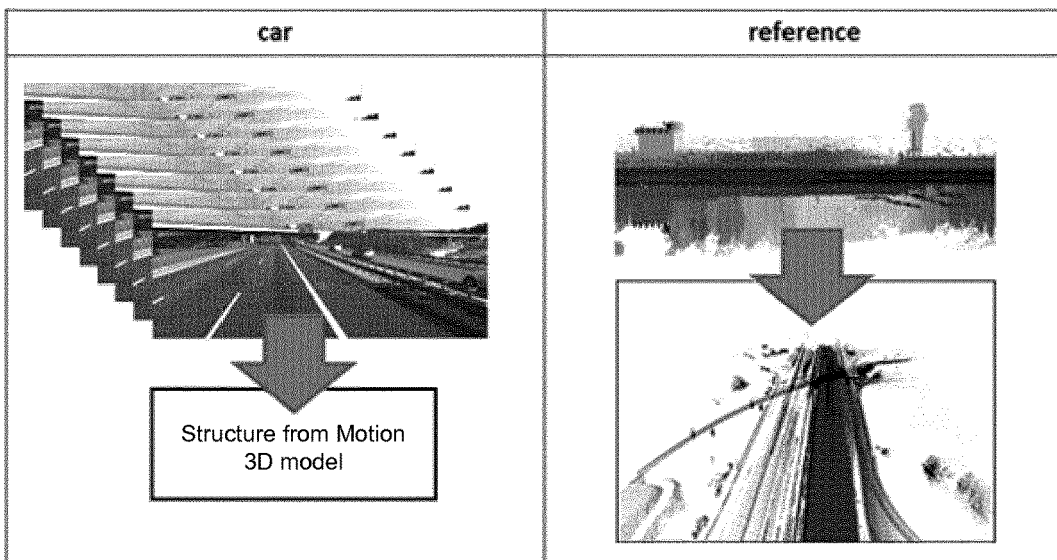

Figure 26C

Approach 3:
Reference data is used to reconstruct a 3D scene and create a reconstruction of the view from the camera perspective. The modelled views are used to find the best fit to the actual camera

Example use case 3

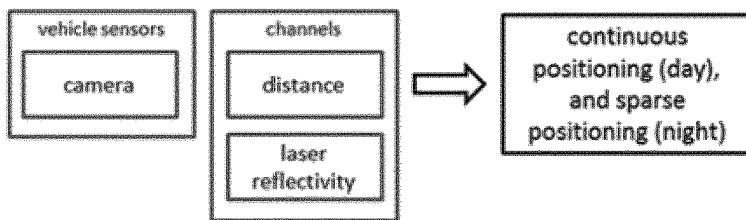

Figure 27A

Approach 1:
Using "Structure from Motion" technique a sequence of images from car camera are used to reconstruct a 3D scene and correlate it with a 3D reconstrucion of reference data. Reflective surfaces make the solution work without daylight.

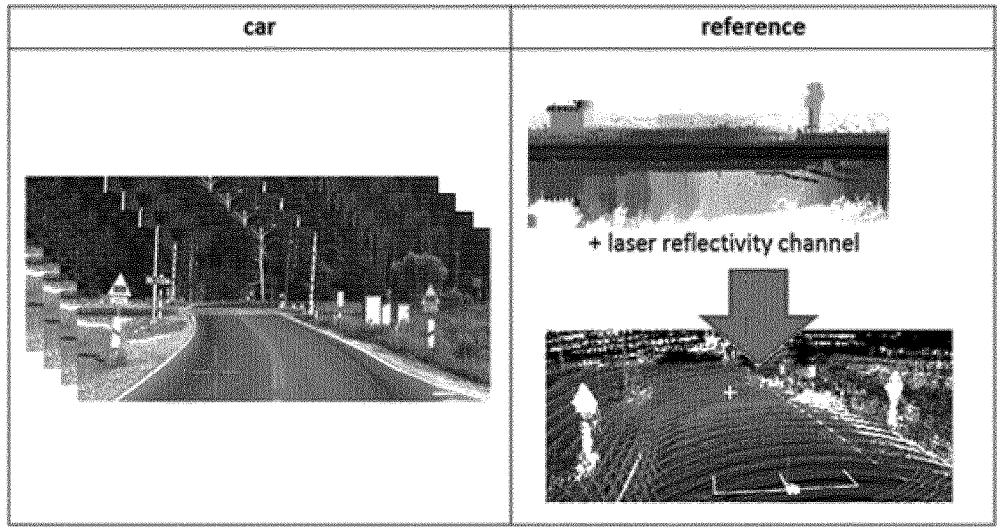

Figure 27B

Approach 2:
Reference data is used to reconstruct a 3D scene and create a reconstruction of the view from the camera perspective. The modelled views are used to find the best fit to the actual camera. Reflectivity channel and non-perpendicualar projection means that solution can work during night.

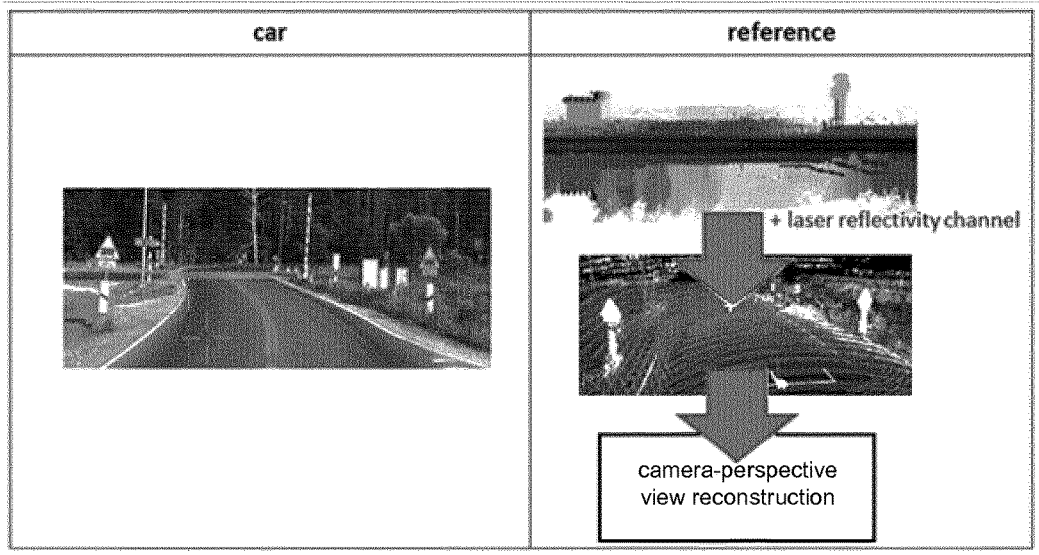

Figure 27C

Example use case 4

Approach 1:
Reference data is used to reconstruct a 3D scene and the radar reflectivity channel is used to leave only the radar-reflective points, which is then correlated with the radar point cloud as seen by the car.

Variant 1: Correction by image correlation
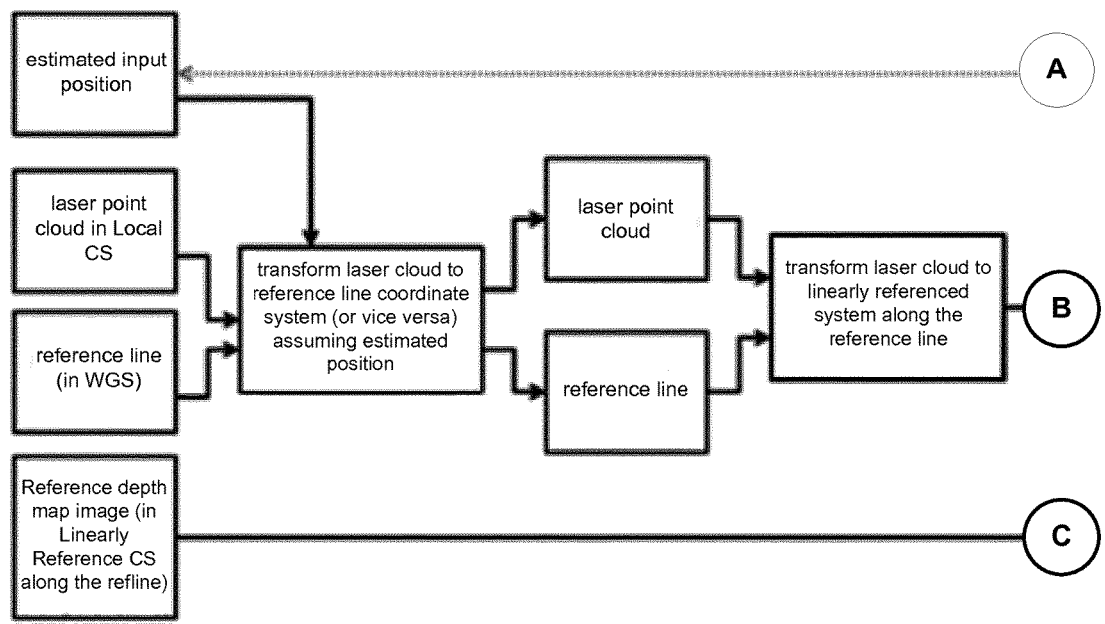
Figure 32A
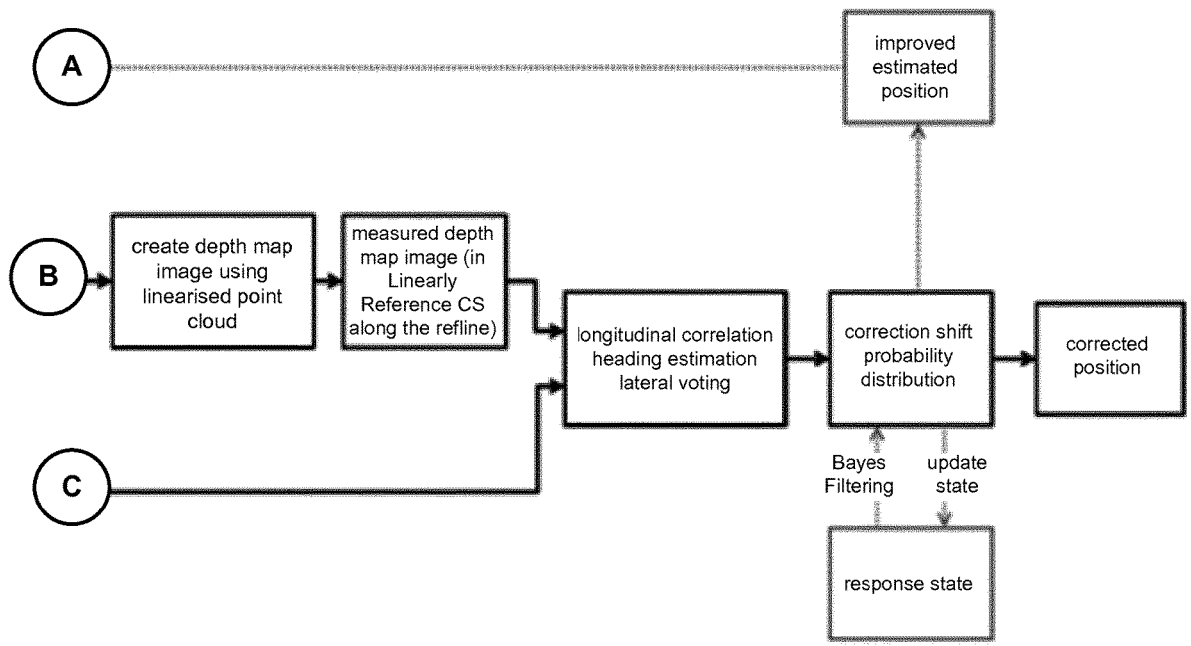

Variant 2: Correction by 3D correlation to reconstructed reference scene
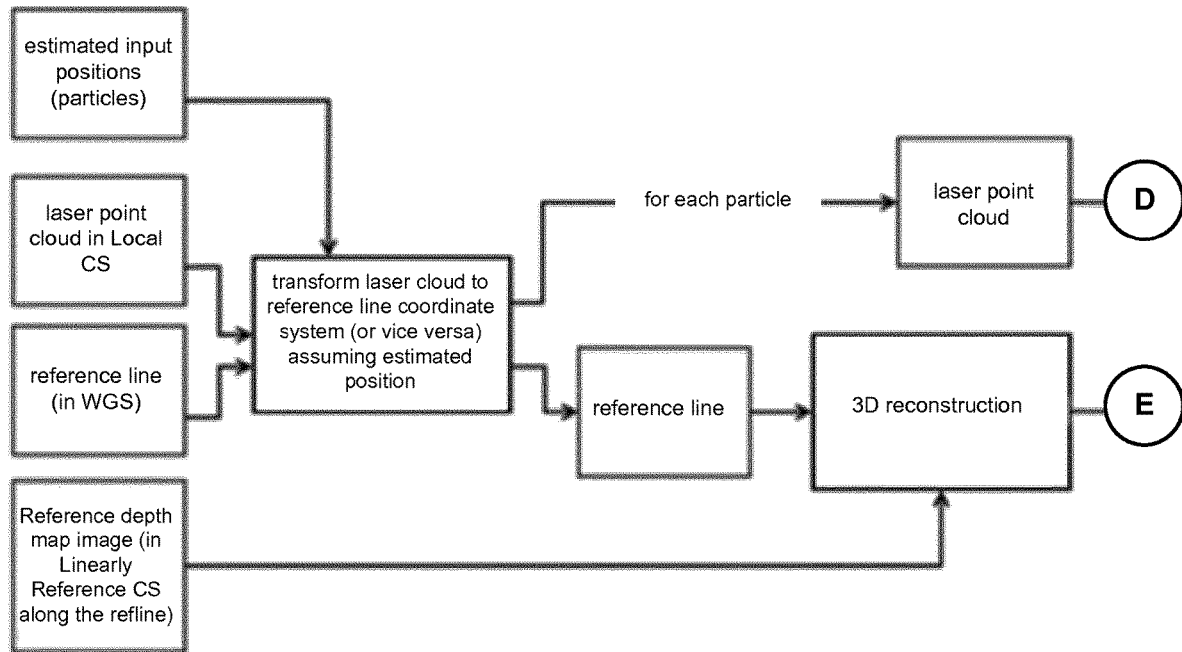
Figure 32B
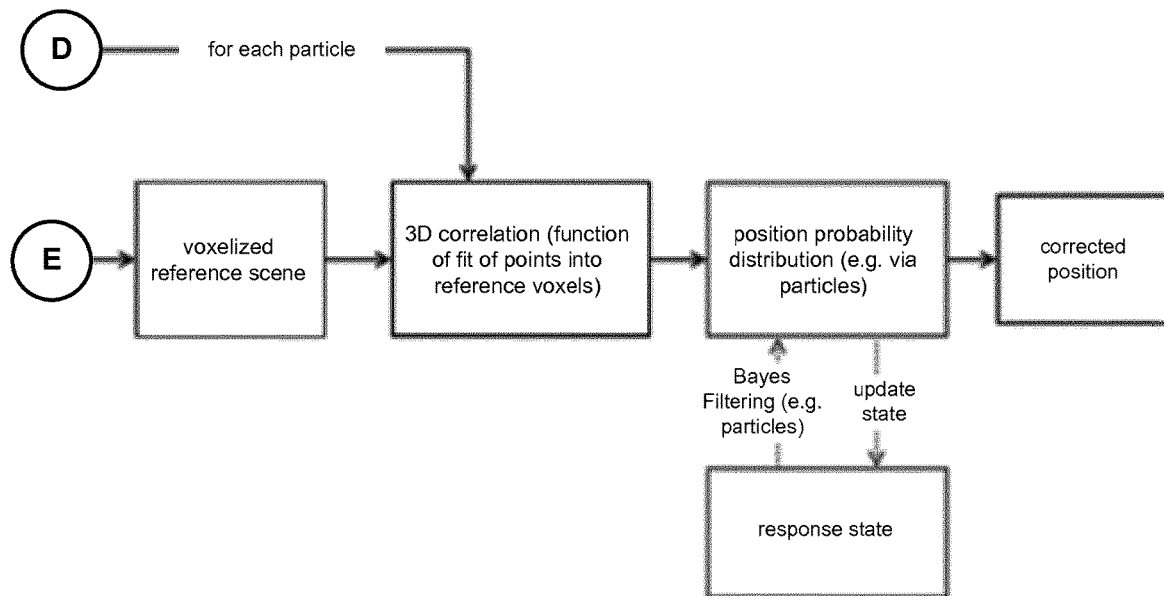

METHODS AND SYSTEMS FOR GENERATING AND USING LOCALIZATION REFERENCE DATA

FIELD OF THE INVENTION

This invention relates, in certain aspects and embodiments, to methods and systems for improved positioning accuracy relative to a digital map, and which is needed for highly and fully automated driving applications. Such methods and systems may use localisation reference data associated with a digital map. In further aspects, the present invention relates to the generation of localisation reference data associated with a digital map, including the format of the reference data, and the use of the reference data. For example, embodiments of the invention relate to the use of the reference data through a comparison to sensed data from a vehicle to accurately position the vehicle on the digital map. Other embodiments relate to the use of the reference data for other purposes, not necessarily in techniques which also use sensed data from a vehicle. For example, further embodiments relate to the use of the generated reference data for reconstructing a view from a camera associated with a vehicle.

BACKGROUND OF THE INVENTION

It has become common in recent years for vehicles to be equipped with navigation devices, either in the form of portable navigation devices (PNDs) that can be removably positioned within the vehicle or systems that are integrated into the vehicle. These navigation devices comprise a means for determining the current position of the device; typically a global navigation satellite system (GNSS) receiver, such as GPS or GLONASS. It will be appreciated, however, that other means may be used, such as using the mobile telecommunications network, surface beacons or the like.

Navigation devices also have access to a digital map representative of a navigable network on which the vehicle is travelling. The digital map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc. For the purposes of this application, a digital map of this form will be referred to as a "standard map".

Navigation devices are arranged to be able to use the current position of the device, together with the standard map, to perform a number of tasks, such as guidance with respect to a determined route, and the provision of traffic and travel information relative to the current position or predicted future position based on a determined route.

It has been recognised, however, that the data contained within standard maps is insufficient for various next generation applications, such as highly automated driving in which the vehicle is able to automatically control, for example, acceleration, braking and steering without input from the driver, and even fully automated "self-driving" vehicles. For such applications, a more precise digital map is needed. This more detailed digital map typically comprises a three-dimensional vector model in which each lane of a road is represented separately, together with connectivity data to other lanes. For the purposes of this application, a digital map of this form will be referred to as a "planning map" or "high definition (HD) map".

A representation of a portion of a planning map is shown in FIG. 1, wherein each line represents the centreline of a lane. FIG. 2 shows another exemplary portion of a planning map, but this time overlaid on an image of the road network. The data within these maps is typically accurate to within a metre, or even less, and can be collected using various techniques.

One exemplary technique for collecting the data to build such planning maps is to use mobile mapping systems; an example of which is depicted in FIG. 3. The mobile mapping system 2 comprises a survey vehicle 4, a digital camera 40 and a laser scanner 6 mounted on the roof 8 of the vehicle 4. The survey vehicle 2 further comprises a processor 10, a memory 12 and a transceiver 14. In addition, the survey vehicle 2 comprises an absolute positioning device 2, such as a GNSS receiver, and a relative positioning device 22 including an inertial measurement unit (IMU) and a distance measurement instrument (DMI). The absolute positioning device 20 provides geographical coordinates of the vehicle, and the relative positioning device 22 serves to enhance the accuracy of the coordinates measured by the absolute positioning device 20 (and to replace the absolute positioning device in those instances when signals from the navigation satellites cannot be received). The laser scanner 6, the camera 40, the memory 12, the transceiver 14, the absolute positioning device 20 and the relative positioning device 22 are all configured for communication with the processor 10 (as indicated by lines 24). The laser scanner 6 is configured to scan a laser beam in 3D across the environment and to create a point cloud representative of the environment; each point indicating the position of a surface of an object from which the laser beam is reflected. The laser scanner 6 is also configured as a time-of-flight laser range-finder so as to measure a distance to each position of incidence of the laser beam on the object surface.

In use, as shown in FIG. 4, the survey vehicle 4 travels along a road 30 comprising a surface 32 having road markings 34 painted thereon. The processor 10 determines the position and the orientation of the vehicle 4 at any instant of time from position and orientation data measured using the absolute positioning device 20 and the relative positioning device 22, and stores the data in the memory 12 with suitable timestamps. In addition, the camera 40 repeatedly captures images of the road surface 32 to provide a plurality of road surface images; the processor 10 adding a timestamp to each image and storing the images in the memory 12. The laser scanner 6 also repeatedly scans the surface 32 to provide at least a plurality of measured distance values; the processor adding a timestamp to each distance value and stores them in the memory 12. Examples of the data obtained from the laser scanner 6 are shown in FIGS. 5 and 6. FIG. 5 shows a 3D view, and FIG. 6 shows a side view projection; the colour in each picture being representative of the distance to the road. All the data obtained from these mobile mapping vehicles can be analysed and used to create planning maps of the portions of the navigable (or road) network travelled by the vehicles.

It has been recognised by the Applicant that in order to use such planning maps for highly and fully automated driving applications, it is necessary to know the position of a vehicle relative to the planning map to a high degree of accuracy. The traditional technique of determining the current location of a device using navigation satellites or terrestrial beacons provides an absolute position of the device to an accuracy of around 5-10 metres; this absolute position is then matched to a corresponding position on the digital map. While this level of accuracy is sufficient for most traditional applications, it is not sufficiently accurate for next generation applications, where positions relative to the digital map are required at sub-metre accuracy even when travelling at high speeds on the road network. An improved positioning method is therefore required.

The Applicant has also recognised that there is a need for improved methods of generating localisation reference data associated with a digital map e.g. for providing a "planning map", which may be used in determining the position of a vehicle relative to the map, as well as in other contexts.

SUMMARY OF THE INVENTION

In accordance with a first aspect of the invention there is provided a method of generating localisation reference data associated with a digital map, the localisation reference data providing a compressed representation of an environment around at least one navigable element of a navigable network represented by the digital map, the method comprising, for at least one navigable element represented by the digital map:

generating localisation reference data comprising at least one depth map indicative of an environment around the navigable element projected on to a reference plane, said reference plane being defined by a reference line associated with the navigable element, each pixel of the at least one depth map being associated with a position in the reference plane associated with the navigable element, and the pixel including a depth channel representing the distance to a surface of an object in the environment along a predetermined direction from the associated position of the pixel in the reference plane; and associating the generated localisation reference data with the digital map data.

It will be appreciated that the digital map (in this, and any other aspects or embodiments of the invention) comprises data representative of navigable elements of a navigable network, e.g. roads of a road network.

In accordance with the first aspect of the invention, localisation reference data is generated associated with one or more navigable elements of a navigable network represented by a digital map. Such data may be generated in respect of at least some, and preferably all of the navigable elements represented by the map. The generated data provides a compressed representation of the environment around the navigable element. This is achieved using at least one depth map, which is indicative of the environment around the element projected on to a reference plane defined by a reference line, which in turn, is defined with respect to the navigable element. Each pixel of the depth map is associated with a position in the reference plane, and includes a depth channel representing the distance to the surface of an object in the environment along a predetermined direction from the position of the pixel in the reference plane.

Various features of the at least one depth map of the localisation reference data will now be described. It will be appreciated that such features may alternatively or additionally be applied to the at least one depth map of the real time scan data that is used in certain further aspects or embodiments of the invention, to the extent that they are not mutually exclusive.

The reference line associated with the navigable element, and which is used to define the reference plane may be set in any manner with respect to the navigable element. The reference line is defined by a point or points associated with the navigable element. The reference line may have a predetermined orientation with respect to the navigable element. In preferred embodiments the reference line is parallel to the navigable element. This may be appropriate for providing localisation reference data (and/or real time scan data) relating to the lateral environment on a side or sides of the navigable element. The reference line may be linear or non-linear i.e. depending whether the navigable element is straight or not. The reference line may include straight and non-linear, e.g. curved portions, e.g. to remain parallel to the navigable element. It will be appreciated that in some further embodiments, the reference line may not be parallel to the navigable element. For example, as described below, the reference line may be defined by a radius centred on a point associated with a navigable element e.g. a point on the navigable element. The reference line may be circular. This may then provide a 360 degree representation of an environment around a junction.

The reference line is preferably a longitudinal reference line, and may be, for example, an edge or boundary of the navigable element or a lane thereof, or a centre line of the navigable element. The localisation reference data (and/or real time scan data) will then provide a representation of the environment on a side or sides of the element. The reference line may lie on the element.

In embodiments, the reference line may be linear even when the navigable element is curved, since a reference line of the navigable element, such as the edge or centreline of the navigable element, and the associated depth information, may undergo a mapping to a linear reference line. Such a mapping or transformation is described in more detail in WO 2009/045096 A1; the entire content of which is incorporated herein by reference.

The reference plane defined by the reference line is preferably orientated perpendicular to a surface of the navigable element. A reference plane as used herein, refers to a 2 dimensional surface, which may be curved or non-curved.

Where the reference line is a longitudinal reference line parallel to the navigable element, the depth channel of each pixel preferably represents the lateral distance to a surface of an object in the environment.

Each depth map may be in the form of a raster image. It will be appreciated that each depth map represents the distance along a predetermined direction from surfaces of objects in the environment to the reference plane for a plurality of longitudinal positions and elevations i.e. corresponding to the position of each pixel associated with the reference plane. The depth map comprises a plurality of pixels. Each pixel of the depth map is associated with a particular longitudinal position and elevation in the depth map, e.g. raster image.

In some preferred embodiments the reference plane is defined by a longitudinal reference line parallel to the navigable element, and the reference plane is orientated perpendicularly to a surface of the navigable element. Each pixel then includes a depth channel representing the lateral distance to a surface of an object in the environment.

In preferred embodiments, the at least one depth map may have a fixed longitudinal resolution and a variable vertical and/or depth resolution.

In accordance with a second aspect of the invention there is provided a method of generating localisation reference data associated with a digital map, the localisation reference data providing a compressed representation of an environment around at least one navigable element of a navigable network represented by the digital map, the method comprising, for at least one navigable element represented by the digital map:

generating localisation reference data comprising at least one depth map indicative of an environment around the navigable element projected on to a reference plane, said reference plane being defined by a longitudinal reference line parallel to the navigable element and orientated perpendicularly to a surface of the navigable element, each pixel of the at least one depth map being associated with a position in the reference plane associated with the navigable element, and the pixel including a depth channel representing the lateral distance to a surface of an object in the environment along a predetermined direction from the associated position of the pixel in the reference plane, preferably wherein said at least one depth map has a fixed longitudinal resolution and a variable vertical and/or depth resolution; and associating the generated localisation reference data with the digital map data.

The present invention in accordance with this further aspect may include any or all of the features described in relation to the other aspects of the invention, to the extent that it is not mutually inconsistent therewith.

Regardless of the orientation of the reference line, reference plane and the line along which the environment is projected onto the reference plane, in accordance with the invention in its various aspects and embodiments, it is advantageous for the at least one depth map to have a fixed longitudinal resolution and a variable vertical and/or depth resolution. The at least one depth map of the localisation reference data (and/or real time scan data) preferably has a fixed longitudinal resolution and a variable vertical and/or depth resolution. The variable vertical and/or depth resolution is preferably non-linear. The portions of the depth map, e.g. raster image, closer to the ground and closer to the navigable element (and hence closer to a vehicle) may be shown in a higher resolution than portions of the depth map, e.g. raster image, higher above the ground and further away from the navigable element (and hence vehicle). This maximises the information density at heights and depths which are more important for detection by vehicle sensors.

Regardless of the orientation of the reference line and plane, or the resolution of the depth map along the various directions, the projection of the environment on to the reference plane is along a predetermined direction, which may be selected as desired. In some embodiments the projection is an orthogonal projection. In these embodiments the depth channel of each pixel represents the distance to a surface of an object in the environment from the associated position of the pixel in the reference plane along a direction normal to the reference plane. Thus, in some embodiments in which the distance represented by the depth channel is a lateral distance, the lateral distance is along a direction normal to the reference plane (although non-orthogonal projections are not confined to cases in which the depth channel relates to a lateral distance). The use of an orthogonal projection may be advantageous in some contexts, as this will have the result that any height information is independent of the distance from the reference line (and hence reference plane).

In other embodiments, it has been found that it may be advantageous to use a non-orthogonal projection. Thus, in some embodiments of the invention in any of its aspects, unless mutually exclusive, (whether or not the predetermined distance is a lateral distance) the depth channel of each pixel represents the distance to a surface of an object in the environment from the associated position of the pixel in the reference plane along a direction that is not normal to the reference plane. The use of a non-orthogonal projection has the advantage that information regarding surfaces oriented perpendicular to the navigable element may be preserved (i.e. where the reference line is parallel to the element). This may be achieved without needing to provide additional data channels associated with pixels. Information regarding objects in the vicinity of the navigable element may therefore be captured more effectively, and in greater detail, but without needing to increase storage capacity. The predetermined direction may be along any desired direction relative to the reference plane, such as at 45 degrees.

The use of a non-orthogonal projection has also been found to be useful in preserving a greater amount of information about surfaces of objects that may be detected by a camera or cameras of a vehicle under conditions of darkness, and is therefore particularly useful in combination with some aspects and embodiments of the invention in which a reference image or point cloud is compared to an image or point cloud obtained based upon real time data sensed by camera(s) of a vehicle.

In accordance with a further aspect of the invention there is provided a method of generating localisation reference data associated with a digital map, the localisation reference data providing a compressed representation of an environment around at least one navigable element of a navigable network represented by the digital map, the method comprising, for at least one navigable element represented by the digital map:

generating localisation reference data comprising at least one depth map indicative of an environment around the navigable element projected on to a reference plane, said reference plane being defined by a reference line parallel to the navigable element, each pixel of the at least one depth map being associated with a position in the reference plane associated with the navigable element, and the pixel including a depth channel representing the distance to a surface of an object in the environment along a predetermined direction from the associated position of the pixel in the reference plane, wherein the predetermined direction is not normal to the reference plane; and associating the generated localisation reference data with digital map data indicative of the navigable element.

The present invention in accordance with this further aspect may include any or all of the features described in relation to the other aspects of the invention, to the extent that it is not mutually inconsistent therewith.

In accordance with the invention in any of its aspects or embodiments, the localisation reference data (and/or real-time scan data) is based on scan data obtained by scanning the environment around the navigable element using one or more sensors. The one or more scanners may comprise one or more of: a laser scanner, a radar scanner and a camera, e.g. a single camera or a pair of stereo cameras.

Preferably the distance to the surface of an object represented by the depth channel of each pixel of the localisation reference data (and/or the real-time scan data) is determined based upon a group of a plurality of sensed data points, each indicative of a distance to the surface of an object along the predetermined direction from the position of the pixel. The data points may be obtained when performing a scan of the environment around the navigable element. The group of sensed data points may be obtained from one or more types of sensor. However, in some preferred embodiments the sensed data points comprise or consist of a group of data points sensed by a laser scanner or scanners. In other words, the sensed data points comprise or consist of laser measurements.

It has been found that using an average of multiple sensed data points in determining the distance value for the depth channel for a given pixel may lead to erroneous results. This is because there is a likelihood that at least some of the sensed data points indicative of the position of the surface of an object from the reference plane along the applicable predetermined direction, and which are considered to map to a particular pixel, may relate to surfaces of different objects. It will be appreciated that, due to the compressed data format, an extended area of the environment may map to the area of the pixel in the reference plane. A considerable amount of sensed data, i.e. number of sensed data points may therefore be applicable to that pixel. Within that area, there may be objects located at different depths relative to the reference plane, including objects which may overlap another object over only a short distance in either dimension, e.g. trees, lampposts, walls, as well as moving objects. The depth values to the surface of an object represented by the sensor data points applicable to a particular pixel may therefore exhibit considerable variance.

In accordance with the invention in any of its aspects or embodiments, in which the distance to the surface of an object represented by the depth channel of each pixel of the localisation reference data (and/or the real-time scan data) is determined based upon a group of a plurality of sensed data points, each indicative of a sensed distance to the surface of an object along the predetermined direction from the position of the pixel, preferably the distance represented by the depth channel of a pixel is not an average value based on the group of a plurality of sensed data points. In preferred embodiments the distance represented by the depth channel of a pixel is a closest sensed distance to the surface of an object from among the group of sensed data points, or a closest mode value obtained using a distribution of the sensed depth values. It will be appreciated that the closest value or values detected are likely to most accurately reflect the depth of the surface of an object to the pixel. For example, consider the case in which a tree is located between a building and a road. Different sensed depth values applicable to a particular pixel may be based on detection of either the building or the tree. If all of these sensed values were taken into account to provide an average depth value, the average value would indicate that the depth to the surface of an object measured from the pixel was somewhere between the depth to the tree and the depth to the building. This would lead to a misleading depth value for the pixel, which would lead to problems when correlating real-time vehicle sensed data to the reference data, and could potentially be dangerous, as it is of critical importance to know with confidence how close objects are to the road. In contrast, the closest depth value or closest mode values are likely to relate to the tree, rather than the building, reflecting the true position of the closest object.

In accordance with a further aspect of the invention there is provided a method of generating localisation reference data associated with a digital map, the localisation reference data providing a compressed representation of an environment around at least one navigable element of a navigable network represented by the digital map, the method comprising, for at least one navigable element represented by the digital map:

generating localisation reference data comprising at least one depth map indicative of an environment around the navigable element projected on to a reference plane, said reference plane being defined by a reference line associated with the navigable element, each pixel of the at least one depth map being associated with a position in the reference plane associated with the navigable element, and the pixel including a depth channel representing the distance to a surface of an object in the environment along a predetermined direction from the associated position of the pixel in the reference plane, wherein the distance to the surface of an object represented by the depth channel of each pixel is determined based upon a group of a plurality of sensed data points, each indicative of a sensed distance to the surface of an object along the predetermined direction from the position of the pixel, and wherein the distance to the surface of the object represented by the depth channel of the pixel is the closest distance, or closest mode distance, based on the group of sensed data points; and associating the generated localisation reference data with the digital map data.

The present invention in accordance with this further aspect may include any or all of the features described in relation to the other aspects of the invention, to the extent that it is not mutually inconsistent therewith.

In accordance with the invention in any of its aspects or embodiments, each pixel (in the localisation reference data and/or the real time scan data) includes a depth channel representing the distance to a surface of an object in the environment. In preferred embodiments each pixel includes one or more further channels. This may provide the depth map with one or more additional layers of information. Each channel is preferably indicative of a value of a property obtained based upon one or more sensed data points, and preferably a group of a plurality of sensed data points. The sensed data may be obtained from one or more sensors as earlier described. In preferred embodiments the or each pixel includes at least one channel indicative of a value of a given type of sensed reflectivity. Each pixel may comprise one or more of: a channel indicative of a value of a sensed laser reflectivity; and a channel indicative of a value of a sensed radar reflectivity. The sensed reflectivity value of the pixel indicated by a channel relates to the sensed reflectivity in the applicable portion of the environment represented by the pixel. The sensed reflectivity value of the pixel is preferably indicative of the sensed reflectivity at around a distance from the reference plane corresponding to the depth of the pixel from the reference plane indicated by the depth channel of the pixel, i.e. the sensed reflectivity at around the depth value for the pixel. This may then be taken to be indicative of the relevant reflectivity property of the object present at that depth. Preferably the sensed reflectivity is a mean reflectivity. The sensed reflectivity data may be based upon a reflectivity associated with the same data points used to determine the depth value, or of a larger set of data points.

For example, a reflectivity associated with sensed depth values applicable to the pixel, and other than those closest values which are preferably used in determining the depth value for the depth channel, may be additionally taken into account.

In this way, a multi-channel depth map, e.g. raster image, is provided. Such a format may enable a larger amount of data relating to the environment surrounding the navigable element to be more efficiently compressed, facilitating storage and processing, and providing the ability to carry out improved correlation with real-time data sensed by a vehicle under different conditions, and without the vehicle necessarily needing to have the same type of sensors as used in generating the reference localisation data. As will be described in more detail below, such data may also help in reconstructing data sensed by a vehicle, or an image of the environment around the navigable element that would be obtained using a camera of the vehicle, under particular conditions, e.g. at night. For example, radar or laser reflectivity may enable those objects that would be visible under particular conditions, e.g. at night, to be identified.

In accordance with a further aspect of the invention there is provided a method of generating localisation reference data associated with a digital map, the localisation reference data providing a compressed representation of an environment around at least one navigable element of a navigable network represented by the digital map, the method comprising, for at least one navigable element represented by the digital map:

generating localisation reference data comprising at least one depth map indicative of an environment around the navigable element projected on to a reference plane, said reference plane being defined by a reference line associated with the navigable element, each pixel of the at least one depth map being associated with a position in the reference plane associated with the navigable element, and the pixel including a depth channel representing the distance to a surface of an object in the environment along a predetermined direction from the associated position of the pixel in the reference plane, wherein each pixel further includes one or more of: a channel indicative of a value of a sensed laser reflectivity; and a channel indicative of a value of a sensed radar reflectivity; and associating the generated localisation reference data with the digital map data.

The present invention in accordance with this further aspect may include any or all of the features described in relation to the other aspects of the invention, to the extent that it is not mutually inconsistent therewith.

In accordance with the invention in any of its aspects or embodiments, other channels associated with pixels may alternatively or additionally be used. For example, further channels may be indicative of one or more of: a thickness of the object at around the distance along the predetermined direction from the reference plane from the position of the pixel indicated by the depth channel of the pixel; a density of reflected data points at around the distance along the predetermined direction from the reference plane from the position of the pixel indicated by the depth channel of the pixel; a colour at around the distance along the predetermined direction from the reference plane from the position of the pixel indicated by the depth channel of the pixel; and a texture at around the distance along the predetermined direction from the reference plane from the position of the pixel indicated by the depth channel of the pixel. Each channel may comprise a value indicative of the relevant property. The value is based upon applicable sensor data obtained, which may be obtained from one or more different types of sensor as appropriate, e.g. a camera for colour or texture data. Each value may be based upon multiple sensed data points, and may be an average of values from said multiple sensed data points.

It will be appreciated that while the depth channel is indicative of the distance of an object from the reference plane at the position of a pixel along a predetermined direction, the other channels may be indicative of other properties of the object, e.g. the reflectivity of the object, or its colour, texture, etc. This may be useful in reconstructing scan data that can be expected to have been sensed by a vehicle and/or camera images taken by a vehicle. Data indicative of the thickness of an object may be used to recover information relating to surfaces of the object perpendicular to the navigable element, where an orthogonal projection of the environment on to the reference plane is used. This may provide an alternative to the embodiments described above for determining information relating to such surfaces of objects, which use a non-orthogonal projection.

In many embodiments, the localisation reference data is used to provide a compressed representation of the environment to a side or sides of a navigable element, i.e. to provide a side depth map. The reference line may then be parallel to the navigable element, with the depth channel of a pixel indicating a lateral distance of the object surface from the reference plane. However, the use of a depth map may also be helpful in other contexts. The Applicant has realised that it would be useful to provide a circular depth map in the region of a junction, e.g. crossroads. This may provide an improved ability to position a vehicle with respect to the junction, e.g. cross roads, or, if desired, to reconstruct data indicative of the environment around the junction, e.g. cross roads. A 360 degree representation of the environment around the junction is preferably provided, although it will be appreciated that the depth map need not extend around a full circle, and may therefore extend around less than 360 degrees. In some embodiments the reference plane is defined by a reference line defined by a radius centred on a reference point associated with a navigable element. In these embodiments the reference line is curved, and preferably circular. The reference point is preferably located on the navigable segment at a junction. For example, the reference point may be located at a centre of the junction, e.g. crossroads. The radius defining the reference line may be chosen as desired, e.g. depending upon the size of the junction.

In accordance with a further aspect of the invention there is provided a method of generating localisation reference data associated with a digital map representing elements of a navigable network, the localisation reference data providing a compressed representation of an environment around at least one junction of the navigable network represented by the digital map, the method comprising, for at least one junction represented by the digital map:

generating localisation reference data comprising at least one depth map indicative of an environment around the junction projected on to a reference plane, said reference plane being defined by a reference line defined by a radius centred on a reference point associated with the junction, each pixel of the at least one depth map being associated with a position in the reference plane associated with the junction, and the pixel including a depth channel representing the distance to a surface of an object in the environment along a predetermined direction from the associated position of the pixel in the reference plane; and associating the generated localisation reference data with digital map data indicative of the junction.

As described in relation to the earlier embodiments, the junction may be a crossroads. The reference point may be located at a centre of the junction. The reference point may be associated with a node of the digital map representing the junction, or a navigable element at the junction. These further aspects or embodiments of the invention may be utilised in combination with side depth maps representing the environment to the side of navigable elements away from the junction.

The present invention in accordance with this further aspect may include any or all of the features described in relation to the other aspects of the invention, to the extent that it is not mutually inconsistent therewith.

In accordance with the invention in any of its aspects or embodiments relating to the generation of localisation reference data, the method may comprise associating the generated localisation reference data in respect of a navigable element or junction with the digital map data indicative of the element or junction. The method may comprise storing the generated localisation data associated with the digital map data, e.g. in association with the navigable element or junction to which it relates.

In some embodiments, the localisation reference data may comprise a representation, e.g. reference scan of the lateral environment on a left side of the navigable element and a right side of the navigable element. The localisation reference data for each side of the navigable element may be stored in a combined data set. Thus, the data from multiple parts of the navigable network may be stored together in an efficient data format. The data stored in the combined data set may be compressed, allowing data for more parts of the navigable network to be stored within the same storage capacity. Data compression will also allow a reduced network bandwidth to be used should the reference scan data be transmitted to the vehicle over a wireless network connection. However, it will be appreciated that the localisation reference data does not necessarily need to relate to the lateral environment on either side of the navigable element. For example, as discussed in certain embodiments above, the reference data may relate to the environment surrounding a junction.

The present invention also extends to a data product storing the localisation reference data generated in accordance with any of the aspects or embodiments of the invention.

The data product in any of these further aspects or embodiments of the invention may be of any suitable form. In some embodiments the data product may be stored on a computer readable medium. The computer readable medium may be, for example, a diskette, CD ROM, ROM, RAM, flash memory or hard disk. The present invention extends to a computer readable medium comprising the data product in accordance with the invention of any of its aspects or embodiments.

The localisation reference data generated in accordance with the invention in any of the aspects or embodiments relating to the generation of such data may be used in various manners. In the further aspects relating to the use of the data, the step of obtaining the reference data may extend to generating the data, or typically comprise retrieving the data. The reference data is preferably generated by a server. The steps of using the data are preferably performed by a device such as a navigation device or similar, which may be associated with a vehicle.

In some preferred embodiments the data is used in determining a position of a vehicle relative to the digital map. The digital map thus comprises data representative of navigable elements along which the vehicle is travelling. The method may comprise obtaining the localisation reference data associated with the digital map for a deemed current position of the vehicle along a navigable element of the navigable network; determining real time scan data by scanning the environment around the vehicle using at least one sensor, wherein the real time scan data comprises at least one depth map indicative of an environment around the vehicle, each pixel of the at least one depth map being associated with a position in the reference plane associated with the navigable element, and the pixel including a depth channel representing the distance to a surface of an object in the environment along the predetermined direction from the associated position of the pixel in the reference plane as determined using the at least one sensor; calculating a correlation between the localisation reference data and the real time scan data to determine an alignment offset between the depth maps; and using the determined alignment offset to adjust the deemed current position to determine the position of the vehicle relative to the digital map. It will be appreciated that the localisation reference data that is obtained relates to the navigable element along which the vehicle is travelling. The depth map of the localisation reference data, which is indicative of the environment around the navigable element is hence indicative of the environment around the vehicle.

In accordance with a further aspect of the invention there is provided a method of determining a position of a vehicle relative to a digital map, the digital map comprising data representative of navigable elements of a navigable network along which the vehicle is travelling, the method comprising:

obtaining localisation reference data associated with the digital map for a deemed current position of the vehicle along a navigable element of the navigable network, wherein the location reference data comprises at least one depth map indicative of an environment around the vehicle projected on to a reference plane, said reference plane being defined by a reference line associated with the navigable element, each pixel of the at least one depth map being associated with a position in the reference plane associated with the navigable element along which the vehicle is travelling, and the pixel including a depth channel representing the distance to a surface of an object in the environment along a predetermined direction from the associated position of the pixel in the reference plane;

determining real time scan data by scanning the environment around the vehicle using at least one sensor, wherein the real time scan data comprises at least one depth map indicative of an environment around the vehicle, each pixel of the at least one depth map being associated with a position in the reference plane associated with the navigable element along which the vehicle is travelling, and the pixel including a depth channel representing the distance to a surface of an object in the environment along the predetermined direction from the associated position of the pixel in the reference plane as determined using the at least one sensor;

calculating a correlation between the localisation reference data and the real time scan data to determine an alignment offset between the depth maps; and using the determined alignment offset to adjust the deemed current position to determine the position of the vehicle relative to the digital map.

The present invention in accordance with this further aspect may include any or all of the features described in relation to the other aspects of the invention, to the extent that it is not mutually inconsistent therewith.

In the further aspects and embodiments of the invention relating to the use of localisation reference data and real time scan data in determining the position of a vehicle, the current position of the vehicle may be a longitudinal position. The real-time scan data may relate to a lateral environment around the vehicle. The depth map for the localisation reference data and/or the real time sensor data will then be defined by a reference line parallel to the navigable element, and including a depth channel representing the lateral distance to the surface of an object in the environment. The determined offset may then be a longitudinal offset.

In accordance with a further aspect of the invention there is provided a method of determining a position of a vehicle relative to a digital map, the digital map comprising data representative of a junction through which the vehicle is travelling, the method comprising:

obtaining localisation reference data associated with the digital map for a deemed current position of the vehicle in the navigable network, wherein the location reference data comprises at least one depth map indicative of an environment around the vehicle projected on to a reference plane, said reference plane being defined by a reference line defined by a radius centred on a reference point associated with the junction, each pixel of the at least one depth map being associated with a position in the reference plane associated with the junction through which the vehicle is travelling, and the pixel including a depth channel representing the distance to a surface of an object in the environment along a predetermined direction from the associated position of the pixel in the reference plane;

determining real time scan data by scanning the environment around the vehicle using at least one sensor, wherein the real time scan data comprises at least one depth map indicative of an environment around the vehicle, each pixel of the at least one depth map being associated with a position in the reference plane associated with the junction, and the pixel including a depth channel representing the distance to a surface of an object in the environment along the predetermined direction from the associated position of the pixel in the reference plane as determined using the at least one sensor;

calculating a correlation between the localisation reference data and the real time scan data to determine an alignment offset between the depth maps; and using the determined alignment offset to adjust the deemed current position to determine the position of the vehicle relative to the digital map.

The present invention in accordance with this further aspect may include any or all of the features described in relation to the other aspects of the invention, to the extent that it is not mutually inconsistent therewith.

In accordance with another aspect of the invention there is provided a method of determining a position of a vehicle relative to a digital map, the digital map comprising data representative of navigable elements of a navigable network along which the vehicle is travelling, the method comprising:

obtaining localisation reference data associated with the digital map for a deemed current position of the vehicle along a navigable element of a navigable network, wherein the location reference data comprises at least one depth map indicative of an environment around the vehicle, each pixel of the at least one depth map being associated with a position in a reference plane associated with the navigable element, said reference plane being defined by a longitudinal reference line parallel to the navigable element and orientated perpendicularly to a surface of the navigable element, and each pixel including a depth channel representing the lateral distance to a surface of an object in the environment, optionally wherein said at least one depth map has a fixed longitudinal resolution and a variable vertical and/or depth resolution;

obtaining sensor data by scanning the environment around the vehicle using at least one sensor;

determining real time scan data using the sensor data, wherein the real time scan data comprises at least one depth map indicative of an environment around the vehicle, each pixel of the at least one depth map being associated with a position in the reference plane associated with the navigable element, and each pixel including a depth channel representing the lateral distance to a surface of an object in the environment as determined from the sensor data, optionally wherein said at least one depth map has a fixed longitudinal resolution and a variable vertical and/or depth resolution;

calculating a correlation between the localisation reference data and the real time scan data to determine an alignment offset between the depth maps; and using the determined alignment offset to adjust the deemed current position to determine the position of the vehicle relative to the digital map.

The present invention in accordance with this further aspect may include any or all of the features described in relation to the other aspects of the invention, to the extent that it is not mutually inconsistent therewith.

In the further aspects of the invention relating to the use of the localised reference data, the data may be generated in accordance with any of the earlier aspects of the invention. The real time scan data used in determining the position of the vehicle, or otherwise, should be of a corresponding form to the localisation reference data. Thus, the depth map determined will comprise pixels having positions in a reference plane defined with respect to a reference line associated with a navigable element in the same manner as the localised reference data, to enable the real time scan data and localised reference data to be correlated with one another. The depth channel data of the depth map may be determined in a corresponding manner to that of the reference data, e.g. without using an average of the sensed data, and thus may comprise a closest distance to a surface from a plurality of sensed data points. The real-time scan data may include any additional channels. Where the depth map of the localisation reference data has a fixed longitudinal resolution and a variable vertical and/or depth resolution, the depth map of the real time scan data may also have such resolution.

Thus, in accordance with these aspects or embodiments of the invention, there is provided a method of continually determining a position of a vehicle relative to a digital map; the digital map comprising data representative of navigable elements (e.g. roads) of a navigable network (e.g. road network) along which the vehicle is travelling. The method comprises receiving real time scan data obtained by scanning an environment around the vehicle; retrieving localisation reference data associated with the digital map for a deemed current position of the vehicle in relation to the digital map, (e.g. wherein the localisation reference data comprises a reference scan of the environment around the deemed current position), optionally wherein said reference scan has been obtained throughout the digital map from at least one device which has previously travelled along the route; comparing the real time scan data to the localisation reference data to determine an offset between the real time scan data and the localisation reference data; and adjusting the deemed current position based on said offset. The position of the vehicle relative to the digital map can therefore always be known to a high degree of accuracy. Examples in the prior art have attempted to determine the position of a vehicle by comparing collected data with known reference data for pre-determined landmarks along a route. However, the landmarks may be sparsely distributed on many routes, resulting in significant errors in the estimation of the vehicle's position when it is travelling between the landmarks. This is a problem in situations such as highly automated driving systems, where such errors can cause catastrophic consequences such as vehicle crash incidents resulting in serious injury or loss of life. The present invention, in certain aspects at least, solves this problem by having reference scan data throughout the digital map and by scanning the environment around the vehicle in real time. In this way, the present invention may allow real time scan and reference data to be compared such that the position of the vehicle relative to the digital map is always known to a high degree of accuracy.

In accordance with a further aspect of the invention there is provided a method of determining a longitudinal position of a vehicle relative to a digital map, the digital map comprising data representative of navigable elements of a navigable network along which the vehicle is travelling, the method comprising:

obtaining localisation reference data associated with the digital map for a deemed current position of the vehicle along a navigable element of a navigable network, wherein the location reference data comprises an outline of objects in an environment around the vehicle projected onto a reference plane, said reference plane being defined by a longitudinal reference line parallel to the navigable element and orientated perpendicularly to a surface of the navigable element;

obtaining sensor data by scanning the environment around the vehicle using at least one sensor;

determining real time scan data using the sensor data, wherein the real time scan data comprises an outline of objects in the environment around the vehicle projected onto the reference plane as determined from the sensor data;

calculating a correlation between the localisation reference data and the real time scan data to determine a longitudinal alignment offset; and using the determined alignment offset to adjust the deemed current position to determine the longitudinal position of the vehicle relative to the digital map.

The present invention in accordance with this further aspect may include any or all of the features described in relation to the other aspects of the invention, to the extent that it is not mutually inconsistent therewith.

The location reference data may be stored in association with the digital map, e.g. associated with the relevant navigable element(s), such that the outline of objects in the environment around the vehicle projected onto the reference plane is already determined. In other embodiments, however, the location reference data can be stored in a different format, and the stored data is processed so as to determine the outline. For example, in embodiments, as in the earlier described aspects of the invention, the location reference data comprises one or more depth maps, e.g. raster images, each depth map representing the lateral distance to surfaces in the environment for a plurality of longitudinal positions and elevations. The depth maps may be in accordance with any of the earlier aspects and embodiments. In other words, the location reference data comprises at least one depth map, e.g. raster image, indicative of the environment around the vehicle, wherein each pixel of the at least one depth map is associated with a position in the reference plane, and each pixel includes a channel representing the lateral distance, e.g. normal to the reference plane, to a surface of an object in the environment. In such embodiments, the relevant depth map, e.g. raster image, is processed using an edge detection algorithm to generate the outline of the objects in the environment. The edge detection algorithm can include a Canny operator, a Prewitt operator and the like. In preferred embodiments, however, the edge detection is performed using a Sobel operator. The edge detection operator can be applied in both the height (or elevation) and longitudinal domains, or in just one of said domains. For example, in a preferred embodiment, the edge detection operator is applied only in the longitudinal domain.

Similarly, the outline of objects in the environment around the vehicle projected onto the reference plane can be determined directly from the sensor data obtained by the at least one sensor. Alternatively, in other embodiments, the sensor data can be used to determine one or more depth maps, e.g. raster images, each depth map representing the lateral distance to surfaces in the environment for a plurality of longitudinal positions and elevations. In other words, the real time scan data comprises at least one depth map, e.g. raster image, indicative of the environment around the vehicle, wherein each pixel of the at least one depth map is associated with a position in the reference plane, and each pixel includes a channel representing the lateral distance, e.g. normal to the reference plane, to a surface of an object in the environment as determined using the at least one sensor. The relevant depth map, e.g. raster image, can then be processed using an edge detection algorithm, preferably the same edge detection algorithm applied to the location reference data, to determine the outline of the real time scan data. The edge detection operator can be applied in both the height (or elevation) and longitudinal domains, or in just one of said domains. For example, in a preferred embodiment, the edge detection operator is applied only in the longitudinal domain.

In embodiments, a blurring operator is applied to the outline of at least one of the localisation reference data and the real time scan data, before the two sets of data are correlated. The blurring operation can be applied in both the height (or elevation) and longitudinal domains, or in just one of said domains. For example, in a preferred embodiment, the blurring operator is applied only in the height domain. The blurring operation can take into account any tilting of the vehicle while obtaining the real time scan data and/or the localisation reference data, such that, for example, the outline is shifted slightly upwards or downwards in the height domain.

In accordance with the invention of any of its aspects or embodiments, the deemed current e.g. longitudinal position of the vehicle can be obtained, at least initially, from an absolute positioning system, such as a satellite navigation device, such as GPS, GLONASS, the European Galileo positioning system, COMPASS positioning system or IRNSS (Indian Regional Navigational Satellite System). It will be appreciated, however, that other location determining means can be used, such as using mobile telecommunications, surface beacons or the like.

The digital map may comprise a three dimensional vector model representing the navigable elements of the navigable network, e.g. roads of a road network, in which each lane of the navigable elements, e.g. roads, are represented separately. Thus, a lateral position of the vehicle on the road may be known by determining the lane in which the vehicle is travelling, e.g. through image processing of a camera mounted to the vehicle. In such embodiments, a longitudinal reference line can be, for example, an edge or boundary of a lane of the navigable element or a centre line of a lane of the navigable element.

The real time scan data may be obtained on a left side of the vehicle and a right side of the vehicle. This helps to reduce the effect of transient features on the position estimation. Such transient features may be, for example, parked vehicles, overtaking vehicles or vehicles travelling the same route in the opposite direction. Thus, real time scan data can record features present on both sides of the vehicle. In some embodiments, the real time scan data may be obtained from either a left side of the vehicle or a right side of the vehicle.

In embodiments in which the localisation reference data and the real time scan data are each in respect of left and right sides of the vehicle, the comparison of the real time scan data from the left side of the vehicle with the localisation reference data from the left side of the navigable element and the comparison of the real time scan data from the right side of the vehicle with the localisation reference data from the right side of the navigable element may be a single comparison. Thus, when the scan data comprises data from the left side of the navigable element and data from the right side of the navigable element, the scan data may be compared as a single data set, significantly reducing the processing requirements compared to where the comparison for the left side of the navigable element and the comparison for the right side of the navigable element are performed separately.

Regardless of whether it relates to the left and right sides of a vehicle, comparing the real time scan data to the localisation reference data may comprise calculating a cross-correlation, preferably a normalised cross-correlation, between the real time scan data and the localisation reference data. The method may comprise determining the positions at which the data sets are most aligned. Preferably the alignment offset between the depth maps that is determined is at least a longitudinal alignment offset, and the positions at which the data sets are most aligned are longitudinal positions. The step of determining the longitudinal positions at which the data sets are most aligned may comprise longitudinally shifting the depth map, e.g. raster image, provided by the depth map based on the real time scan data and the depth map, e.g. raster image, provided by the depth map based on the localisation reference data relative to one another until the depth maps are aligned. This may be performed in the image domain.

The determined longitudinal alignment offset is used to adjust the deemed current position to adjust the longitudinal position of the vehicle relative to the digital map.

Alternatively, or preferably additionally to determining a longitudinal alignment offset between the depth maps, it is desirable to determine a lateral alignment offset between the depth maps. The determined lateral alignment offset may then be used to adjust the deemed current lateral position of the vehicle and hence to determine the position of the vehicle relative to the digital map. Preferably a longitudinal alignment offset is determined, which may be carried out in any of the manners above described, and a lateral alignment offset is additionally determined. The determined lateral and longitudinal alignment offsets are then used together to adjust both the longitudinal and lateral positions of the vehicle relative to the digital map.

The method may comprise determining a longitudinal alignment offset between the depth maps, e.g. by calculating a correlation between the localisation reference data and the real time scan data, and may further comprise: determining a lateral offset between the depth maps; and using the determined lateral and longitudinal alignment offsets to adjust the deemed current position to determine the position of the vehicle relative to the digital map.

The longitudinal alignment offset is preferably determined before the lateral alignment offset. In accordance with certain embodiments described below, the lateral alignment offset may be determined based upon first determining a longitudinal offset between the depth maps, and longitudinally aligning the depth maps relative to one another based on the offset.

The lateral offset is preferably determined based on the most common, i.e. mode lateral offset between corresponding pixels of the depth maps.

In accordance with a further aspect of the invention there is provided a method of determining a position of a vehicle relative to a digital map, the digital map comprising data representative of navigable elements of a navigable network along which the vehicle is travelling, the method comprising:

obtaining localisation reference data associated with the digital map for a deemed current position of the vehicle along a navigable element of the navigable network, wherein the location reference data comprises at least one depth map indicative of an environment around the vehicle projected on to a reference plane, the reference plane being defined by a reference line associated with the navigable element, each pixel of the at least one depth map being associated with a position in the reference plane associated with the navigable element along which the vehicle is travelling, and the pixel including a depth channel representing the distance to a surface of an object in the environment along a predetermined direction from the associated position of the pixel in the reference plane;

determining real time scan data by scanning the environment around the vehicle using at least one sensor, wherein the real time scan data comprises at least one depth map indicative of an environment around the vehicle, each pixel of the at least one depth map being associated with a position in the reference plane associated with the navigable element, and the pixel including a depth channel representing the distance to a surface of an object in the environment along the predetermined direction from the associated position of the pixel in the reference plane as determined using the at least one sensor;

determining a longitudinal alignment offset between the depth maps of the localisation reference data and the real time scan data by calculating a correlation between the localisation reference data and the real time scan data;

determining a lateral alignment offset between the depth maps, wherein the lateral offset is based on a most common lateral offset between corresponding pixels of the depth maps; and using the determined longitudinal and lateral alignment offsets to adjust the deemed current position to determine the position of the vehicle relative to the digital map.

The present invention in accordance with this further aspect may include any or all of the features described in relation to the other aspects of the invention, to the extent that it is not mutually inconsistent therewith.

In accordance with these aspects and embodiments of the invention in which a lateral alignment offset is determined, the most common lateral alignment offset may be determined by consideration of the depth channel data of the corresponding pixels of the depth map. The most common lateral alignment offset is based upon the determined lateral alignment offsets determined between respective pairs of correspondingly positioned pixels of the depth maps, and preferably is based upon the lateral alignment offsets of each pair of corresponding pixels. In order to determine the lateral alignment offset between corresponding pixels of the depth maps, the corresponding pairs of pixels in the depth maps must be identified. The method may comprise identifying corresponding pairs of pixels in the depth maps. Preferably the longitudinal alignment offset is determined before the lateral alignment offset. The depth maps are desirably shifted relative to one another until they are longitudinally aligned to enable the corresponding pixels in each depth map to be identified.

The method may therefore further comprise aligning the depth maps longitudinally relative to one another based on the determined longitudinal alignment offset. The step of aligning the depth maps longitudinally with one another may comprise shifting either or both of the depth maps longitudinally. The shifting of the depth maps longitudinally relative to one another may be carried out in the image domain. Thus the step of aligning the depth maps may comprise shifting the raster images corresponding to each depth map longitudinally relative to one another. The method may further comprise cropping the size of the image provided by the localisation reference data depth map to correspond to the size of the image provided by the real time scan data depth map. This may facilitate comparison between the depth maps.

Once the corresponding pixels in the two depth maps have been identified, a lateral offset between each pair of corresponding pixels may be determined. This may be achieved by comparison of the distance to the surface of an object in the environment along the predetermined direction from the position of the pixel in the reference plane indicated by the depth channel data associated with each pixel. As described earlier, the depth map preferably has a variable depth resolution. The lateral alignment offset between each pair of corresponding pixels may be based on the difference in the distances indicated by the depth channel data of the pixels. The method may comprise using a histogram to identify a most common lateral alignment offset between the corresponding pixels of the depth maps. The histogram may be indicative of the frequency of occurrence of different lateral alignment offsets between corresponding pairs of pixels. The histogram may be indicative of a probability density function of the lateral alignment shift, with the mode reflecting the most probable shift.

In some embodiments, each pixel has a colour indicative of the value of the depth channel of the pixel. The comparison of the depth values of the corresponding pixels may then comprise comparing the colours of the corresponding pixels of the depth map. The difference in colour between the corresponding pixels may be indicative of the lateral alignment offset between the pixels, e.g. when the depth map has a fixed depth resolution.

In these embodiments in which a lateral alignment offset is determined, the current longitudinal and lateral positions of the vehicle relative to the digital map may be adjusted.

In accordance with any of the aspects or embodiments of the invention in which the current position of the vehicle is adjusted, whether the longitudinal and/or lateral position, the current position that is adjusted may be an estimation of the current position obtained in any suitable manner, such as from an absolute position determining system or other location determining system, as described above. For example, GPS, or dead reckoning may be used. As will be appreciated, the absolute position is preferably matched to the digital map to determine an initial position relative to the digital map; the longitudinal and/or lateral corrections are then applied to the initial position to improve the position relative to the digital map.

The Applicant has realised that while the above described techniques may be useful in adjusting a position of a vehicle with respect to a digital map, they will not correct the heading of the vehicle. In preferred embodiments the method further comprises using the localisation reference data and real time scan data depth maps to adjust a deemed heading of the vehicle. This further step is preferably carried out in addition to determining longitudinal and lateral alignment offsets of the depth maps in accordance with any of the embodiments described above. In these embodiments, the deemed heading of the vehicle may be determined in any suitable manner, e.g. using GPS data etc., as described in relation to determining the deemed position of a vehicle.

It has been found that where the deemed heading of the vehicle is incorrect, the lateral alignment offset between the corresponding pixels of the depth maps will vary in the longitudinal direction along the depth maps i.e. along the depth map images. It has been found that a heading offset may be determined based upon a function indicative of a variation in lateral alignment offset between corresponding pixels of the depth maps with respect to longitudinal position along the depth maps. The step of determining the heading offset may incorporate any of the features described earlier in relation to determining the lateral alignment offset of corresponding pixels. Thus, the method preferably first comprises shifting the depth maps relative to one another to longitudinally align the depth maps.

The method may therefore further comprise: determining a longitudinal alignment offset between the depth maps; determining a function indicative of a variation in the lateral alignment offset between the corresponding pixels of the depth maps with respect to longitudinal position of the pixels along the depth maps; and using the determined function to adjust the deemed current heading of the vehicle to determine the heading of the vehicle relative to the digital map.

The determined lateral alignment offset of between corresponding pixels is, as described above, preferably based on the difference in the values indicated by the depth channel data of the pixels, e.g. by reference to the colours of the pixels.

In these aspects or embodiments, the determined function is indicative of a heading offset of the vehicle.

The step of determining the function indicative of the variation in lateral alignment offset with longitudinal position may comprise determining an average (i.e. mean) lateral alignment offset of corresponding pixels of the depth maps in each of a plurality of vertical sections through the depth maps along the longitudinal direction of the depth maps. The function may then be obtained based upon the variation in the average lateral alignment offset determined for each vertical section along the longitudinal direction of the depth maps. It will be appreciated that at least some, and optionally each, of the corresponding pairs of pixels in the depth maps are considered in determining the function.

In accordance with a further aspect of the invention there is provided a method of determining a position of a vehicle relative to a digital map, the digital map comprising data representative of navigable elements of a navigable network along which the vehicle is travelling, the method comprising:

obtaining localisation reference data associated with the digital map for a deemed current position of the vehicle along a navigable element of the navigable network, wherein the location reference data comprises at least one depth map indicative of an environment around the vehicle projected on to a reference plane, the reference plane being defined by a reference line associated with the navigable element, each pixel of the at least one depth map being associated with a position in the reference plane associated with the navigable element along which the vehicle is travelling, and the pixel including a depth channel representing the distance to a surface of an object in the environment along a predetermined direction from the associated position of the pixel in the reference plane;

determining real time scan data by scanning the environment around the vehicle using at least one sensor, wherein the real time scan data comprises at least one depth map indicative of an environment around the vehicle, each pixel of the at least one depth map being associated with a position in the reference plane associated with the navigable element, and the pixel including a depth channel representing the distance to a surface of an object in the environment along the predetermined direction from the associated position of the pixel in the reference plane as determined using the at least one sensor;

determining a function indicative of a variation in a lateral alignment offset between corresponding pixels of the localisation reference and real time sensor data depth maps with respect to longitudinal position of the pixels along the depth maps; and using the determined function to adjust the deemed current heading of the vehicle to determine the heading of the vehicle relative to the digital map.

The present invention in accordance with this further aspect may include any or all of the features described in relation to the other aspects of the invention, to the extent that it is not mutually inconsistent therewith.

In these aspects and embodiments of the invention, further steps may be taken to improve the determined heading offset, e.g. by filtering out noisy pixels, or weighting the mean pixel depth difference values within longitudinal sections of the depth map or image by reference to the number of significant pixels taken into account in the section.

As mentioned above, the depth maps of the localisation reference data, and thus also of the real-time data, can be transformed so as to always be associated with a linear reference line. Due to this linearisation of the depth maps, when the navigable element is curved, it has be found that it is not possible to directly apply the determined longitudinal, lateral and/or heading corrections. The Applicant has identified that a computationally efficient method of adjusting or correcting the current position of the vehicle relative to the digital map involves applying each of the corrections in a series of incremental, independent linear update steps.

Thus in preferred embodiments, a determined longitudinal offset is applied to the current position of the vehicle relative to the digital map, and the at least one depth map of the real time scan data is recomputed based on the adjusted position. A lateral offset, determined using the recomputed real time scan data, is then applied to the adjusted position of the vehicle relative to the digital map, and the at least one depth map of the real time scan data is recomputed based on the further adjusted position. A skew, i.e., heading offset, determined using the recomputed real time scan data, is then applied to the further adjusted position of the vehicle relative to the digital map, and the at least one depth map of the real time scan data is recomputed based on the again adjusted position. These steps are preferably repeated for any number of times as needed, until such a time that there is zero, or substantially zero, longitudinal offset, lateral offset and skew.

It will be appreciated that the generated localisation reference data obtained in accordance with the invention in any of its aspects or embodiments may be used in other manners together with real time scan data to determine a more accurate position of a vehicle, or indeed, for other purposes. In particular, the Applicant has recognised that it may not always be possible, or at least convenient, to determine a corresponding depth map using real time scan data for comparison to the depth map of the localisation reference scan data. In other words, it may not be appropriate to carry out comparison of the datasets in the image domain. This may be the case in particular where the types of sensor available on the vehicle differ from those used to obtain the localisation reference data.

In accordance with some further aspects and embodiments of the invention the method comprises using the localisation reference data to determine a reference point cloud indicative of the environment around the navigable element, the reference point cloud including a set of first data points in a three-dimensional coordinate system, wherein each first data point represents a surface of an object in the environment.

In accordance with a further aspect of the invention there is provided a method of generating localisation reference data associated with a digital map, the localisation reference data providing a compressed representation of an environment around at least one navigable element of a navigable network represented by the digital map, the method comprising, for at least one navigable element represented by the digital map:

generating localisation reference data comprising at least one depth map indicative of an environment around the navigable element projected on to a reference plane, said reference plane being defined by a reference line associated with the navigable element, each pixel of the at least one depth map being associated with a position in the reference plane associated with the navigable element, and the pixel including a depth channel representing the distance to a surface of an object in the environment along a predetermined direction from the associated position of the pixel in the reference plane;

associating the generated localisation reference data with the digital map data; and using the localisation reference data to determine a reference point cloud indicative of the environment around the navigable element, the reference point cloud including a set of first data points in a three-dimensional coordinate system, wherein each first data point represents a surface of an object in the environment.

The present invention in accordance with this further aspect may include any or all of the features described in relation to the other aspects of the invention, to the extent that it is not mutually inconsistent therewith.

In accordance with a further aspect of the invention there is provided a method of generating localisation reference data associated with a digital map representing elements of a navigable network, the localisation reference data providing a compressed representation of an environment around at least one junction of the navigable network represented by the digital map, the method comprising, for at least one junction represented by the digital map:

generating localisation reference data comprising at least one depth map indicative of an environment around the junction projected on to a reference plane, said reference plane being defined by a reference line defined by a radius centred on a reference point associated with the junction, each pixel of the at least one depth map being associated with a position in the reference plane associated with the junction, and the pixel including a depth channel representing the distance to a surface of an object in the environment along a predetermined direction from the associated position of the pixel in the reference plane;

associating the generated localisation reference data with digital map data indicative of the junction; and using the localisation reference data to determine a reference point cloud indicative of the environment around the junction, the reference point cloud including a set of first data points in a three-dimensional coordinate system, wherein each first data point represents a surface of an object in the environment.

The present invention in accordance with this further aspect may include any or all of the features described in relation to the other aspects of the invention, to the extent that it is not mutually inconsistent therewith.

The reference point cloud including a set of first data points in a three-dimensional coordinate system, wherein each first data point represents a surface of an object in the environment, may be referred to herein as the "3D point cloud". The 3D point cloud obtained in accordance with these further aspects of the invention may be used in determining the positioning of a vehicle.

In some embodiments the method may comprise using the generated localisation reference data of the invention in any of its aspects or embodiments in determining a position of a vehicle relative to a digital map, the digital map comprising data representative of navigable elements of a navigable network along which the vehicle is travelling, the method comprising:

obtaining localisation reference data associated with the digital map for a deemed current position of the vehicle along a navigable element or junction of the navigable network, using the localisation reference data to determine a reference point cloud indicative of the environment around the vehicle, the reference point cloud including a set of first data points in a three-dimensional coordinate system, wherein each first data point represents a surface of an object in the environment;

determining real time scan data by scanning the environment around the vehicle using at least one sensor, the real time scan data comprising a point cloud indicative of the environment around the vehicle, the point cloud including a set of second data points in the three-dimensional coordinate system, wherein each data point represents a surface of an object in the environment as determined using the at least one sensor;

calculating a correlation between the point cloud of the real time scan data and the point cloud of the obtained localisation reference data to determine an alignment offset between the point clouds; and using the determined alignment offset to adjust the deemed current position to determine the position of the vehicle relative to the digital map.

The present invention in accordance with this further aspect may include any or all of the features described in relation to the other aspects of the invention, to the extent that it is not mutually inconsistent therewith.

In accordance with a further aspect of the invention there is provided a method of determining a position of a vehicle relative to a digital map, the digital map comprising data representative of navigable elements of a navigable network along which the vehicle is travelling, the method comprising:

obtaining localisation reference data associated with the digital map for a deemed current position of the vehicle along a navigable element of the navigable network, wherein the location reference data comprises at least one depth map indicative of an environment around the vehicle projected on to a reference plane, the reference plane being defined by a reference line associated with the navigable element, each pixel of the at least one depth map being associated with a position in the reference plane associated with the navigable element along which the vehicle is travelling, and the pixel including a depth channel representing the distance to a surface of an object in the environment along a predetermined direction from the associated position of the pixel in the reference plane;

using the localisation reference data to determine a reference point cloud indicative of the environment around the vehicle, the reference point cloud including a set of first data points in a three-dimensional coordinate system, wherein each first data point represents a surface of an object in the environment;

determining real time scan data by scanning the environment around the vehicle using at least one sensor, the real time scan data comprising a point cloud indicative of the environment around the vehicle, the point cloud including a set of second data points in the three-dimensional coordinate system, wherein each data point represents a surface of an object in the environment as determined using the at least one sensor;

calculating a correlation between the point cloud of the real time scan data and the point cloud of the obtained localisation reference data to determine an alignment offset between the point clouds; and using the determined alignment offset to adjust the deemed current position to determine the position of the vehicle relative to the digital map.

The present invention in accordance with this further aspect may include any or all of the features described in relation to the other aspects of the invention, to the extent that it is not mutually inconsistent therewith.

In accordance with a further aspect of the invention there is provided a method of determining a position of a vehicle relative to a digital map, the digital map comprising data representative a junction of a navigable network through which the vehicle is travelling, the method comprising:

obtaining localisation reference data associated with the digital map for a deemed current position of the vehicle at a junction of the navigable network, wherein the location reference data comprises at least one depth map indicative of an environment around the vehicle projected on to a reference plane, the reference plane being defined by a reference line defined by a radius centred on a reference point associated with the junction, each pixel of the at least one depth map being associated with a position in the reference plane associated with the junction through which the vehicle is travelling, and the pixel including a depth channel representing the distance to a surface of an object in the environment along a predetermined direction from the associated position of the pixel in the reference plane;

using the localisation reference data to determine a reference point cloud indicative of the environment around the vehicle, the reference point cloud including a set of first data points in a three-dimensional coordinate system, wherein each first data point represents a surface of an object in the environment;

determining real time scan data by scanning the environment around the vehicle using at least one sensor, the real time scan data comprising a point cloud indicative of the environment around the vehicle, the point cloud including a set of second data points in the three-dimensional coordinate system, wherein each data point represents a surface of an object in the environment as determined using the at least one sensor;

calculating a correlation between the point cloud of the real time scan data and the point cloud of the obtained localisation reference data to determine an alignment offset between the point clouds; and using the determined alignment offset to adjust the deemed current position to determine the position of the vehicle relative to the digital map.

The reference point cloud in these further aspects including a set of second data points in a three-dimensional coordinate system, wherein each second data point represents a surface of an object in the environment, may be referred to herein as a "3D point cloud".

In these further aspects or embodiments of the invention, the localisation reference data is used to obtain a 3D reference point cloud. This is indicative of the environment around the navigable element or junction to which the data relates, and hence to the environment around a vehicle when travelling along the navigable element or through the junction. The point cloud of the real time sensor data relates to the environment around the vehicle, and may therefore also be referred to as relating to the environment around the navigable element or junction where the vehicle is located. In some preferred embodiments the 3D point cloud obtained based upon the localisation reference data is compared to a 3D point cloud indicative of the environment around the vehicle (i.e. when travelling on the relevant element or through the junction) obtained based on the real time scan data. The position of the vehicle may then be adjusted based on this comparison, rather than a comparison of depth maps, e.g. raster images.

The real time scan data point cloud is obtained using one or more sensors associated with the vehicle. A single sensor, or multiple such sensors may be used, and in the latter case, any combination of sensor types may be used. The sensors may include any one or ones of; a set of one or more laser scanners, a set of one or more radar scanners, and a set of one or more cameras e.g. a single camera or a pair of stereo cameras. A single laser scanner, radar scanner and/or camera may be used. Where the vehicle is associated with a camera or cameras, images obtained from the one or more cameras may be used to construct a three dimensional scene indicative of the environment around the vehicle, and the 3 dimensional point cloud may be obtained using the three dimensional scene. For example, where the vehicle uses a single camera, a point cloud may be determined therefrom by obtaining a sequence of two dimensional images from the camera as the vehicle travels along the navigable element or through the junction, using the sequence of two dimensional images to construct a three dimensional scene, and using the three dimensional scene to obtain the three dimensional point cloud. Where the vehicle is associated with stereo cameras, the images obtained from the cameras may be used to obtain a three dimensional scene which is then used to obtain the three dimensional point cloud.

By transforming the depth map of the localisation reference data into a 3D point cloud, it may be compared to a 3D point cloud obtained through the real time scanning using the vehicle sensor(s), regardless of what they may be. For example, the localisation reference data may be based upon a reference scan using a variety of sensor types, including a laser scanner, camera and radar scanner. A vehicle may or may not have a corresponding set of sensors. For example, typically a vehicle may only include one or more cameras.

The localisation reference data may be used to determine a reference point cloud indicative of the environment around the vehicle which corresponds to a point cloud that would be expected to be generated by the at least one sensor of the vehicle. Where the reference point cloud was obtained using the same type of sensors as those of the vehicle, this may be straightforward, and all of the localisation reference data may be used in constructing the 3D reference point cloud. Similarly, under certain conditions, data sensed by one type of sensor may be similar to that sensed by another. For example, objects sensed by a laser sensor in providing the reference localisation data may be expected to also be sensed by a camera of a vehicle during daylight. However, the method may comprise including only those points in the 3D point cloud that would be expected to be detected by a sensor or sensors of the type associated with the vehicle and/or expected to be detected under current conditions. The localisation reference data may comprise data which enables an appropriate reference point cloud to be generated.

In some embodiments, as described above, each pixel of the localisation reference data further includes at least one channel indicative of a value of a sensed reflectivity. Each pixel may include one or more of; a channel indicative of a value of a sensed laser reflectivity, and a channel indicative of a value of a sensed radar reflectivity. Preferably channels indicative of both radar and laser reflectivity are provided. The step of generating the 3D point cloud based on the localisation reference data is then preferably performed using the sensed reflectivity data. The generation of the 3D point cloud may also be based upon the type of sensor or sensors of the vehicle. The method may comprise using the reflectivity data and data indicative of the type of sensor or sensors of the vehicle to select 3D points for inclusion in the reference 3D point cloud. The data of the reflectivity channel is used to select data from the depth channel for use in generating the 3D point cloud. The reflectivity channel gives an indication of whether a particular object would be sensed by the relevant sensor type (where appropriate, under current conditions).

For example, where the reference data is based upon data obtained from a laser scanner and a radar scanner, and the vehicle has only a radar scanner, the radar reflectivity value may be used to select those points for inclusion in the 3D point cloud that would be expected to be sensed by the radar scanner of the vehicle. In some embodiments each pixel includes a channel indicative of a radar reflectivity, and the method comprises the step of using the radar reflectivity data to generate a 3D reference point cloud that contains only those points that would be sensed by a radar sensor. Where the method further comprises comparing the 3D reference point cloud to a 3D point cloud obtained based on the real time scan data, the 3D point cloud of the real time scan data is then based on data obtained from a radar scanner. The vehicle may include only a radar scanner.

While a vehicle may include radar and/or laser scanners, in many cases, a car may include only a camera or cameras. The laser reflectivity data may provide a way of obtaining a 3D reference point cloud that correlates to a 3D point cloud that would be expected to be sensed by a vehicle having only a camera or cameras as sensors under conditions of darkness. The laser reflectivity data provides an indication of those objects that might be expected to be detected by a camera during the dark. In some embodiments each pixel includes a channel indicative of a laser reflectivity, and the method comprises the step of using the laser reflectivity data to generate a 3D reference point cloud that contains only those points that would be sensed by a camera of a vehicle during conditions of darkness. Where the method further comprises comparing the 3D reference point cloud to a 3D point cloud obtained based on the real time scan data, the 3D point cloud of the real time scan data may then be based on data obtained from a camera under conditions of darkness.

It is believed that obtaining reference localisation data in the form of a three dimensional point cloud, and using such data to reconstruct a reference view, e.g. image which would be expected to be obtained from one or more cameras of a vehicle under the applicable conditions, and which may then be compared to an image obtained by the camera, is advantageous in its own right.

In some embodiments the method may comprise using the generated localisation reference data of the invention in any of its aspects or embodiments in reconstructing a view that would be expected to be obtained from one or more cameras associated with a vehicle travelling along a navigable element of a navigable network or through a junction represented by a digital map under applicable conditions, the method comprising: obtaining localisation reference data associated with the digital map for a deemed current position of the vehicle along a navigable element or junction of the navigable network or at the junction, using the localisation reference data to determine a reference point cloud indicative of the environment around the vehicle, the reference point cloud including a set of first data points in a three-dimensional coordinate system, wherein each first data point represents a surface of an object in the environment; and using the reference point cloud to reconstruct a reference view that would be expected to be obtained by the one or more cameras associated with the vehicle when traversing the navigable element or the junction under the applicable conditions. The method may further comprise determining a real time view of the environment around the vehicle using the one or more cameras, and comparing the reference view to the real time view obtained by the one or more cameras.

In accordance with a further aspect of the invention there is provided a method of reconstructing a view that would be expected to be obtained from one or more cameras associated with a vehicle travelling along a navigable element of a navigable network represented by a digital map under applicable conditions, the method comprising:

obtaining localisation reference data associated with the digital map for a deemed current position of the vehicle along a navigable element of the navigable network, wherein the location reference data comprises at least one depth map indicative of an environment around the vehicle projected on to a reference plane, the reference plane being defined by a reference line associated with the navigable element, each pixel of the at least one depth map being associated with a position in the reference plane associated with the navigable element along which the vehicle is travelling, and the pixel including a depth channel representing the distance to a surface of an object in the environment along a predetermined direction from the associated position of the pixel in the reference plane;

using the localisation reference data to determine a reference point cloud indicative of the environment around the vehicle, the reference point cloud including a set of first data points in a three-dimensional coordinate system, wherein each first data point represents a surface of an object in the environment;

using the reference point cloud to reconstruct a reference view that would be expected to be obtained by the one or more cameras associated with the vehicle when traversing the navigable element under the applicable conditions;

determining a real time view of the environment around the vehicle using the one or more cameras; and comparing the reference view to the real time view obtained by the one or more cameras.

The present invention in accordance with this further aspect may include any or all of the features described in relation to the other aspects of the invention, to the extent that it is not mutually inconsistent therewith.

In accordance with a further aspect of the invention there is provided a method of reconstructing a view that would be expected to be obtained from one or more cameras associated with a vehicle travelling through a junction of a navigable network represented by a digital map under applicable conditions, the method comprising:

obtaining localisation reference data associated with the digital map for a deemed current position of the vehicle along a navigable element of the navigable network, wherein the location reference data comprises at least one depth map indicative of an environment around the vehicle projected on to a reference plane, the reference plane being defined by a reference line defined by a radius centred on a reference point associated with the junction, each pixel of the at least one depth map being associated with a position in the reference plane associated with the junction through which the vehicle is travelling, and the pixel including a depth channel representing the distance to a surface of an object in the environment along a predetermined direction from the associated position of the pixel in the reference plane;

using the localisation reference data to determine a reference point cloud indicative of the environment around the vehicle, the reference point cloud including a set of first data points in a three-dimensional coordinate system, wherein each first data point represents a surface of an object in the environment;

using the reference point cloud to reconstruct a reference view that would be expected to be obtained by the one or more cameras associated with the vehicle when traversing the navigable element under the applicable conditions;

determining a real time view of the environment around the vehicle using the one or more cameras; and comparing the reference view to the real time view obtained by the one or more cameras.

The present invention in accordance with this further aspect may include any or all of the features described in relation to the other aspects of the invention, to the extent that it is not mutually inconsistent therewith.

These aspects of the invention are particularly advantageous in allowing a reference view to be constructed that may be compared to a real time view obtained by the camera(s) of a vehicle, but based upon localisation reference data which may be obtained from different types of sensor. It has been recognised that in practice, many vehicles will only be equipped with a camera or cameras, rather than more specific or sophisticated sensors, such as may be used to obtain the reference data.

In these further aspects and embodiments of the invention, the results of the comparison of the reference and real time views may be used as desired. For example, the results of the comparison may be used in determining the position of the vehicle as in the earlier described aspects and embodiments. The method may comprise calculating a correlation between the real time view and the reference view to determine an alignment offset between the views; and using the determined alignment offset to adjust a deemed current position of the vehicle to determine the position of the vehicle relative to the digital map.

The applicable conditions are those conditions applicable at the current time, and may be a lighting condition. In some embodiments, the applicable condition is a condition of darkness.

The reference view is reconstructed using a 3D reference point cloud that may be obtained from the localisation reference data in accordance with any of the embodiments described above. The step of reconstructing the reference view that would be expected to be obtained by the one or more cameras preferably comprises using data of a reflectivity data channel associated with the pixels of the depth map of the localisation reference data. Preferably, therefore, each pixel of the localisation reference data further includes at least one channel indicative of a value of a sensed laser reflectivity, and the step of generating the 3D point cloud based on the localisation reference data is performed using the sensed laser reflectivity data. The laser reflectivity data may be used to select data from the depth channel for use in generating the reference 3D point cloud to result in the reconstructed reference view corresponding to a view that could be expected to be obtained from the one or more cameras of the vehicle, e.g. including those objects that could be intended to be seen under applicable conditions, e.g. darkness. The one or more cameras of the vehicle may be a single camera, or a pair of stereo cameras, as described above.

The comparison of the real time scan data to the localisation reference data that may be performed in accordance with the invention in its various aspects and embodiments, whether by comparison of depth maps, or through comparison of point clouds, or a reconstructed and real time image, may be performed over a window of data. The window of data is a window of data in the direction of travel e.g. longitudinal data. Thus, windowing the data allows the comparison to take account of a subset of the available data. The comparison may be performed periodically for overlapping windows. At least some overlap in the windows of data used for the comparison is desirable. For example, this may ensure that the differences between neighbouring calculated e.g. longitudinal offset values are smoothed over the data. The window may have a length sufficient for the accuracy of the offset calculation to be invariant to transient features, preferably the length being at least 100 m. Such transient features may be, for example, parked vehicles, overtaking vehicles or vehicles travelling the same route in the opposite direction. In some embodiments, the length is at least 50 m. In some embodiments, the length is 200 m. In this way, the sensed environment data is determined for a stretch (e.g. a longitudinal stretch) of road, the 'window', e.g. 200 m, and the resultant data is then compared to the localisation reference data for the stretch of road. By performing the comparison over a stretch of road of this size, i.e. one that is substantially larger than the length of the vehicle, non-stationary or temporary objects, such as other vehicles on the road, vehicles stopped on the side of the road, etc, will typically not impact the result of the comparison.

At least a portion of the localisation reference data used in accordance with the invention in any of its aspects or embodiments may be stored remotely. Preferably, where a vehicle is involved, at least a portion of the localisation reference data is stored locally on the vehicle. Thus, even though the localisation reference data is available throughout the route, it need not be continually transferred onto the vehicle and the comparison may be performed on the vehicle.

The localisation reference data may be stored in a compressed format. The localisation reference data may have a size that corresponds to 30 KB/km or less.

The localisation reference data may be stored for at least some, and preferably all, of the navigable elements of the navigable network represented in the digital map. Thus, the position of the vehicle can be continually determined anywhere along a route travelled by a vehicle.

In embodiments, the reference localisation data may have been obtained from a reference scan using at least one device located on a mobile mapping vehicle which has previously travelled along the navigable element that is subsequently travelled by a vehicle. Thus, the reference scan may have been acquired using a different vehicle than the current vehicle for which a position is being continually determined. In some embodiments, the mobile mapping vehicle is of a similar design to the vehicle for which the position is being continually determined.

The real time scan data and/or the reference scan data may be obtained using at least one range-finder sensor. The range-finder sensor may be configured to operate along a single axis. The range-finder sensor may be arranged to perform a scan in a vertical axis. When the scan is performed in the vertical axis, distance information for planes at multiple heights is collected, and thus the resultant scan is significantly more detailed. Alternatively, or in addition, the range-finder sensor may be arranged to perform a scan in a horizontal axis.

The range-finder sensor may be a laser scanner. The laser scanner may comprise a laser beam scanned across the lateral environment using mirrors. Additionally, or alternatively, the range-finder sensor may be radar scanner and/or a pair of stereo cameras.

The invention extends to a device, e.g. navigation device, vehicle, etc, having means, such as one or more processors arranged, e.g. programmed, to perform any of the methods described herein.

The steps of generating localisation reference data described herein are preferably performed by a server or other similar computing device.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, the digital map, the localisation reference data and/or the real time scan data.

The methods of the present invention are, in preferred embodiments, implemented by a server or similar computing device. In other words, the methods of the presented invention are preferably computer implemented methods. Thus, in embodiments, the system of the present invention comprises a server or similar computing device comprising the means for carrying out the various steps described, and the method steps described herein are carried out by a server.

The invention further extends to a computer program product comprising computer readable instructions executable to perform or cause a device to perform any of the methods described herein. The computer program product is preferably stored in a non-transitory physical storage medium.

As will be appreciated by those skilled in the art, the aspects and embodiments of the present invention can, and preferably do, include any one or more or all of the preferred and optional features of the invention described herein in respect of any of the other aspects of the invention, as appropriate.

BRIEF DESCRIPTION OF THE DRAWINGS

Embodiments of the invention will now be described, by way of example only, with reference to the accompanying drawings, in which:

FIG. 5 shows a 3D view of data obtained from a laser scanner, while

FIG. 10A shows an example point cloud acquired by a range-finding sensor mounted to a vehicle travelling along a road, while

FIG. 14A shows an exemplary raster image that is a portion of a stretch of localisation reference data;

FIG. 14B shows a bird's eye perspective of the data of FIG. 14A as two separate planes on the left and right of the road;

FIG. 15A shows the fixed longitudinal resolution and variable, e.g. non-linear, vertical and/or depth resolution of the localisation reference data and real time scan data;

FIG. 19A shows a way in which objects may be projected on to a circular depth map at different angular positions;

FIG. 19B shows an orthogonal projection of objects on to a reference plane to provide a depth map;

FIG. 20A shows a reference depth map and a corresponding real time depth map;

FIG. 20B shows a longitudinal correction derived from longitudinal correlation of the reference and real time depth maps;

FIG. 20C shows a lateral correction derived from histogramming differences between pixel depth values for corresponding pixels in the reference and real time depth maps;

FIG. 20D shows how a longitudinal position and then a lateral position of a vehicle on a road may be corrected;

FIGS. 23A and 23B show a method for establishing the position of the vehicle, e.g. in a non-linear environment;

FIGS. 26A, 26B, 26C and 26D show a second example use case in which a reference depth map is used to construct a 3D point cloud or view that is then compared to a 3D scene or view obtained from multiple vehicle cameras or a single vehicle camera;

FIGS. 27A, 27B and 27C show a third example use case in which reflectivity data of a depth map is used to construct a 3D point cloud or view that is then compared to a 3D scene or view obtained from a vehicle camera;

FIG. 32A illustrates a first exemplary method for performing the correlation step in the method of FIG. 30; and FIG. 32B illustrates a second exemplary method for performing the correlation step in the method of FIG. 30.

DETAILED DESCRIPTION OF THE FIGURES

Figure 1:
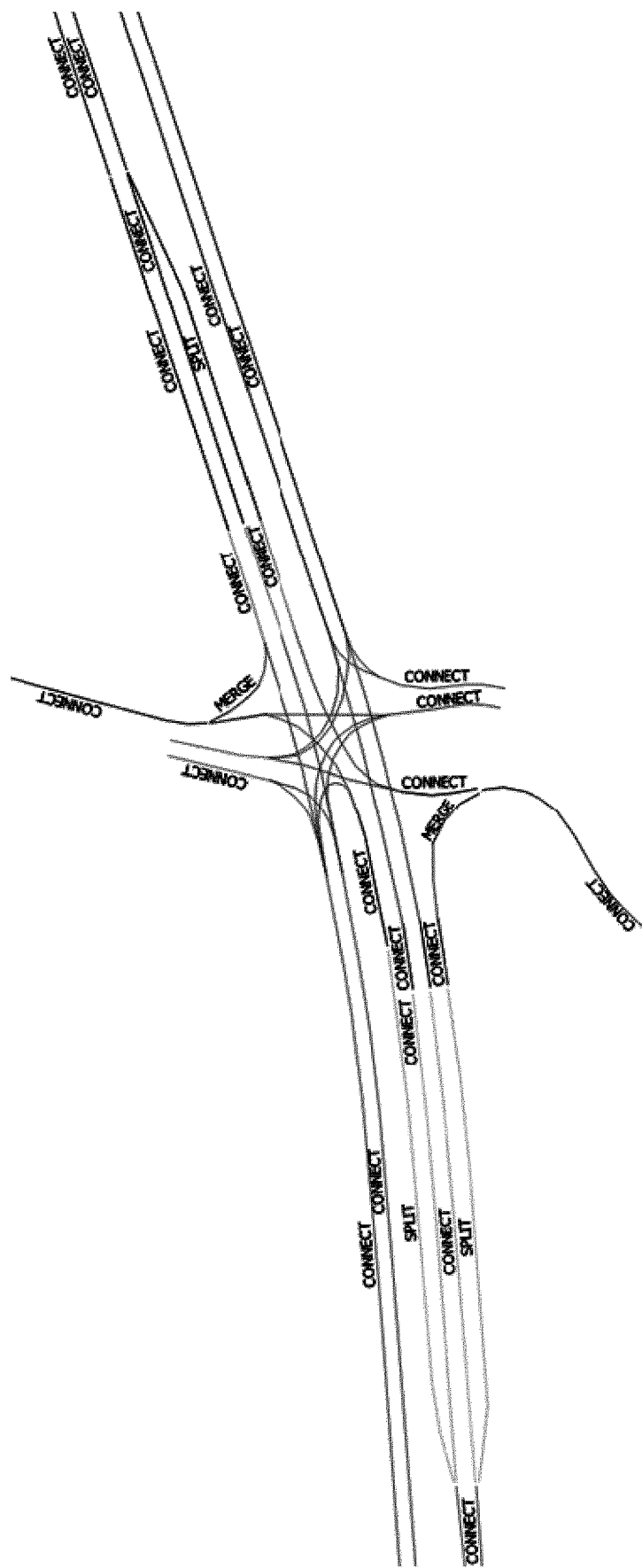
FIG. 1 is a representation of a portion of a planning map.
Figure 2:
FIG. 2 shows a portion of a planning map overlaid on an image of a road network.

It has been recognised that an improved method for determining the position of a device, such as a vehicle, relative to a digital map (representative of a navigable network, e.g. road network) is required. In particular, it is required that the longitudinal position of the device relative to the digital map can be accurately determined, e.g. to sub-metre accuracy. The term "longitudinal" in this application refers to the direction along the portion of a navigable network on which the device, e.g. vehicle, is moving; in other words along the length of the road on which the vehicle is travelling. The term "lateral" in this application takes its normal meaning as being perpendicular to the longitudinal direction, and thus refers to the direction along the width of the road.

As will be appreciated, when the digital map comprises a planning map as described above, e.g. a three dimensional vector model with each lane of a road being representative separately (in contrast to relative to a centre line for the road as in standard maps), the lateral position of the device, e.g. vehicle, simply involves determining the lane in which the device is currently travelling. Various techniques are known for performing such a determination. For example, the determination can be made only using information obtained from the global navigation satellite system (GNSS) receiver. Additionally or alternatively, information from a camera, laser or other imaging sensor associated with the device can be used; for example substantial research has been carried out in recent years, in which image data from one or more video cameras mounted within a vehicle is analysed, e.g. using various image processing techniques, to detect and track the lane in which the vehicle is travelling. One exemplary technique is set out in the paper "Multi-lane detection in urban driving environments using conditional random fields" authored by Junhwa Hur, Seung-Nam Kang, and Seung-Woo Seo. published in the proceedings of the Intelligent Vehicles Symposium, page 1297-1302. IEEE, (2013). Here, the device may be provided with a data feed from a video camera, radar and/or LIDAR sensor and an appropriate algorithm is used to process the received data in real-time to determine a current lane of the device or the vehicle in which the device is travelling. Alternatively, another device or apparatus, such as a Mobileye system available from Mobileye N.V. may provide the determination of the current lane of the vehicle on the basis of these data feeds and then feed the determination of the current lane to the device, for example by a wired connection or a Bluetooth connection.

In embodiments, the longitudinal position of the vehicle can be determined by comparing a real-time scan of the environment around the vehicle, and preferably on one or both sides of the vehicle, to a reference scan of the environment that is associated with the digital map. From this comparison, a longitudinal offset, if any, can be determined, and the position of the vehicle matched to the digital map using the determined offset. The position of the vehicle relative to the digital map can therefore always be known to a high degree of accuracy.

The real-time scan of the environment around the vehicle can be obtained using at least one range-finder sensor that are positioned on the vehicle. The at least one range-finder sensor can take any suitable form, but in preferred embodiments comprises a laser scanner, i.e. a LIDAR device. The laser scanner can be configured to scan a laser beam across the environment and to create a point cloud representation of the environment; each point indicating the position of a surface of an object from which the laser is reflected. As will be appreciated, the laser scanner is configured to record the time it takes for the laser beam to return to the scanner after being reflected from the surface of an object, and the recorded time can then be used to determine the distance to each point. In preferred embodiments, the range-finder sensor is configured to operate along a single axis so as to obtain data within a certain acquisition angle, e.g. between 50-90°, such as 70°; for example when the sensor comprises a laser scanner the laser beam is scanned using mirrors within the device.

Figure 7:
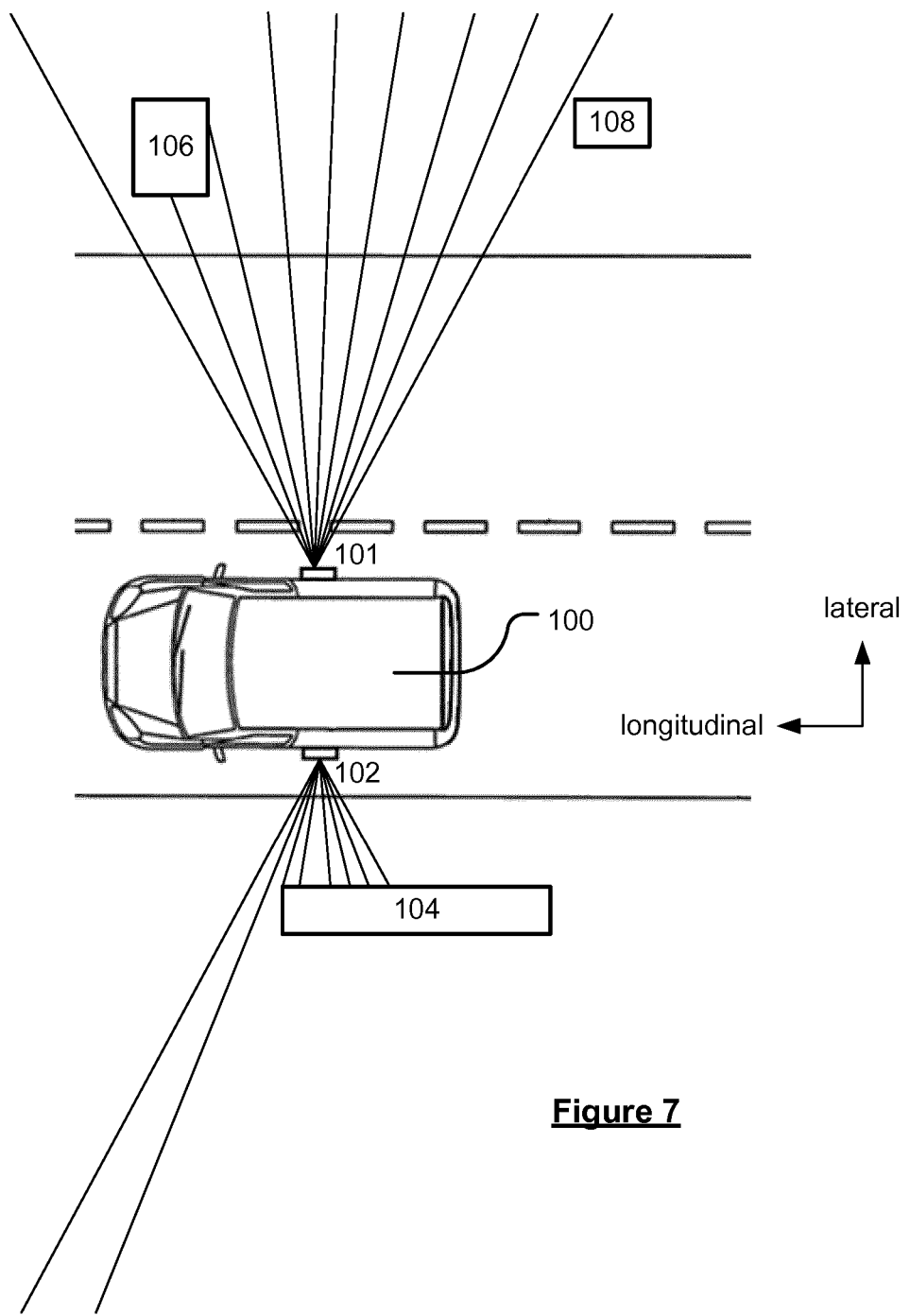
FIG. 7 shows a vehicle, in accordance with an embodiment, travelling along a road while sensing its surroundings.

An embodiment is shown in FIG. 7 in which a vehicle 100 is travelling along a road. The vehicle is equipped with a range-finder sensor 101, 102 positioned on each side of the vehicle. While a sensor is shown on each side of the vehicle, in other embodiments only a single sensor can be used on one side of the vehicle. Preferably, the sensors are suitably aligned such that the data from each sensor can be combined, as is discussed in more detail below.

WO 2011/146523 A2 provides examples of scanners which may be used on a vehicle for capturing reference data in the form of a 3 dimensional point cloud, or which could also be used on an autonomous vehicle to obtain real time data relating to the surrounding environment.

Figure 6:
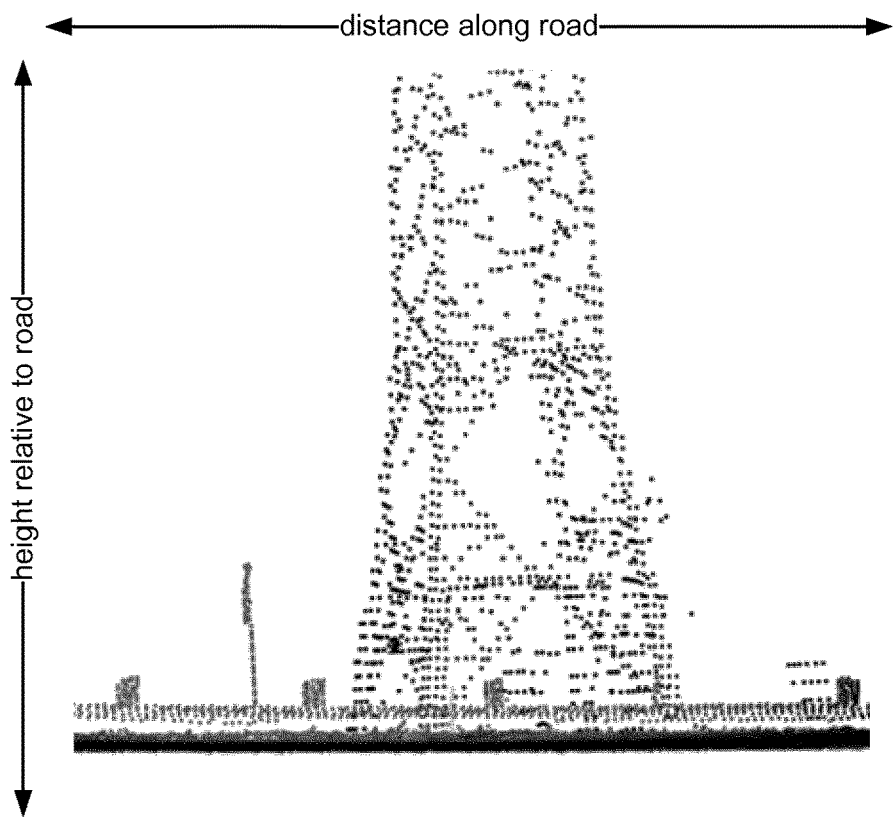
FIG. 6 shows a side view projection of the data obtained from the laser scanner.
Figure 8:
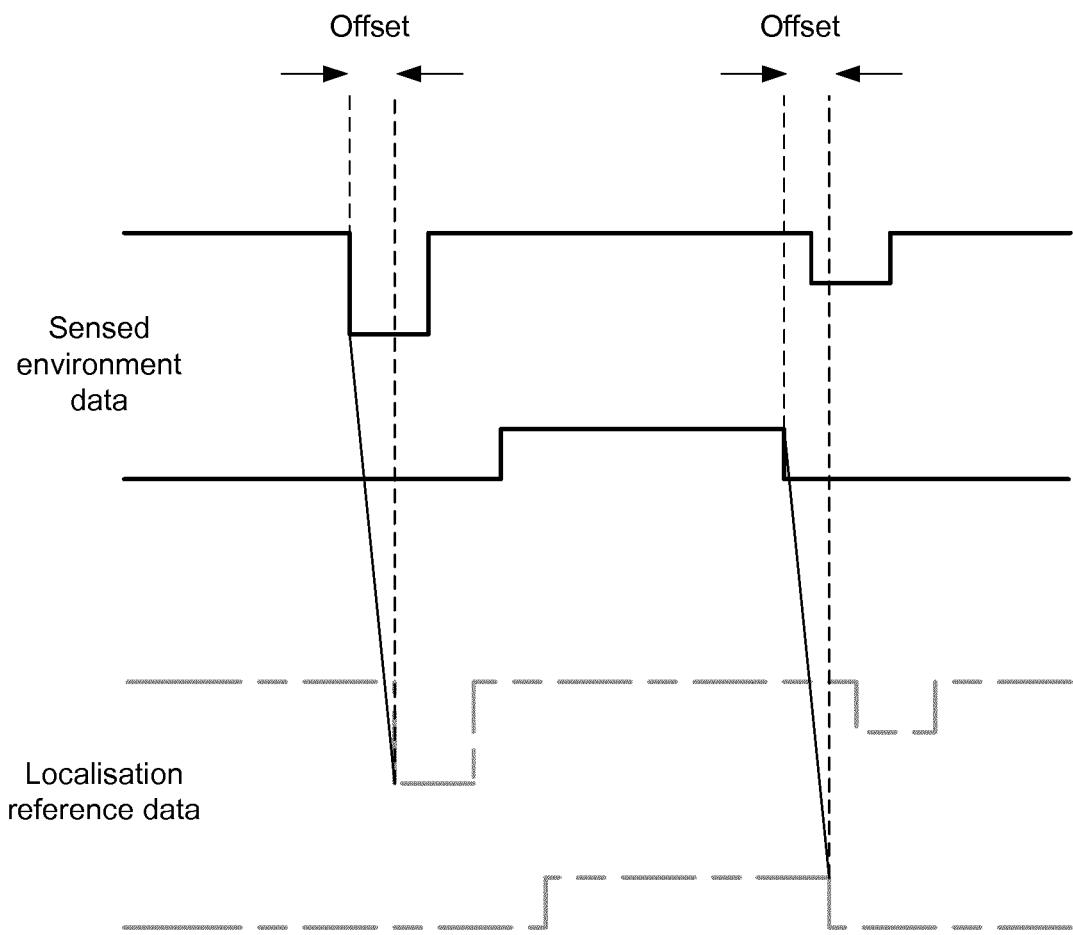
FIG. 8 shows a comparison of localisation reference data compared to sensed environment data, e.g. as collected by the vehicle of FIG. 7.

As discussed above, the range-finder sensor(s) can be arranged to operate along a single axis. In one embodiment, the sensor can be arranged to perform a scan in a horizontal direction, i.e. in a plane parallel to the surface of the road. This is shown, for example, in FIG. 7. By continually scanning the environment as the vehicle travels along the road, sensed environment data as shown in FIG. 8 can be collected. The data 200 is the data collected from the left sensor 102, and shows the object 104. The data 202 is the data collected from the right sensor 101, and shows the objects 106 and 108. In other embodiments, the sensor can be arranged to perform a scan in a vertical direction, i.e. in a plane perpendicular to the surface of the road. By continually scanning the environment as the vehicle travels along the road, it is possible to collect environment data in the manner of FIG. 6. As will be appreciated, by performing a scan in the vertical direction, distance information for planes at multiple heights is collected, and thus the resultant scan is significantly more detailed. It will of course be appreciated that the scan could be performed along any axis as desired.

The reference scan of the environment is obtained from one or more vehicles that have previously travelled along the road, and which is then appropriately aligned and associated with the digital map. The reference scans are stored in a database, which is associated with the digital map, and are referred to herein as localisation reference data. The combination of the localisation reference data when matched to a digital map can be referred to as a localisation map. As will be appreciated, the localisation map will be created remotely from the vehicles; typically by a digital map making company such as TomTom International B.V. or HERE, a Nokia company.

Figure 3:
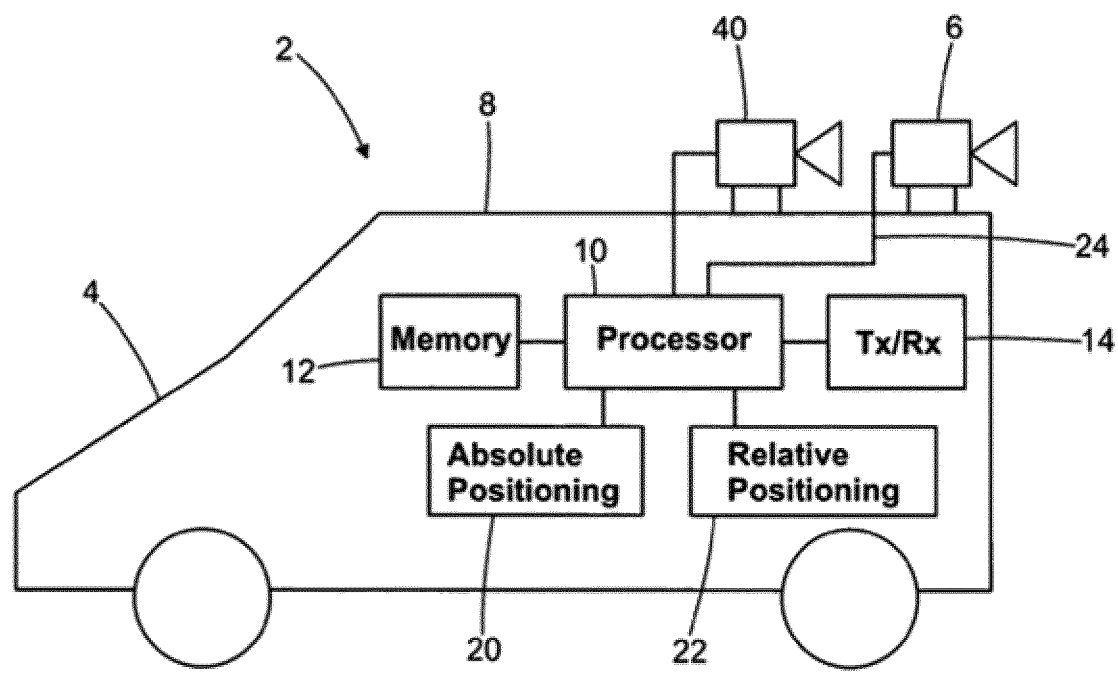
FIGS. 3 and 4 show an exemplary mobile mapping system that can be used to collect data for building maps.
Figure 4:
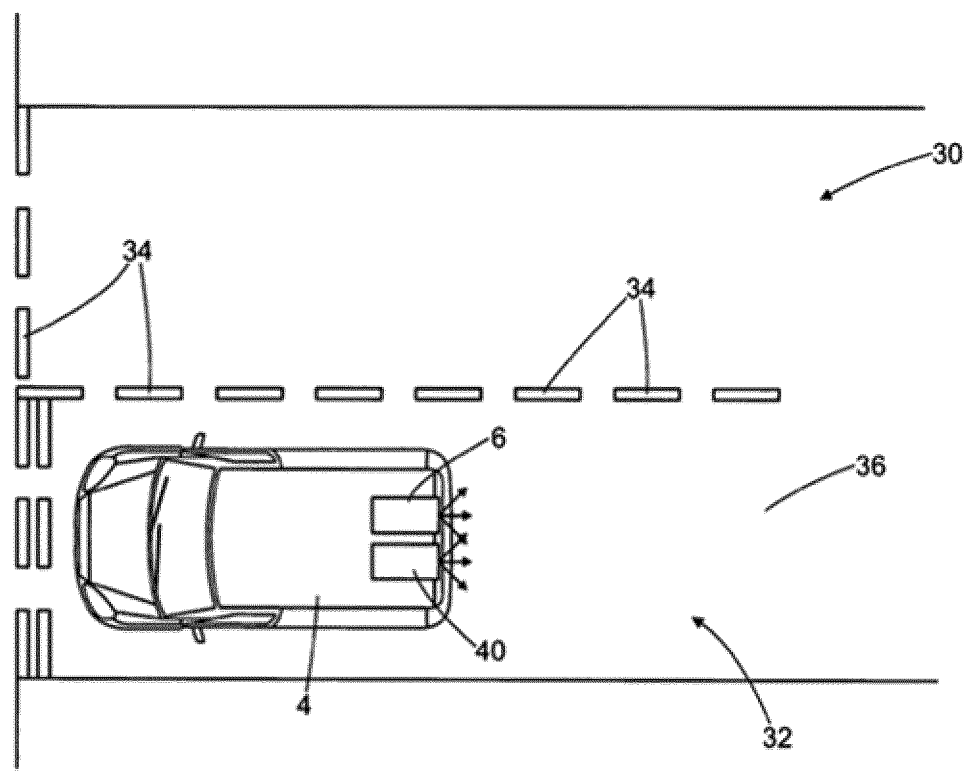
Figure 5:
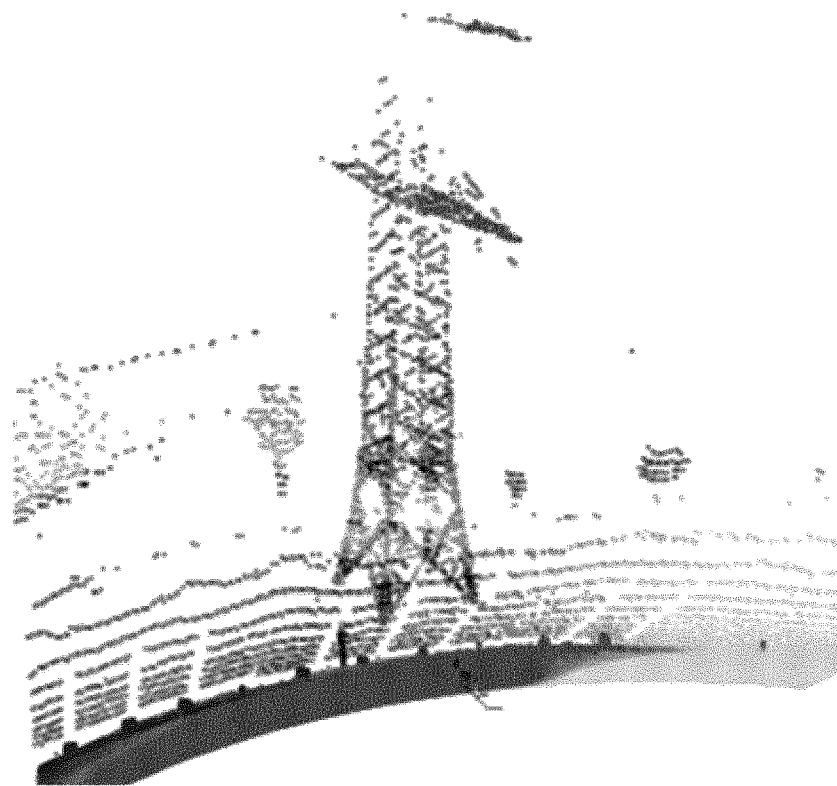

The reference scans can be obtained from specialist vehicles, such as mobile mapping vehicles, e.g. as shown in FIG. 3. In preferred embodiments, however, the reference scans can be determined from the sensed environment data that is collected by vehicles as they travel along the navigable network. This sensed environment data can be stored and periodically sent to the digital mapping company to create, maintain and update the localisation map.

The localisation reference data is preferably stored locally at the vehicle, although it will be appreciated that the data could be stored remotely. In embodiments, and particularly when the localisation reference data is stored locally, the data is stored in a compressed format.

In embodiments, localisation reference data is collected for each side of a road in the road network. In such embodiments, the reference data for each side of the road can be stored separately, or alternatively they can be stored together in a combined data set.

In embodiments, the localisation reference data can be stored as image data. The image data can be colour, e.g. RGB, images, or greyscale images.

Figure 9:
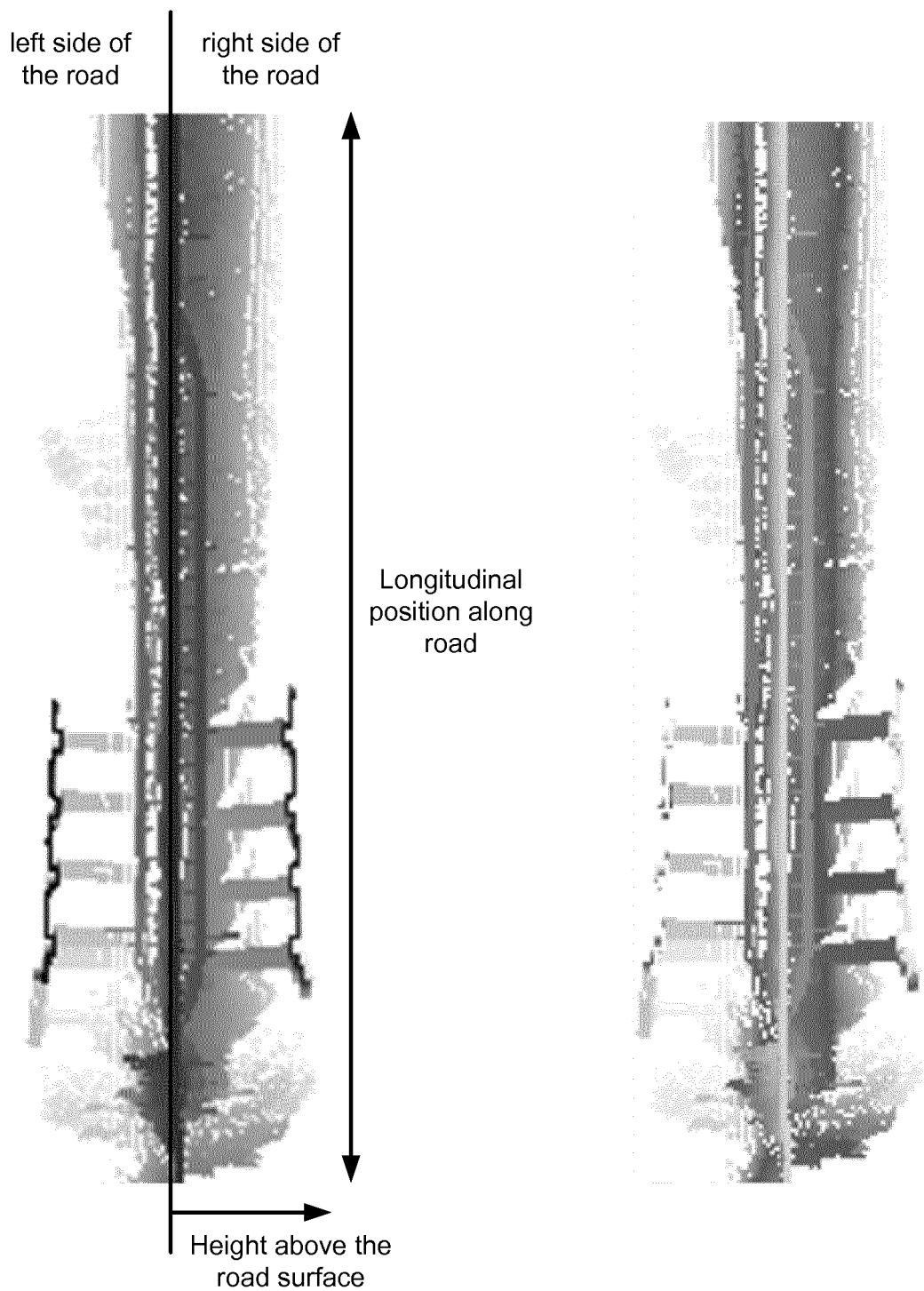
FIG. 9 shows an exemplary format of how localisation reference data can be stored.

FIG. 9 shows an exemplary format of how the localisation reference data can be stored. In this embodiment, the reference data for the left side of the road is provided on the left side of the image, and the reference data for the right side of the road is provided on the right side of the image; the data sets being aligned such that the left-side reference data set for a particular longitudinal position is shown opposite the right-side reference data set for the same longitudinal position.

In the image of FIG. 9, and for illustrative purposes only, the longitudinal pixel size is 0.5 m, there are 40 pixels on each side of the centreline. It has also been determined that the image can be stored as grayscale images, rather than the colour (RGB) images. By storing images in this format, the localisation reference data has a size that corresponds to 30 KB/km.

Figure 10A:
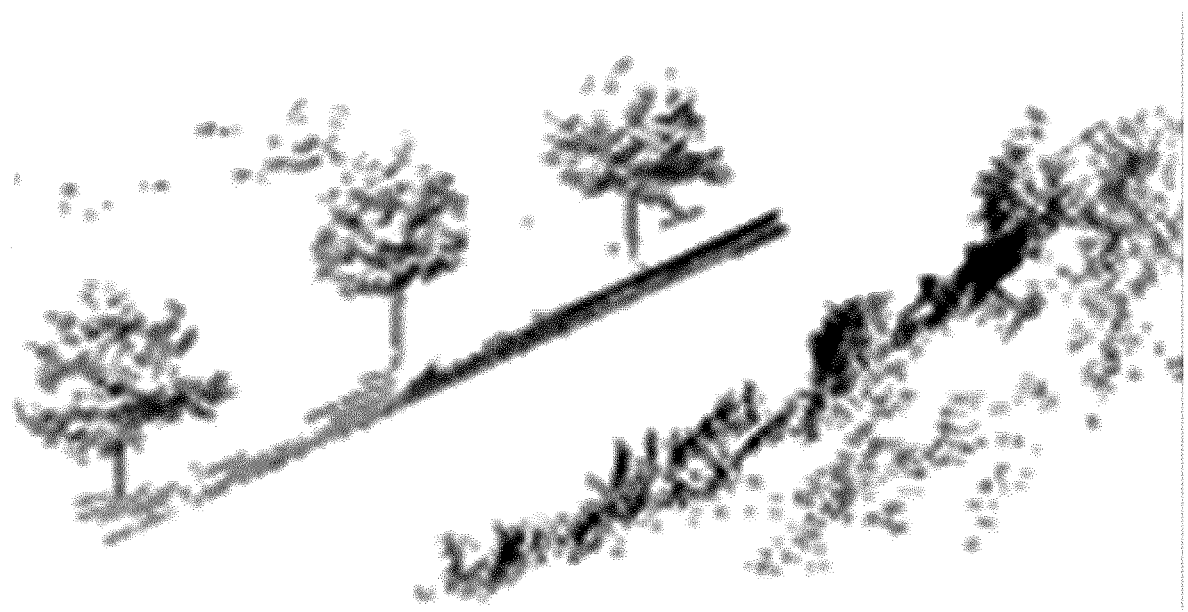
Figure 10B:
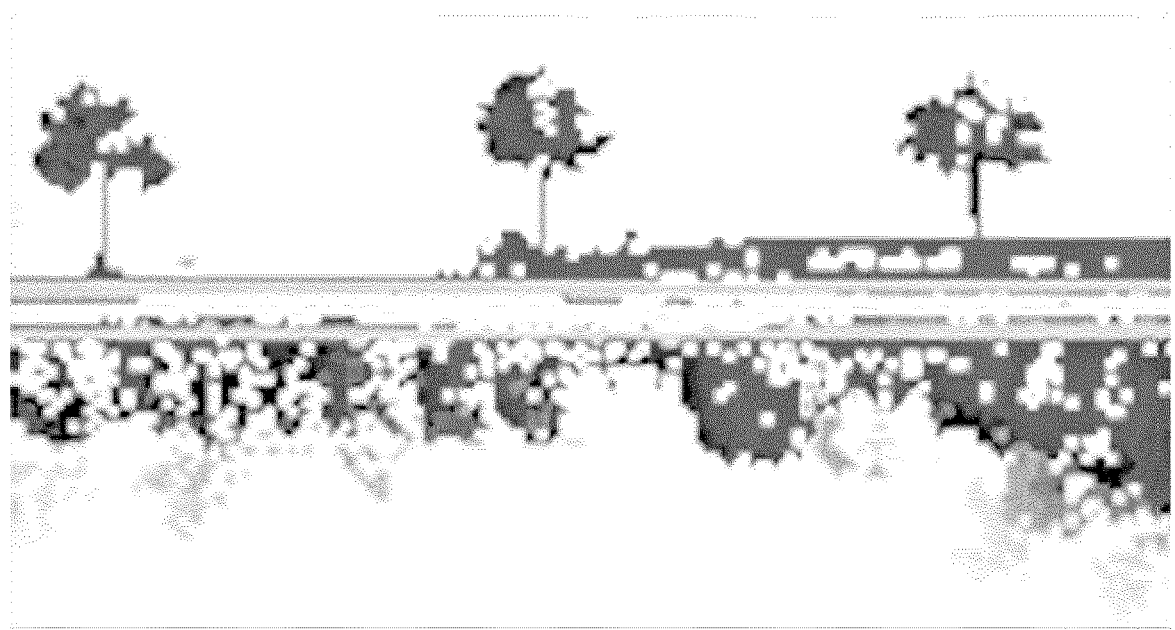
FIG. 10B shows this point cloud data having been converted into two depth maps.

A further example can be seen in FIGS. 10A and 10B. FIG. 10A shows an example point cloud acquired by a range-finding sensor mounted to a vehicle travelling along a road. In FIG. 10B, this point cloud data has been converted into two depth maps; one for the left side of the vehicle and the other for the right side of the vehicle, which have been placed next to each to form a composite image.

As discussed above, the sensed environment data determined by a vehicle is compared to the localisation reference data to determine if there is an offset. Any determined offset can then be used to adjust the position of the vehicle such that it accurately matched to the correct position on the digital map. This determined offset is referred to herein as a correlation index.

In embodiments, the sensed environment data is determined for a longitudinal stretch of road, e.g. 200 m, and the resultant data, e.g. image data, then compared to the localisation reference data for the stretch of road. By performing the comparison over a stretch of road of this size, i.e. one that is substantially larger than the length of the vehicle, non-stationary or temporary objects, such as other vehicles on the road, vehicles stopped on the side of the road, etc, will typically not impact the result of the comparison.

The comparison is preferably performed by calculating a cross-correlation between the sensed environment data and the localisation reference data, so as to determine the longitudinal positions at which the data sets are most aligned. The difference between the longitudinal positions of both data sets at maximum alignment allows the longitudinal offset to be determined. This can be seen, for example, by the offset indicated between the sensed environment data and localisation reference data of FIG. 8.

Figure 11:
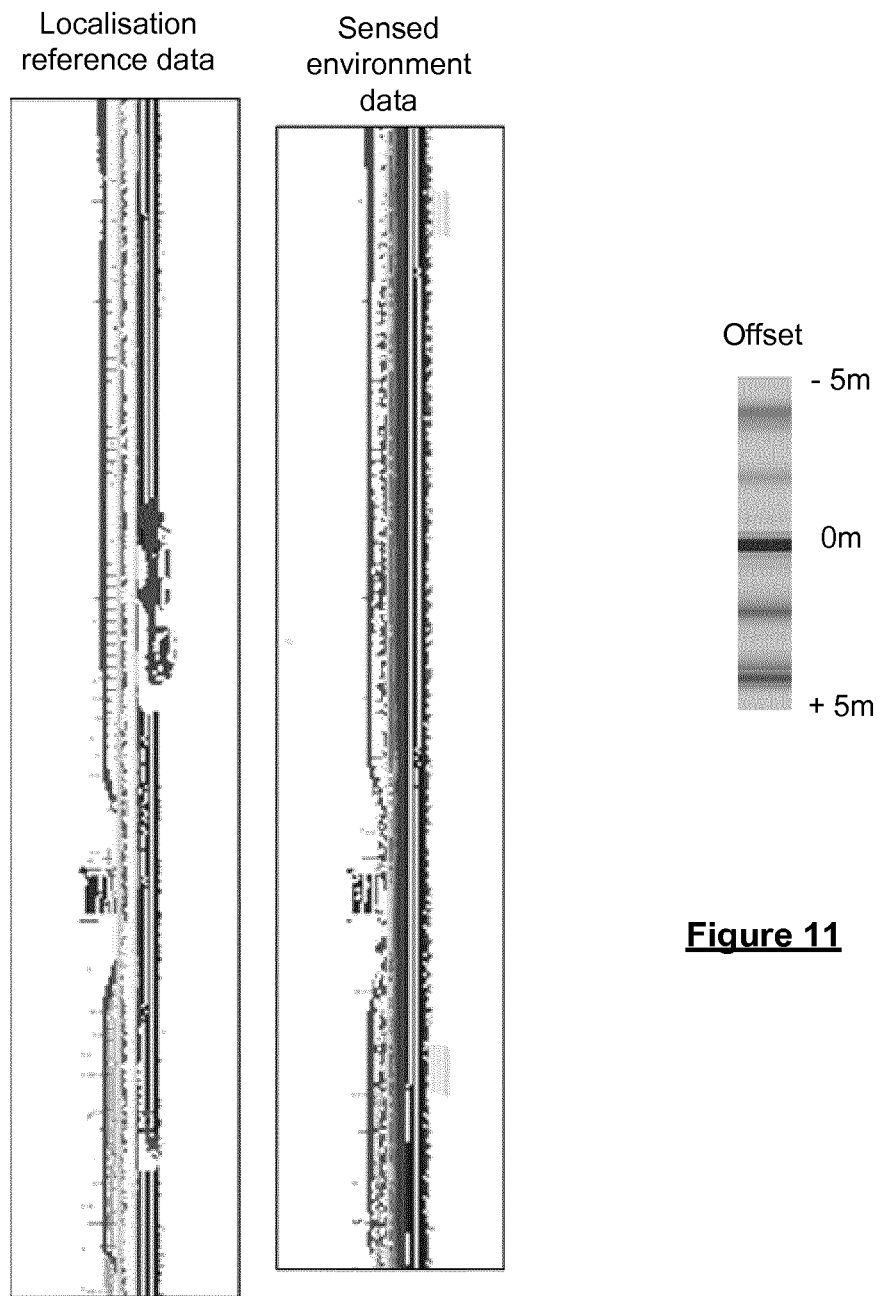
FIG. 11 shows the offset determined following a normalised cross-correlation calculation in an embodiment.

In embodiments, when the data sets are provided as images, the cross-correlation comprises a normalised cross-correlation operation, such that differences in brightness, lighting conditions, etc between the localisation reference data and the sensed environment data can be mitigated. Preferably, the comparison is performed periodically for overlapping windows, e.g. of 200 m lengths, so that any offset is continually determined as the vehicle travels along the road. FIG. 11 shows the offset determined, in an exemplary embodiment, following a normalised cross-correlation calculation between the depicted localisation reference data and the depicted sensed environment data.

Figure 12:
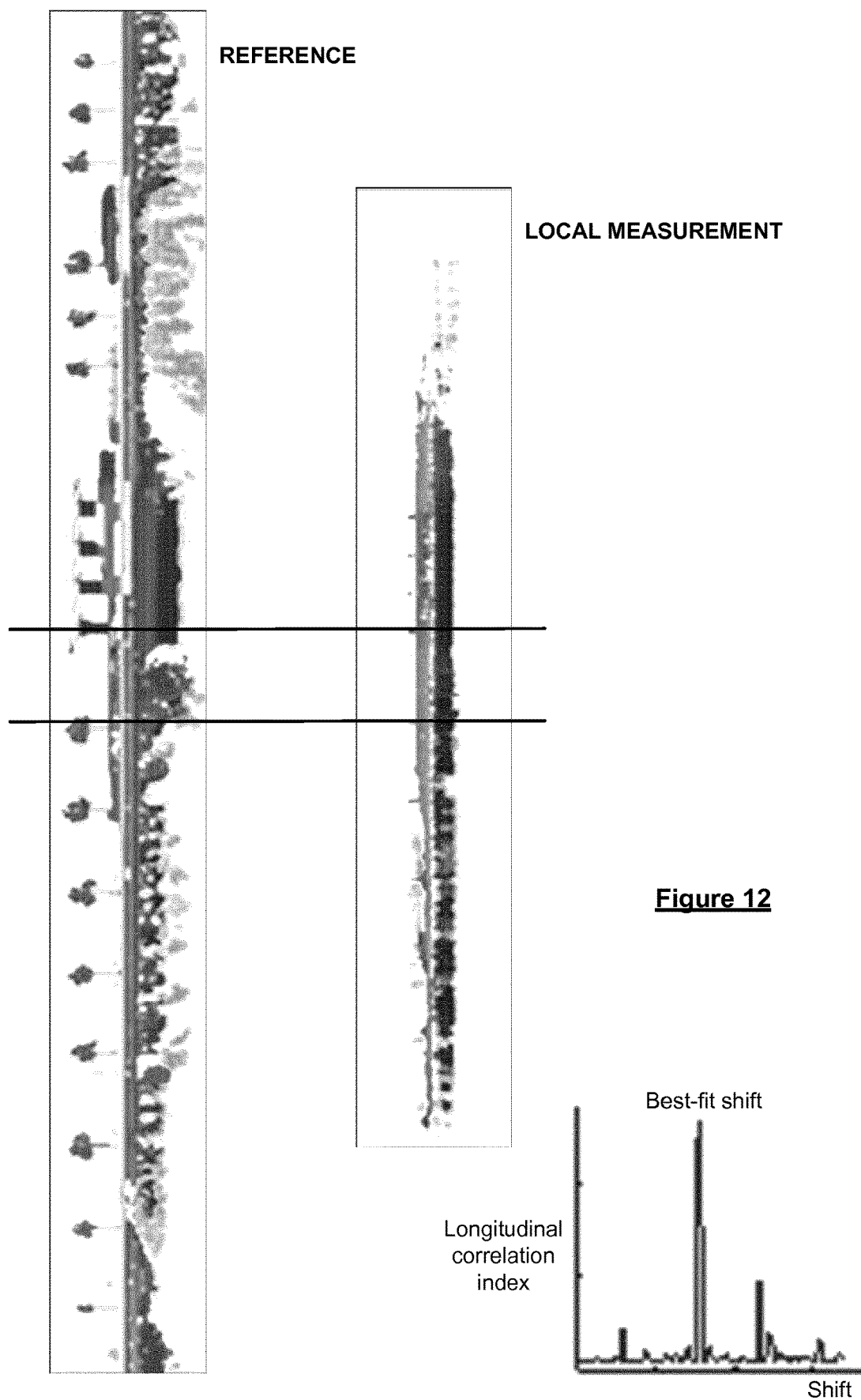
FIG. 12 shows another example of a correlation performed between a "reference" data set and a "local measurement" data set.

FIG. 12 illustrates a further example of a correlation performed between a "reference" data set and a "local measurement" data set (that is acquired by a vehicle as it travels along a road). The result of the correlation between the two images can be seen in the graph of "shift" against "longitudinal correlation index", wherein the position of the largest peak is used to determine the illustrated best-fit shift, which can then be used to adjust the longitudinal position of the vehicle relative to the digital map.

As can be seen from FIGS. 9, 10B, 11 and 12, the localisation reference data and the sensed environment data preferably are in the form of depth maps, wherein each element (e.g. pixel when the depth map is stored as an image) comprises: a first value indicative of a longitudinal position (along a road); a second value indicative of an elevation (i.e. a height above ground); and a third value indicative of a lateral position (across a road). Each element, e.g. pixel, of the depth map therefore effectively corresponds to a portion of a surface of the environment around the vehicle. As will be appreciated, the size of the surface represented by each element, e.g. pixel, will change with the amount of compression, such that an element, e.g. pixel, will represent a larger surface area with a higher level of compression of the depth map (or image).

In embodiments, wherein the localisation reference data is stored in a data storage means, e.g. memory, of the device, the comparison step can be performed on one or more processors within the vehicle. In other embodiments, wherein the localisation reference data is stored remotely from the vehicle, the sensed environment data can be sent to a server over a wireless connection, e.g. via the mobile telecommunications network. The server, which has access to the localisation reference data, would then return any determined offset back to the vehicle, e.g. again using the mobile telecommunications network.

Figure 13:
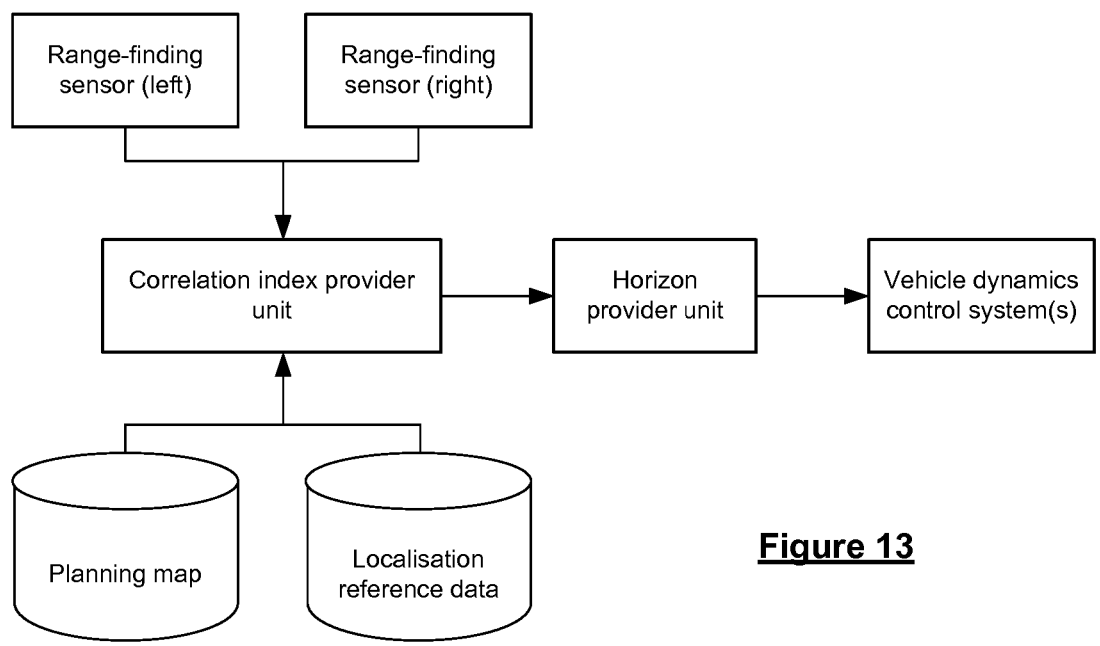
FIG. 13 shows an system positioned within a vehicle according to an embodiment.

An exemplary system, according to an embodiment of the invention, that is positioned within a vehicle is depicted in FIG. 13. In this system, a processing device referred to as a correlation index provider unit receives a data feed from a range-finding sensor positioned to detect the environment on the left side of the vehicle and a range-finding sensor positioned to detect the environment on the right side of the vehicle. The processing device also has access to a digital map (that is preferably in the form of a planning map) and a database of location reference data, which is suitably matched to the digital map. The processing device is arranged to perform the method described above, and thus to compare the data feed from the range-finding sensors, optionally after converting the data feed into a suitable form, e.g. an image data combining the data from both sensors, to localisation reference data to determine a longitudinal offset and thus accurate position the vehicle relative to the digital map. The system also comprises a horizon provider unit, and which uses the determined position of the vehicle and data within the digital map to provide information (referred to as a "horizon data") concerning the upcoming portion of the navigable network that the vehicle is about to traverse. This horizon data can then be used to control one or more systems within the vehicle to perform various assisted or automated driving operations, e.g. adaptive cruise control, automatic lane changing, emergency brake assistance, etc.

In summary, the invention relates, at least in preferred embodiments, to a positioning method based on longitudinal correlation. The 3D space around a vehicle is represented in the form of two depth maps, covering both the left and right sides of the road, and which may be combined into a single image. Reference images stored in a digital map are cross-correlated with the depth maps derived from lasers or other range-finding sensors of the vehicle to position the vehicle precisely along (i.e. longitudinally) the representation of the road in the digital map. The depth information can then be used, in embodiments, to position the car across (i.e. laterally) the road.

In a preferred implementation, the 3D space around a vehicle is projected to two grids parallel to road trajectory and the values of projections are averaged within each cell of the grid. A pixel of the longitudinal correlator depth map has dimensions of about 50 cm along the driving direction and about 20 cm height. The depth, coded by pixel value, is quantized with about 10 cm. Although the depth map image resolution along the driving direction is 50 cm, the resolution of positioning is much higher. The cross-correlated images represent a grid in which the laser points are distributed and averaged. Proper up-sampling enables finding shift vectors of sub-pixel coefficients. Similarly, the depth quantization of about 10 cm does not imply 10 cm precision of positioning across the road as the quantization error is averaged over all of the correlated pixels. In practice, therefore, the precision of positioning is limited mostly by laser precision and calibration, with only very little contribution from quantization error of longitudinal correlator index.

Accordingly, it will be appreciated, that the positioning information, e.g. the depth maps (or images), is always available (even if no sharp objects are available in the surroundings), compact (storing whole world's road network is possible), and enables precision comparable or even better than other approaches (due to its availability at any place and therefore high error averaging potential).

FIG. 14A shows an exemplary raster image that is a portion of a stretch of location reference data. The raster image is formed by the orthogonal projection of collected 3D laser point data onto a hyperplane defined by a reference line and oriented perpendicular to the road surface. Due to the orthogonality of projection any height information is independent on the distance from the reference line. The reference line itself typically runs parallel to the lane/road boundaries. The actual representation of the hyperplane is a raster format with has fixed horizontal resolution and non-linear vertical resolution. This method aims to maximize the information density on those heights which are important for detection by vehicle sensors. Experiments have shown that 5-10 m of height of the raster plane is sufficient to capture enough relevant information necessary for later use in vehicle localization. Each individual pixel in the raster reflects a group of laser measurements. Just like for the vertical resolution, the resolution in the depth information is also represented in a non-linear way, but typically stored in 8 bit values (i.e. as a value from 0 to 255). FIG. 14A shows the data for both sides of the road. FIG. 14B shows a bird's eye perspective of the data of FIG. 14A as two separate planes on the left and right of the road.

As discussed above, vehicles equipped with front or side-mounted horizontally mounted laser scanner sensors are able to generate, in real time, 2D planes similar to those of the localisation reference data. Localisation of the vehicle relative to the digital map is achieved by the correlation in image space of the a priori mapped data with the real-time sensed and processed data. Longitudinal vehicle localisation is obtained by applying an average non-negative normalized cross-correlation (NCC) operation calculated in overlapping moving windows on images with 1 pixel blur in the height domain and a Sobel operator in the longitudinal domain.

FIG. 15A shows the fixed longitudinal resolution and variable, e.g. non-linear, vertical and/or depth resolution of the localisation reference data and real time scan data. Thus, while the longitudinal distance represented by the value a, b and c is the same, the height range represented by the values D, E and F are different. In particular, the height range represented by D is less than that represented by E, and the height range represented by E is less than that represented by F. Similarly, depth range represented by the value 0, i.e. surfaces closest to the vehicle, is less than that represented by the value 100, and the depth range represented by the value 100 is less than that represented by the value 255, i.e. surfaces furthest away from the vehicle. For example, the value 0 can represent 1 cm in depth, while the value 255 can represent 10 cm in depth.

Figure 15B:
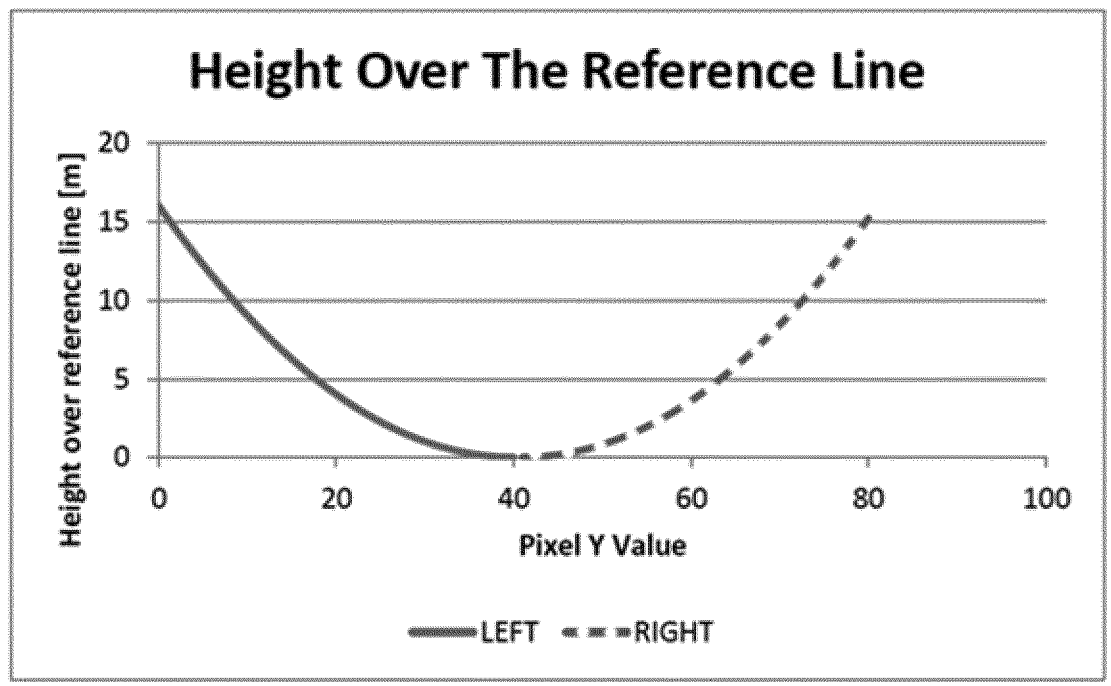
FIG. 15B shows a function that maps heights above a reference line to pixel Y coordinate values.

FIG. 15B illustrates how the vertical resolution may vary. In this example, the vertical resolution varies based on a non-linear function that maps heights above the reference line to pixel Y coordinate values. As is shown in FIG. 15B, pixels closer to the reference line, which is at Y equals 40 in this example, represent lower heights. As is also shown in FIG. 15B, the vertical resolution is greater closer to the reference line, i.e. the change in height with respect to pixel position is lesser for pixels which are closer to the reference line and is greater for pixels which are further from the reference line.

Figure 15C:
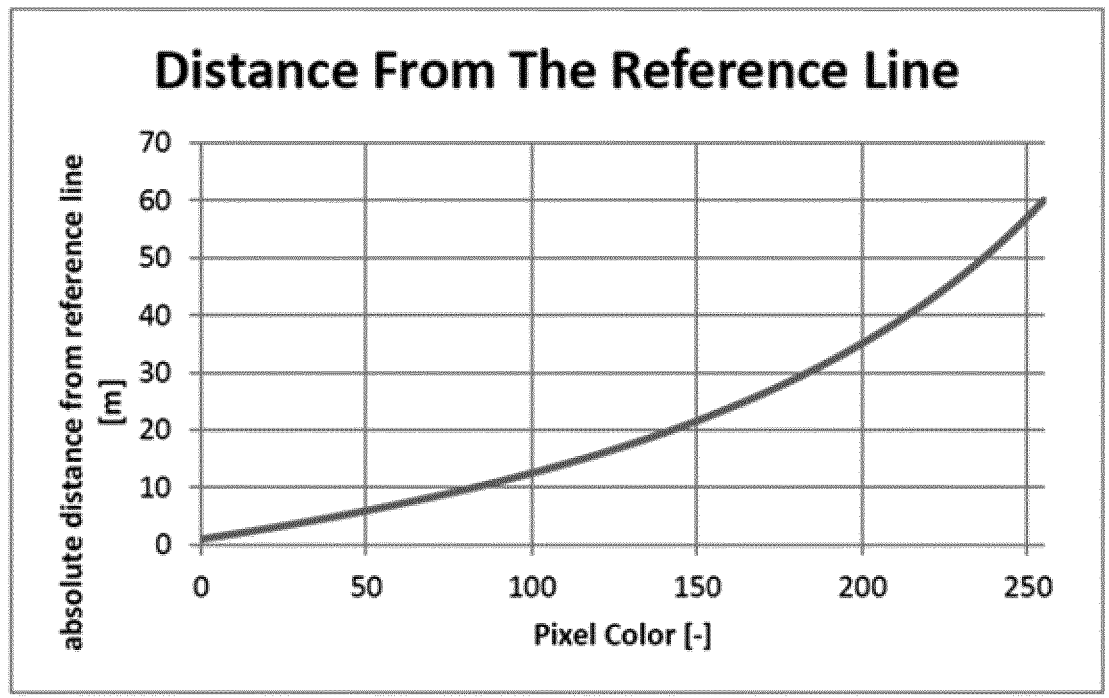
FIG. 15C shows a function that maps distances from a reference line to pixel depth values.

FIG. 15C illustrates how the depth resolution may vary. In this example, the depth resolution varies based on a non-linear function that maps distances from the reference line to pixel depth (colour) values. As is shown in FIG. 15C, lower pixel depth values represent shorter distances from the reference line. As is also shown in FIG. 15C, the depth resolution is greater at lower pixel depth values, i.e. the change in distance with respect to pixel depth value is lesser for lower pixel depth values and is greater for higher pixel depth values.

Figure 15D:
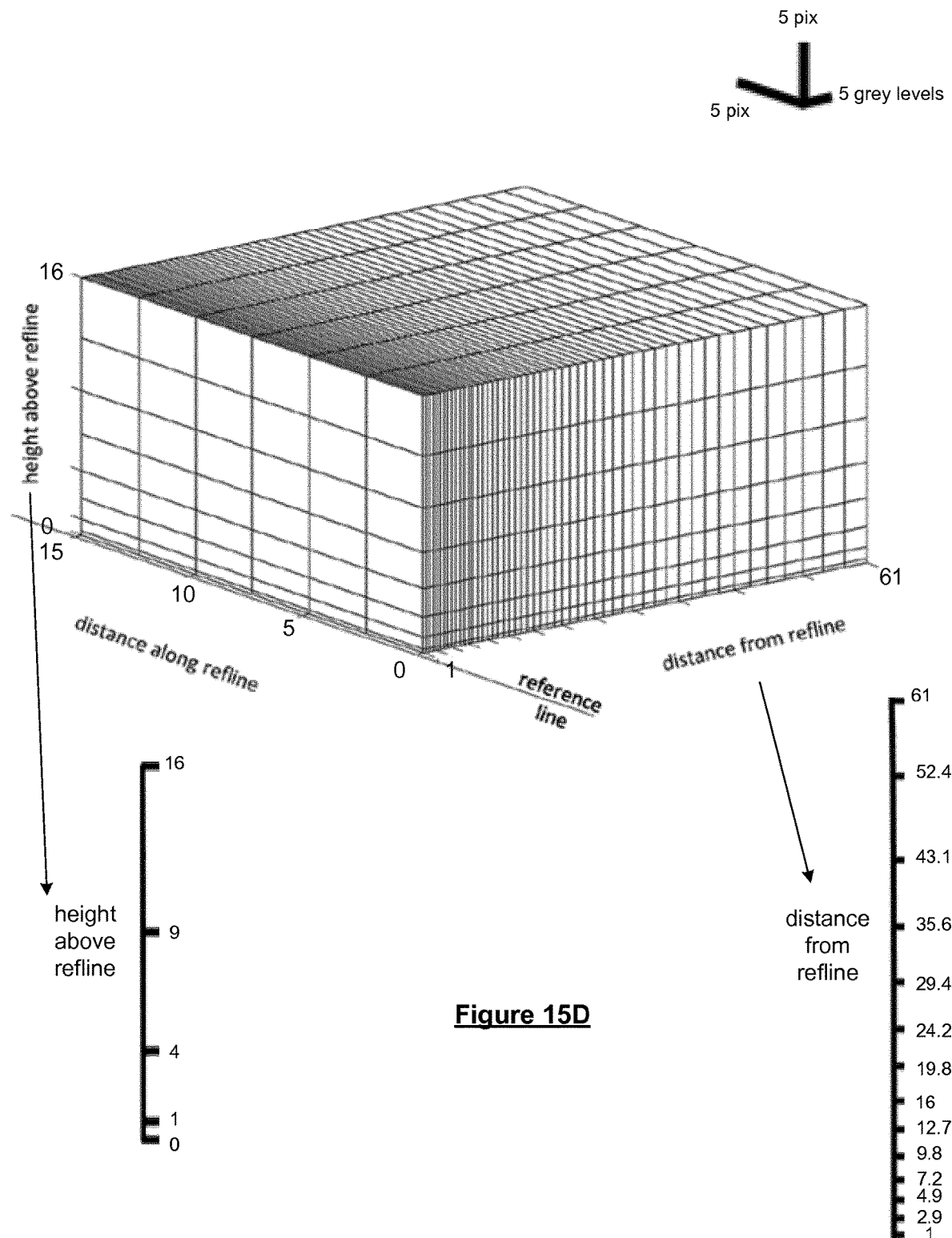
FIG. 15D shows the fixed longitudinal pixel resolution, variable vertical pixel resolution, and variable depth value resolution in a three dimensional plot.

FIG. 15D illustrates how a subset of pixels may map to distances along the reference line. As is shown in FIG. 15D, each pixel along the reference line is the same width such that the longitudinal pixel resolution is fixed. FIG. 15D also illustrates how the subset of pixels may map to heights above the reference line. As is shown in FIG. 15D, the pixels become progressively wider at greater distances away from the reference line, such that the vertical pixel resolution is lower at greater heights above the reference line. FIG. 15D also illustrates how a subset of pixel depth values may map to distances from the reference line. As is shown in FIG. 15D, the distances covered by the pixel depth values become progressively wider at greater distances away from the reference line, such that the depth resolution is lower at depth distances further from the reference line.

Some further embodiments and features of the invention will now be described.

Figure 16A:
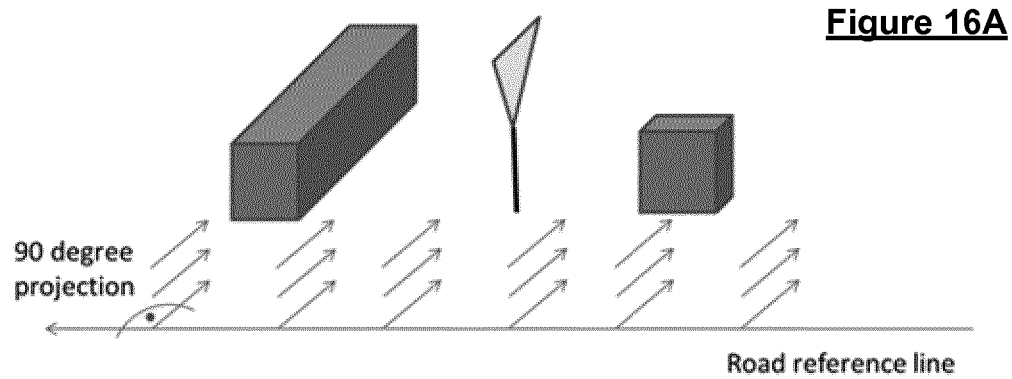
FIG. 16A shows an orthogonal projection on to a reference plane defined by a reference line associated with a road element.
Figure 16B:
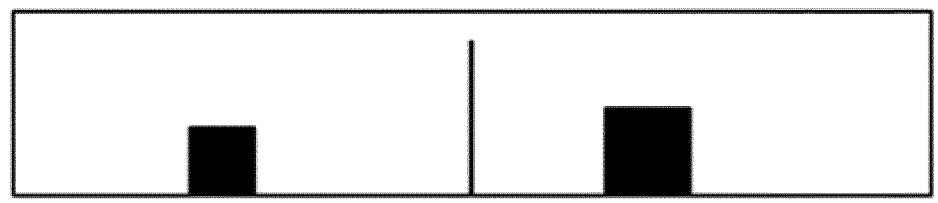
FIG. 16B shows a side depth map obtained using an orthogonal projection.

As described in relation to FIG. 14A, a depth map, e.g. raster image, of the localisation reference data, may be provided by an orthogonal projection on to a reference plane defined by a reference line associated with a road element. FIG. 16A illustrates the result of using such a projection. The reference plane is perpendicular to the road reference line shown. Here, although the height information is independent of distance from the reference line, which may provide some advantages, one limitation of the orthogonal projection is that information relating to surfaces perpendicular to the road element may be lost. This is illustrated by the side depth map of FIG. 16B obtained using the orthogonal projection.

Figure 16C:
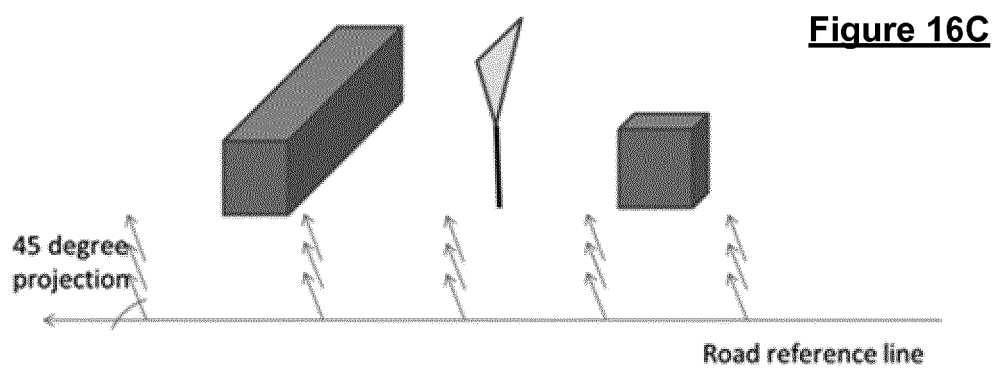
FIG. 16C shows a non-orthogonal projection on to a reference plane defined by a reference line associated with a road element.
Figure 16D:
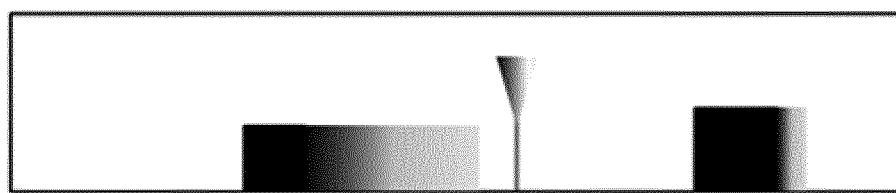
FIG. 16D shows a side depth map obtained using a non-orthogonal projection.

If a non-orthogonal projection is used, e.g. at 45 degrees, then such information relating to surfaces perpendicular to the road element may be preserved. This is shown by FIGS. 16C and 16D. FIG. 16C illustrates a 45 degree projection on to a reference plane defined as being perpendicular to the road reference line once again. As FIG. 16D shows, the side depth map obtained using this projection includes more information regarding those surfaces of the objects that are perpendicular to the road element. By using a non-orthogonal projection, information about such perpendicular surfaces may be captured by the depth map data, but without needing to include additional data channels, or otherwise increase storage capacity. It will be appreciated that where such a non-orthogonal projection is used for the depth map data of the localisation reference data, then a corresponding projection should be used for real time sensed data to which it is to be compared.

Each pixel of the depth map data for the localisation reference data is based upon a group of sensed measurement, e.g. laser measurements. These measurements correspond to the sensor measurements indicative of a distance of an object from the reference plane along the relevant predetermined direction at the position of the pixel. Due to the way in which data is compressed, a group of sensor measurements will be mapped to a particular pixel. Rather than determine a depth value to be associated with the pixel that corresponds to an average of the different distances according to the group of sensor measurements, it has been found that greater accuracy may be obtained where the closest distance from among the distances corresponding to the various sensor measurements is used for the pixel depth value. It is important that the depth value of a pixel accurately reflects the distance from the reference plane to the closest surface of an object. This is of greatest interest when determining the position of a vehicle accurately, in a manner that will minimise risk of collision. If an average of a group of sensor measurements is used to provide the depth value for a pixel, there is a likelihood that the depth value will suggest a greater distance to an object surface than is in fact the case at the pixel position. This is because one object may transiently be located between the reference plane and another more distant object, e.g. a tree may be located in front of a building. In this situation, some sensor measurements used to provide a pixel depth value will relate to the building, and others to the tree, as a result of the area over which sensor measurements map to the pixel extending beyond the tree on a side or sides thereof. The Applicant has recognised that it is safest and most reliable to take the closest of the various sensor measurements as the depth value associated with the pixel in order to ensure that distance to the surface of the closest object is reliably captured, in this case the tree. Alternatively, a distribution of the sensor measurements for the pixel may be derived, and a closest mode taken to provide the pixel depth. This will provide a more reliable indication of depth for the pixel, in a similar manner to a closest distance.

As described above, the pixels of the depth map data for the localisation reference data include a depth channel, which includes data indicative of a depth from the position of the pixel in the reference plane to the surface of an object. One or more additional pixel channels may be included in the localisation reference data. This will result in a multi-channel or layer depth map, and hence raster image. In some preferred embodiments a second channel includes data indicative of a laser reflectivity of the object at the position of the pixel, and a third channel includes data indicative of a radar reflectivity of the object at the pixel position.

Figure 17:
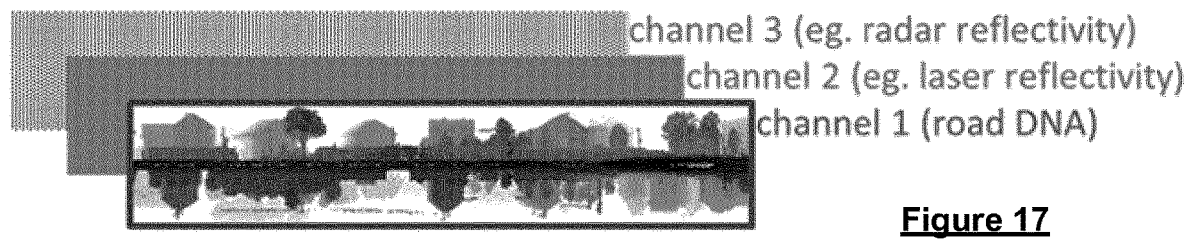
FIG. 17 shows a multi-channel data format for a depth map.

Each pixel has a position corresponding to a particular distance along the road reference line (x-direction), and a height above the road reference line (y-direction). The depth value associated with the pixel in a first channel $c_1$ is indicative of the distance of the pixel in the reference plane along a predetermined direction (which may be orthogonal or non-orthogonal to the reference plane depending upon the projection used) to the surface of a closest object (preferably corresponding to the closest distance of a group of sensed measurements used to obtain the pixel depth value). Each pixel may, in a second channel $c_2$, have a laser reflectivity value indicative of a mean local reflectivity of laser points at around the distance $c_1$ from the reference plane. In a third channel $c_3$, the pixel may have a radar reflectivity value indicative of a mean local reflectivity of radar points at around $c_1$ distance from the reference plane. This is shown, for example, in FIG. 17. The multi-channel format allows a significantly greater amount of data to be included in the depth map. Further possible channels that may be used are an object thickness, (which may be used to restore information about surfaces perpendicular to the road trajectory where an orthogonal projection is used), reflected point density, and colour and/or texture (e.g. obtained from a camera used in providing the reference scan data).

Although the invention has been described in relation to embodiments in which the depth map of the localisation reference data relates to the environment to the lateral sides of a road, it has been realised that the use of a depth map of a different configuration may be useful to assist in positioning a vehicle at a cross-roads. These further embodiments may be used in conjunction with the side depth maps for regions away from the cross-roads.

In some further embodiments, a reference line is defined in the form of a circle. In other words, the reference line is non-linear. The circle is defined by a given radius centred on a centre of a cross-roads of the digital map. The radius of the circle may be selected depending upon the side of the cross-roads. The reference plane may be defined as a 2 dimensional surface perpendicular to this reference line. A (circular) depth map may then be defined, in which each pixel includes a channel indicative of a distance from the position of the pixel in the reference plane to the surface of an object i.e. a depth value, along a predetermined direction in the same manner as when a linear reference line is used. The projection onto the reference plane may similarly be orthogonal, or non-orthogonal, and each pixel may have multiple channels. The depth value of a given pixel is preferably based upon a closest sensed distance to an object.

Figure 18:
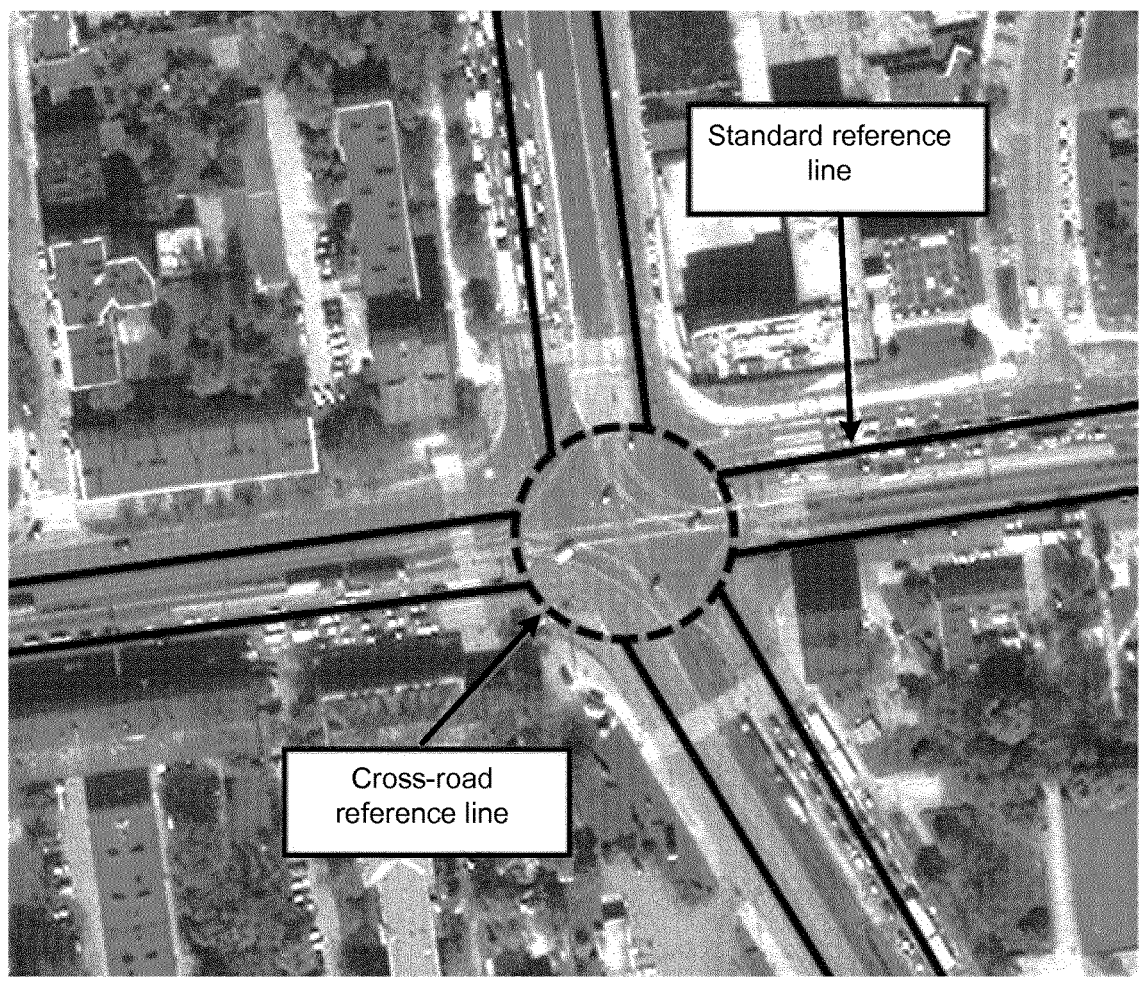
FIG. 18 shows circular and linear reference lines which may be used in constructing depth maps at cross-roads.

FIG. 18 indicates circular and linear reference lines which may be used in constructing depth maps at a cross-roads, and away from the cross-roads respectively. FIG. 19A illustrates the way in which objects may be projected on to the circular depth map at different angular positions. FIG. 19B indicates the projection of each of the objects on to the reference plane to provide the depth map, using an orthogonal projection.

The way in which a depth map of the localisation reference data, whether circular or otherwise, may be compared to real time sensor data obtained from a vehicle in order to determine a longitudinal alignment offset between the reference and real time sensed data has been described. In some further embodiments a lateral alignment offset is also obtained. This involves a series of steps which may be performed in the image domain.

Referring to an example using side depth maps, in a first step of the process, a longitudinal alignment offset between the reference and real time sensor data based side depth maps is determined, in the manner previously described. The depth maps are shifted relative to one another until they are longitudinally aligned. Next the reference depth map i.e. raster image is cropped so as to correspond in size to the depth map based upon real time sensor data. The depth values of pixels in the corresponding positions of the thus aligned reference and real time sensor based side depth maps i.e. the value of the depth channel of the pixels, is then compared. The difference in the depth values of each corresponding pair of pixels indicates the lateral offset of the pixels. This may be assessed by consideration of the colour difference of the pixels, where the depth value of each pixel is represented by a colour. The most common lateral offset thus determined between corresponding pairs of pixels (the mode difference), is determined, and taken to correspond to the lateral alignment offset of the two depth maps. The most common lateral offset may be obtained using a histogram of the depth differences between pixels. Once the lateral offset has been determined, it may be used to correct a deemed lateral position of the vehicle on the road.

FIG. 20A illustrates a reference depth map, i.e. image, and a corresponding depth map or image based on real time sensor data from a vehicle that may be compared to determine a lateral offset alignment of the depth maps. As FIG. 20B illustrates, first the images are shifted relative to one another to longitudinally align them. Next, after cropping of the reference image, a histogram of the difference in pixel depth value for corresponding pixels in the two depth maps is used to determine the lateral alignment offset between the depth maps—FIG. 20C. FIG. 20D illustrates how this may enable the longitudinal position, and then the lateral position of the vehicle on the road to be corrected.

Once a lateral alignment offset between reference and real time data based depth maps has been obtained, the heading of a vehicle may also be corrected. It has been found that where there is an offset between the actual and deemed headings of a vehicle, this will results in a non-constant lateral alignment offset being determined between corresponding pixels in the reference and real time sensed data based depth maps as a function of longitudinal distance along the depth map.

Figure 21A:
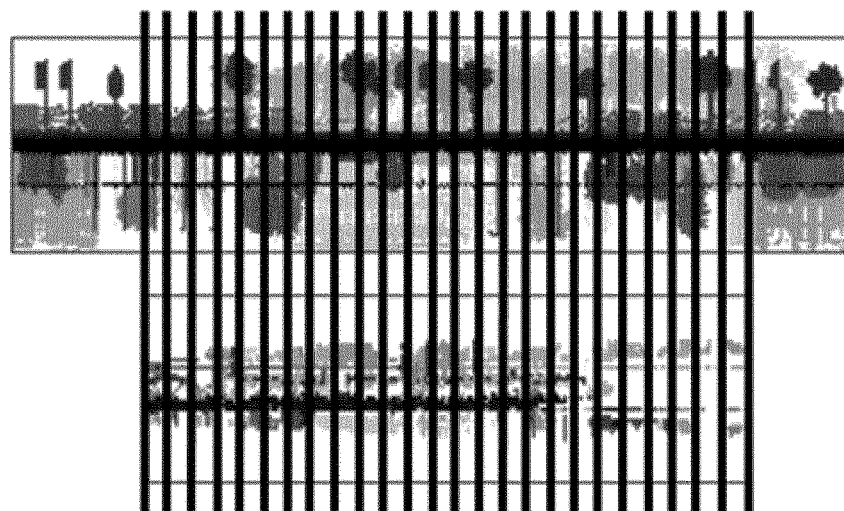
FIG. 21A shows a set of vertical slices through corresponding portions of a reference depth map.
Figure 21B:
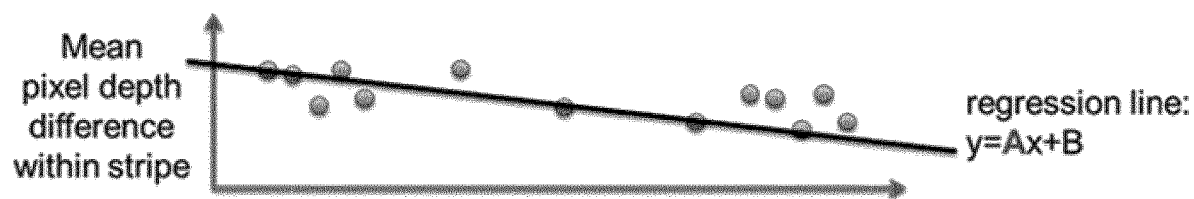
FIG. 21B shows mean pixel depth differences for the vertical slices plotted with respect to longitudinal distance of the vertical slice along the depth map.

FIG. 21A illustrates a set of vertical slices through corresponding portions of a reference depth map image (upper), and real time sensor based depth map image (lower). The mean difference in pixel depth value for the corresponding pixels in each slice (i.e. the lateral alignment offset), is plotted (y axis) with respect to longitudinal distance along the map/image (x axis). Such a plot is shown in FIG. 21B. A function describing the relationship between the mean pixel depth distance and longitudinal distance along the depth map may then be derived by suitable regression analysis. The gradient of this function is indicative of the heading offset of the vehicle.

Figure 22:
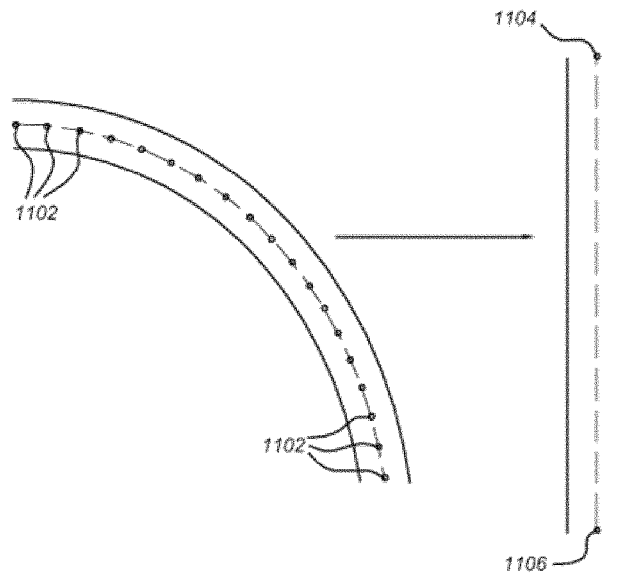
FIG. 22 shows an image of a curved road and a corresponding linearly referenced image for the road.

The depth maps used in embodiments of the present invention may be transformed so as to always be relative to a straight reference line, i.e. so as to be linearly referenced images, e.g. as described in WO 2009/045096 A1. This has an advantage as shown in FIG. 22. At the left side of FIG. 22 is an image of a curved road. To mark the centreline of the curved road, a number of marks 1102 have to be placed. At the right hand side of FIG. 22, a corresponding linearly referenced image is shown corresponding to the curved road in the left side of the drawing. To obtain the linearly referenced image, the centreline of the curved road is mapped to the straight reference line of the linearly referenced image. In view of this transformation, the reference line can now be defined simply by two end points 1104 and 1106.

Figure 23B:
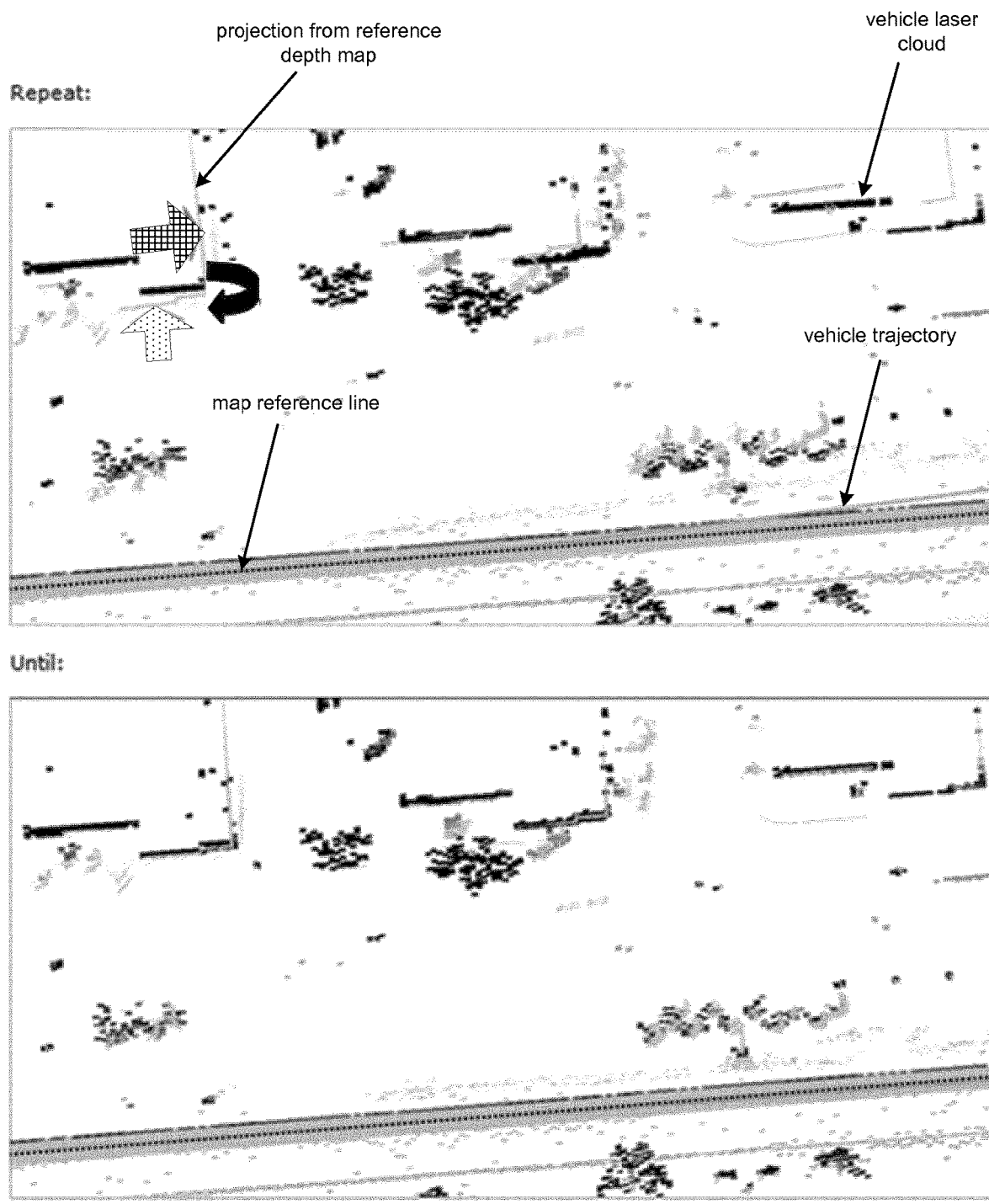

While on perfectly straight roads, the shift calculated from the comparison of the reference and real-time depth maps can be directly applied, the same is not possible on curved roads due to the non-linear nature of the linearisation procedure used to produce the linearly referenced images. FIGS. 23A and 23B show a computationally efficient method for establishing the position of the vehicle in a non-linear environment through a series of incremental independent linear update steps. As is shown in FIG. 23A, the method involves applying a longitudinal correction, then a lateral correction and then a heading correction in a series of incremental, independent linear update steps. In particular, in step (1) a longitudinal offset is determined using vehicle sensor data and a reference depth map that is based on the current deemed position of the vehicle relative to a digital map (e.g. obtained using GPS). The longitudinal offset is then applied to adjust the deemed position of the vehicle relative to a digital map and the reference depth map is recomputed based on the adjusted position. Then, in step (2), a lateral offset is determined using the vehicle sensor data and the recomputed reference depth map. The lateral offset is then applied to further adjust the deemed position of the vehicle relative to the digital map and the reference depth map is again recomputed based on the adjusted position. Finally, at step (3), a heading offset or skew is determined using the vehicle sensor data and the recomputed reference depth map. The heading offset is then applied to further adjust the deemed position of the vehicle relative to the digital map and the reference depth map is again recomputed based on the adjusted position. These steps are repeated as many times as is needed for there to be substantially zero longitudinal, lateral and heading offset between the real time depth map and the reference depth map. FIG. 23B shows the sequential and repeated application of a longitudinal, lateral and heading offsets to a point cloud generated from vehicle sensor data until that point cloud substantially aligns with a point cloud generated from the reference depth map.

A series of exemplary use cases for localisation reference data are also depicted.

For example, rather than using a depth map of the localisation reference data for the purposes of comparison to a depth map based on real time sensor data, in some embodiments, the depth map of the localisation reference data is used to generate a reference point cloud, including a set of data points in a three dimensional coordinate system, each point representing a surface of an object in the environment. This reference point cloud may be compared to a corresponding three dimensional point cloud based upon real time sensor data obtained by vehicle sensors. The comparison may be used to determine an alignment offset between the depth maps, and hence to adjust the determined position of the vehicle.

The reference depth map may be used to obtain a reference 3D point cloud that may be compared to a corresponding point cloud based upon real-time sensor data of a vehicle, whatever type of sensors that vehicle has. While the reference data may be based upon sensor data obtained from various types of sensor, including laser scanners, radar scanners, and cameras, a vehicle may not have a corresponding set of sensors. A 3D reference point cloud may be constructed from the reference depth map that may be compared to a 3D point cloud obtained based on the particular type of real time sensor data available for a vehicle.

For example, where the depth map of the reference localisation data includes a channel indicative of radar reflectivity, this may be taken into account in generating a reference point cloud that may be compared to 3D point cloud obtained using real time sensor data of a vehicle which has only a radar sensor. The radar reflectivity data associated with pixels helps to identify those data points which should be included in the 3D reference point cloud, i.e. which represent surfaces of objects that the vehicle radar sensor would be expected to detect.

In another example, the vehicle may have only a camera or cameras for providing real time sensor data. In this case, data from a laser reflectivity channel of the reference depth map may be used to construct a 3D reference point cloud including data points relating only to surfaces that may be expected to be detected by the camera(s) of the vehicle under current conditions. For example, when it is dark, only relatively reflective objects should be included.

A 3D point cloud based upon real time sensed data of a vehicle may be obtained as desired. Where the vehicle includes only a single camera as a sensor, a "structure from motion" technique may be used, in which a sequence of images from the camera are used to reconstruct a 3D scene, from which a 3D point cloud may be obtained. Where the vehicle includes stereo cameras, a 3D scene may be generated directly, and used to provide the 3-dimensional point cloud. This may be achieved using a disparity based 3D model.

In yet other embodiments, rather than comparing the reference point cloud to the real time sensor data point cloud, the reference point cloud is used to reconstruct an image that would be expected to be seen by a camera or cameras of the vehicle. The images may then be compared, and used to determine an alignment offset between the images, which in turn, may be used to correct a deemed position of the vehicle.

In these embodiments, additional channels of the reference depth map may be used as described above to reconstruct an image based on including only those points in the 3-dimensional reference point cloud that would be expected to be detected by the camera(s) of the vehicle. For example, in the dark, the laser reflectivity channel may be used to select those points for inclusion in the 3-dimensional point cloud that correspond to the surfaces of objects that could be detected by the camera(s) in the dark. It has been found that the use of a non-orthogonal projection on to the reference plane when determining the reference depth map is particularly useful in this context, preserving more information about surfaces of objects which may still be detectable in the dark.

Figure 24:
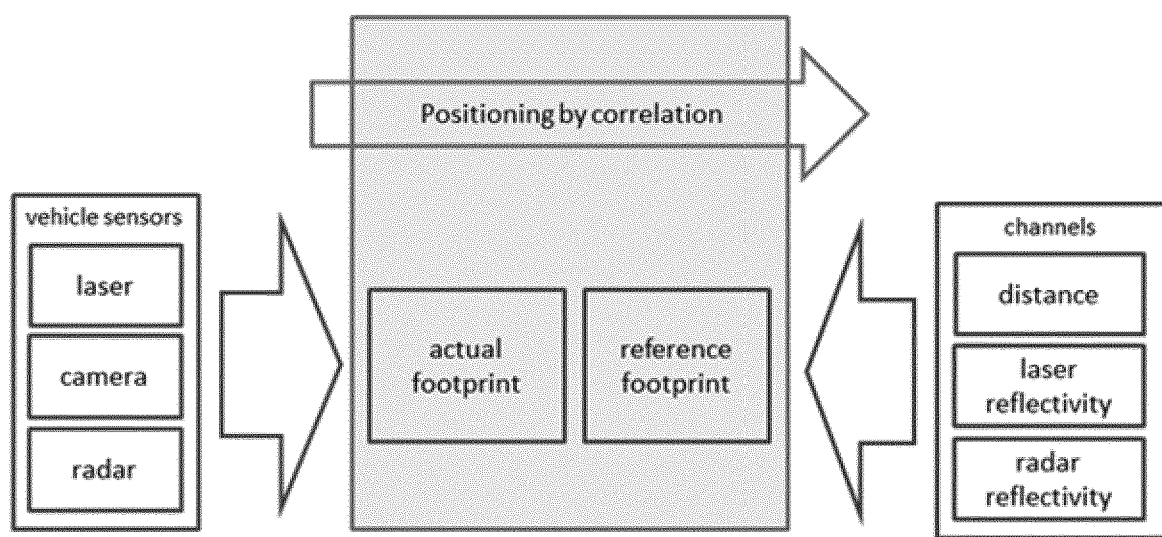
FIG. 24 shows an exemplary system in which data vehicle sensors is correlated with reference data to localise the vehicle relative to a digital map.

FIG. 24 depicts an exemplary system in accordance with embodiments of the invention in which data collected by one or more vehicle sensors: laser; camera; and radar, is used to generate an "actual footprint" of the environment as seen by the vehicle. The "actual footprint" is compared, i.e. correlated, to a corresponding "reference footprint" that is determined from reference data associated with a digital map, wherein the reference data includes at least a distance channel, and may include a laser reflectivity channel and/or a radar reflectivity channel, as is discussed above. Through this correlation, the position of the vehicle can be accurately determined relative to the digital map.

Figure 25A:
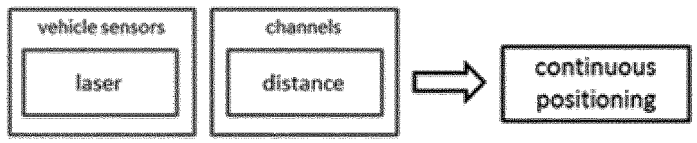
FIGS. 25A, 25B and 25C show a first example use case in which a reference depth map is used to construct a 3D point cloud that is then compared to a 3D point cloud obtained from vehicle laser sensors.
Figure 25B:
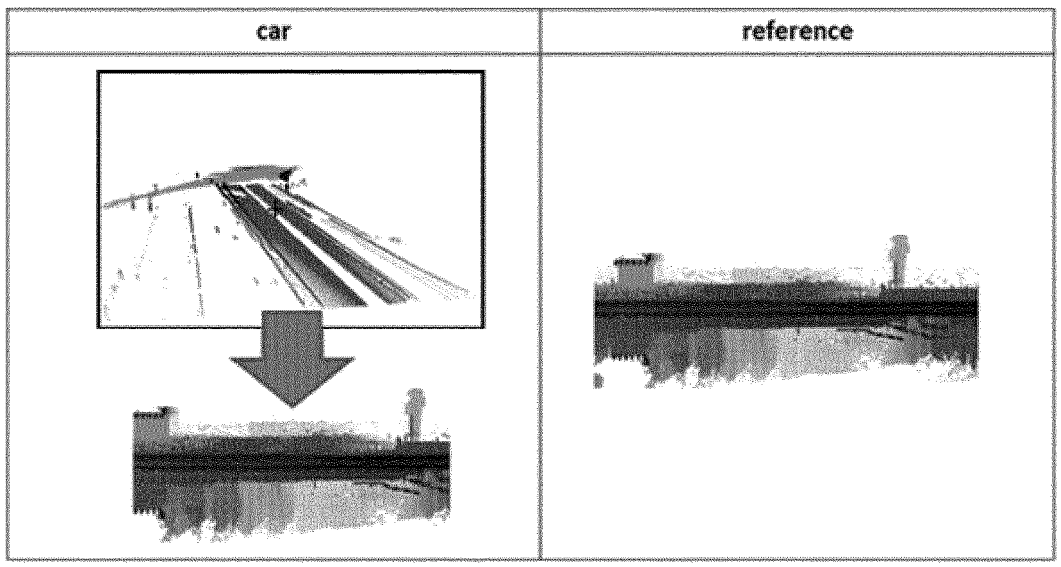
Figure 25C:
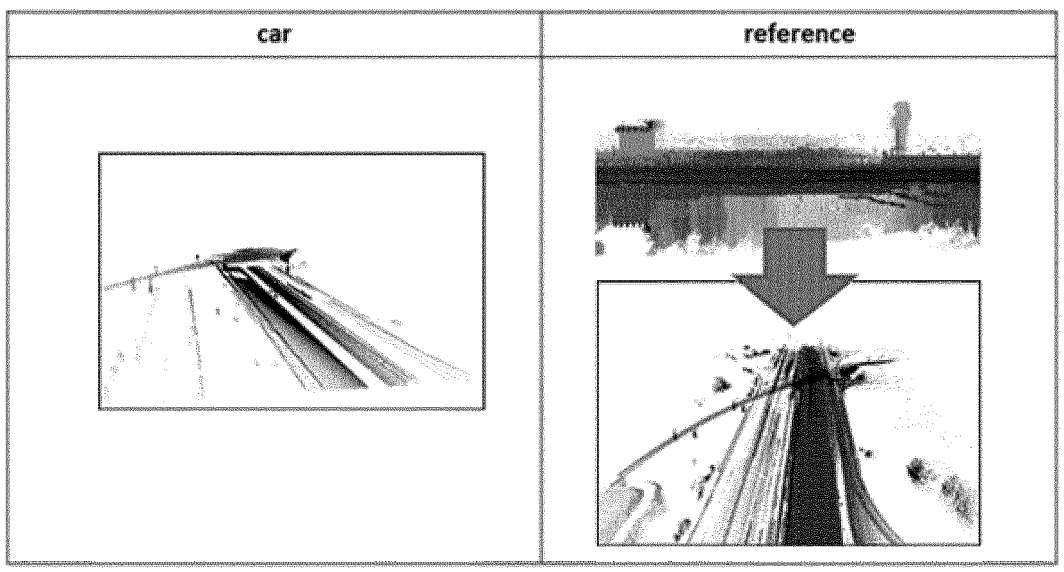

In a first example use case, as depicted in FIG. 25A, an actual footprint is determined from a laser-based range sensor, e.g. LIDAR sensor, in the vehicle and correlated to a reference footprint determined from data in the distance channel of the reference data, so as to achieve continuous positioning of the vehicle. A first approach is shown in FIG. 25B in which the laser point cloud as determined by the laser-based range sensor is converted into a depth map of the same format as the reference data, and the two depth map images are compared. A second, alternative approach is shown in FIG. 25C in which a laser point cloud is reconstructed from the reference data, and this reconstructed point cloud compared to the laser point cloud as seen by the vehicle.

Figure 26D:
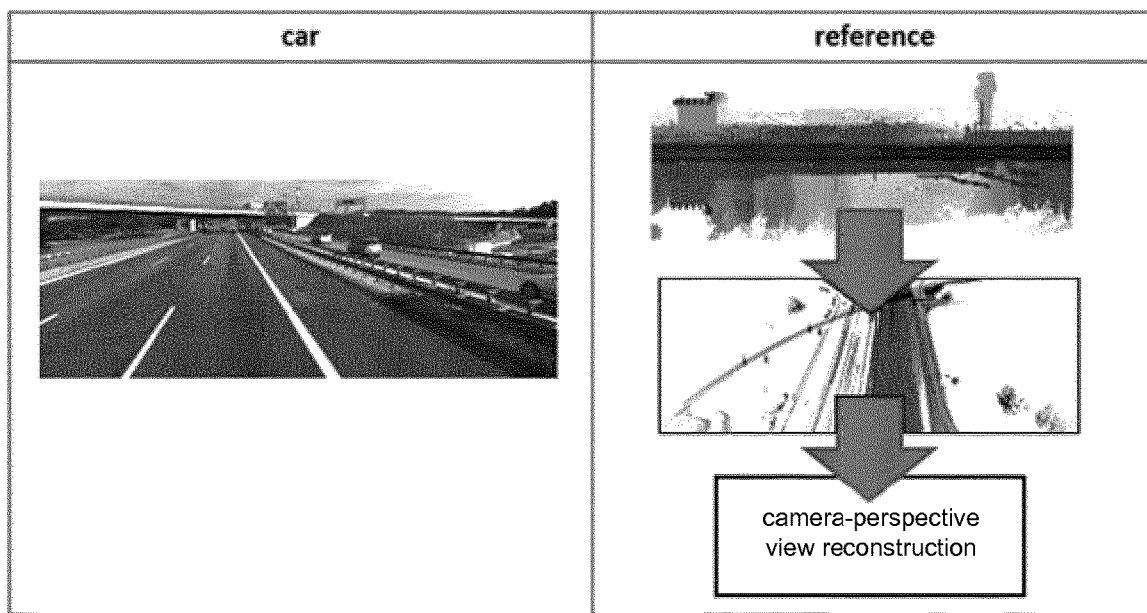

In a second example use case, as depicted in FIG. 26A, an actual footprint is determined from a camera in the vehicle and correlated to a reference footprint determined from data in the distance channel of the reference data, so as to achieve continuous positioning of the vehicle, although only during the day. In other words, in this example use case a reference depth map is used to construct a 3D point cloud or view that is then compared to a 3D scene or view obtained from multiple vehicle cameras or a single vehicle camera. A first approach is shown in FIG. 26B in which stereo vehicle cameras are used to build a disparity based 3D model, which is then used to construct a 3D point cloud for correlation with the 3D point cloud constructed from the reference depth map. A second approach is shown in FIG. 26C in which a sequence of vehicle camera images is used to construct a 3D scene, which is then used to construct a 3D point cloud for correlation with the 3D point cloud constructed from the reference depth map. Finally, a third approach is shown in FIG. 25D in which a vehicle camera image is compared with a view created from the 3D point cloud constructed from the reference depth map.

In a third example use case, as depicted in FIG. 27A, is a modification to the second example use case wherein laser reflectivity data of the reference data, which is in a channel of the depth map, can be used to construct a 3D point cloud or view that may be compared to a 3D point cloud or view based on images captured by one or more cameras. A first approach is shown in FIG. 27B, wherein a sequence of vehicle camera images is used to construct a 3D scene, which is then used to construct a 3D point cloud for correlation with the 3D point cloud constructed from the reference depth map (using both the distance and laser reflectivity channels). A second approach is shown in FIG. 27C in which a vehicle camera image is compared with a view created from the 3D point cloud constructed from the reference depth map (again using both the distance and laser reflectivity channels).

Figure 28A:
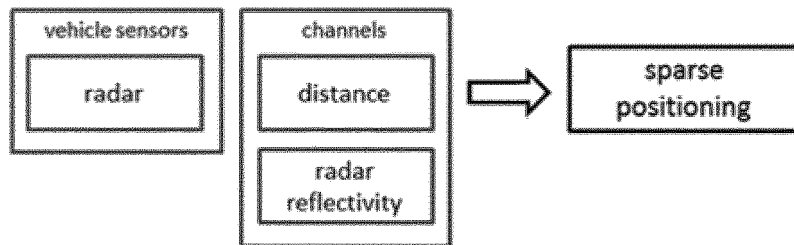
FIGS. 28A and 28B show a fourth example use case in which radar data of a depth map is used to construct a 3D point cloud that is then compared to a 3D scene obtained using vehicle radar.
Figure 28B:
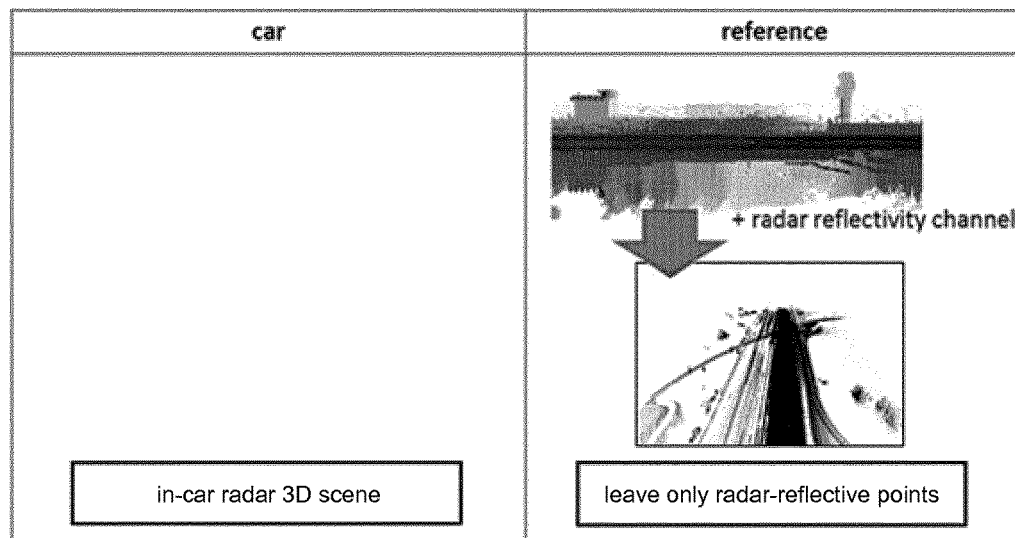

In a fourth example use case, as depicted in FIG. 28A, an actual footprint is determined from a radar-based range sensor in the vehicle and correlated to a reference footprint determined from data in the distance and radar reflectivity channels of the reference data, so as to achieve sparse positioning of the vehicle. A first approach is shown in FIG. 28B, wherein reference data is used to reconstruct a 3D scene and data in the radar reflectivity channel is used to leave only the radar-reflective points. This 3D scene is then correlated with the radar point cloud as seen by the car.

It will of course be understood that the various use cases could be used together, i.e. fused, to allow for a more precise localisation of the vehicle relative to the digital map.

Figure 29:
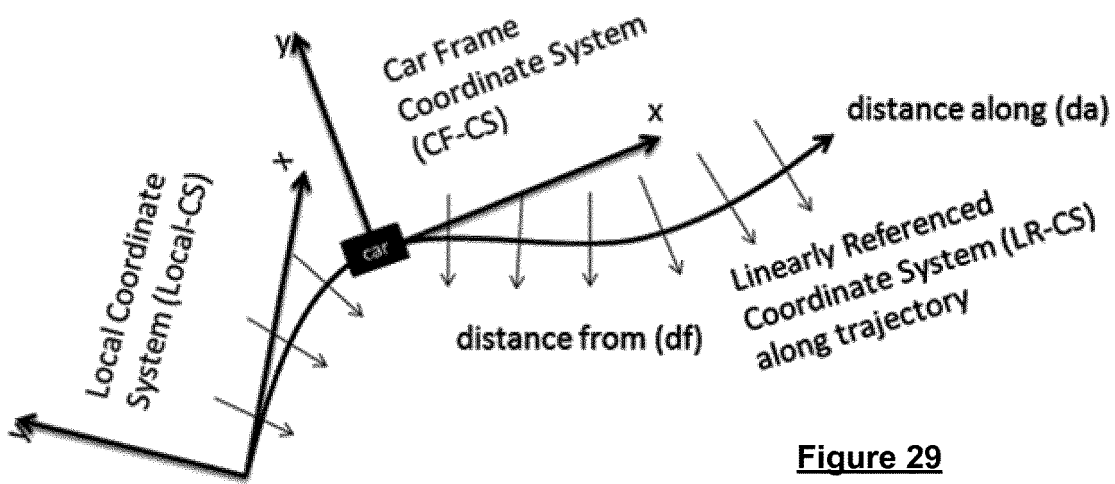
FIG. 29 shows different coordinate systems that are used in embodiments of the invention.
Figure 30:
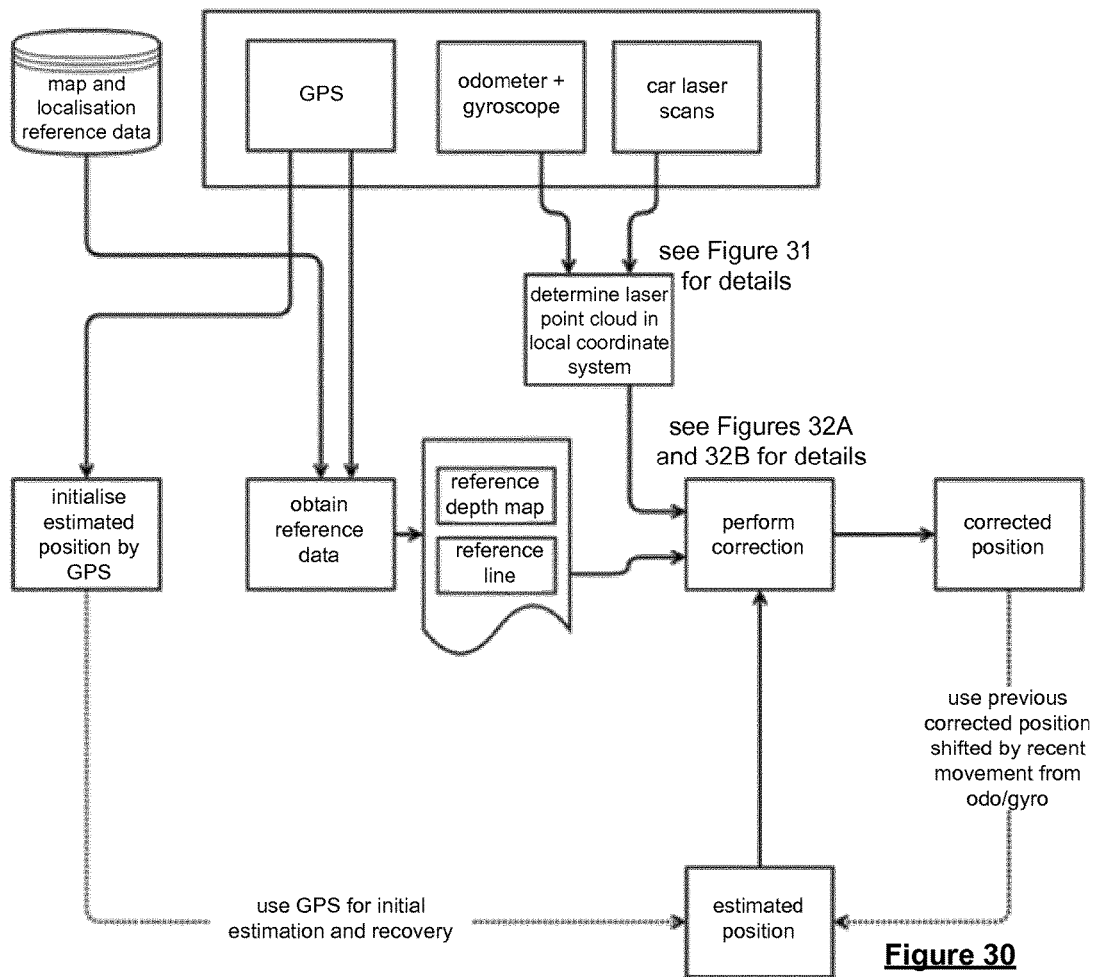
FIG. 30 depicts the steps performed when correlating vehicle sensor data to reference data in order to determine the position a vehicle.
Figure 31:
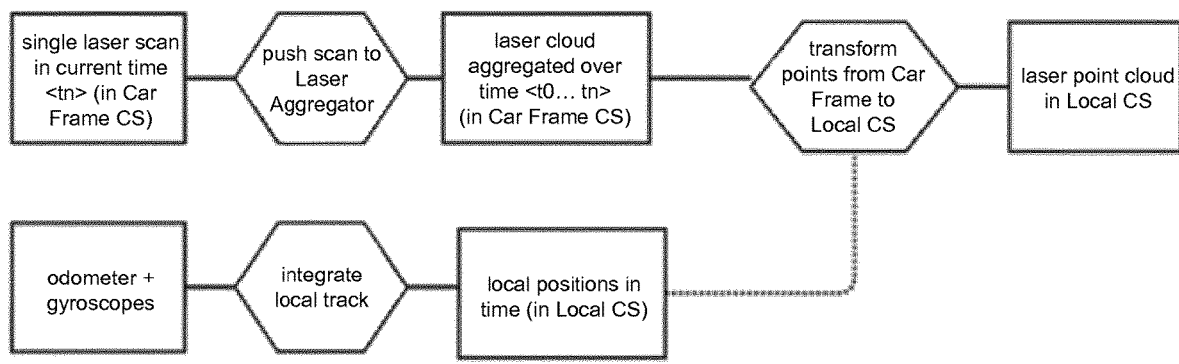
FIG. 31 illustrates the steps performed to determine the laser point cloud in the method of FIG. 30.

The method of correlating vehicle sensor data to reference data in order to determine the position of the vehicle, e.g. as discussed above, will now be described with reference to FIGS. 29 to 32B. FIG. 29 depicts the various coordinate systems that are used in method: the Local coordinate system (Local CS); the Car Frame coordinate system (CF CS); and the Linearly Referenced coordinate system (LR CS) along the trajectory of the car. Another coordinate system, although not depicted, is the World Geodetic System (WGS) in which positions are given as latitude, longitude coordinate pairs as known in the art. The general method is shown in FIG. 30, with details of the steps performed to determine the laser point cloud being shown in FIG. 31. FIG. 32A shows a first exemplary method to perform the correlation step of FIG. 30 in which the position of the vehicle is corrected by image correlation, e.g. between a depth map raster image of the reference data and a corresponding depth map raster image created from the vehicle sensor data. FIG. 32B shows a second exemplary method to perform the correlation step of FIG. 30 in which the position is of the vehicle is corrected by 3D correlation, e.g. between a 3D scene constructed from the reference data and the 3D scene captured by the vehicle sensors.

Any of the methods in accordance with the present invention may be implemented at least partially using software e.g. computer programs. The present invention thus also extends to a computer program comprising computer readable instructions executable to perform, or to cause a navigation device to perform, a method according to any of the aspects or embodiments of the invention. Thus, the invention encompasses a computer program product that, when executed by one or more processors, cause the one or more processors to generate suitable images (or other graphical information) for display on a display screen. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of determining a position of a vehicle relative to a digital map, the digital map comprising data representative of navigable elements of a navigable network along which the vehicle is travelling, the method comprising:
    obtaining localisation reference data associated with the digital map for a deemed current position of the vehicle along a navigable element of the navigable network, wherein the location reference data comprises at least one depth map comprising a plurality of pixels in an image format that are indicative of an environment around the vehicle projected on to a reference plane, the reference plane being defined by a reference line associated with the navigable element, each pixel of the at least one depth map being associated with a position in the reference plane associated with the navigable element along which the vehicle is travelling, and each pixel including a depth channel representing the distance to a surface of an object in the environment along a predetermined direction from the associated position of the pixel in the reference plane and position coordinates indicative of a position in a longitudinal direction along the navigable element and an elevation above ground;
    determining real time scan data by scanning the environment around the vehicle using at least one sensor, wherein the real time scan data comprises at least one depth map indicative of an environment around the vehicle, each pixel of the at least one depth map being associated with a position in the reference plane associated with the navigable element, and the pixel including a depth channel representing the distance to a surface of an object in the environment along the predetermined direction from the associated position of the pixel in the reference plane as determined using the at least one sensor and position coordinates indicative of a position in a longitudinal direction along the navigable element and an elevation above ground;
    determining a function indicative of a variation in a lateral alignment offset between corresponding pixels of the localisation reference and real time sensor data depth maps with respect to longitudinal position of the pixels along the depth maps; and
    using the determined function to adjust the deemed current heading of the vehicle to determine the heading of the vehicle relative to the digital map.

2. The method as claimed in claim 1, wherein the lateral alignment offset between corresponding pixels is based on the difference in the values indicated by the depth channel data of the pixels.

3. The method as claimed in claim 1, further comprising shifting the depth maps relative to one another to longitudinally align the depth maps.

4. A non-transitory computer readable medium comprising computer readable instructions executable to cause a system to perform a method as claimed in claim 1.

5. The method as claimed in claim 1, wherein the step of determining the function indicative of the variation in lateral alignment offset with longitudinal position comprises determining an average lateral alignment offset of corresponding pixels of the depth maps in each of a plurality of vertical sections through the depth maps along the longitudinal direction of the depth maps.

6. The method as claimed in claim 5, wherein the function is obtained based upon the variation in the average lateral alignment offset determined for each vertical section along the longitudinal direction of the depth maps.

7. The method as claimed in claim 1, further comprising determining a longitudinal alignment offset between the depth maps of the localisation reference data and the real time scan data by calculating a correlation between the localisation reference data and the real time scan data.

8. The method as claimed in claim 7, further comprising using the determined longitudinal alignment offset to adjust the deemed current position to determine the position of the vehicle relative to the digital map.

9. The method as claimed in claim 1, further comprising determining a lateral alignment offset between the depth maps, wherein the lateral offset is based on a most common lateral offset between corresponding pixels of the depth maps.

10. The method as claimed in claim 9, further comprising using the determined lateral alignment offset to adjust the deemed current position to determine the position of the vehicle relative to the digital map.

11. The method as claimed in claim 1, wherein:
    (i) a longitudinal alignment offset between the depth maps of the localisation reference data and the real time scan data is determined;
    (ii) then the determined longitudinal offset is used to adjust the deemed current position to determine an adjusted current position of the vehicle relative to the digital map;
    (iii) then the at least one depth map of the localisation reference data is recomputed based on the adjusted current position;

(iv) then a lateral alignment offset between the recomputed depth map of the localisation reference data and the depth map of the real time scan data is determined;
(v) then the determined longitudinal offset is used to further adjust the adjusted current position to determine a further adjusted current position of the vehicle relative to the digital map;
(vi) then the at least one depth map of the localisation reference data is recomputed based on the further adjusted current position;
(vii) then a function indicative of a variation in a lateral alignment offset between corresponding pixels of the recomputed localisation reference depth map and the real time scan data depth map with respect to longitudinal position of the pixels along the depth maps is determined;
(viii) then the determined function is used to adjust the deemed current heading of the vehicle to determine the heading of the vehicle relative to the digital map; and
(ix) then the at least one depth map of the localisation reference data is recomputed based on the adjusted current heading.

12. The method as claimed in claim 11, wherein steps (i)-(ix) are repeated until there is substantially zero longitudinal alignment offset and/or substantially zero lateral alignment offset and/or substantially zero heading offset between the recomputed depth map of the localisation reference data and the depth map of the real time scan data.

13. A system for determining a position of a vehicle relative to a digital map, the digital map comprising data representative of navigable elements of a navigable network along which the vehicle is travelling, the system comprising processing circuitry configured to:
obtain localisation reference data associated with the digital map for a deemed current position of the vehicle along a navigable element of the navigable network, wherein the location reference data comprises at least one depth map comprising a plurality of pixels in an image format that are indicative of an environment around the vehicle projected on to a reference plane, the reference plane being defined by a reference line associated with the navigable element, each pixel of the at least one depth map being associated with a position in the reference plane associated with the navigable element along which the vehicle is travelling, and each pixel including a depth channel representing the distance to a surface of an object in the environment along a predetermined direction from the associated position of the pixel in the reference plane and position coordinates indicative of a position in a longitudinal direction along the navigable element and an elevation above ground;
determine real time scan data by scanning the environment around the vehicle using at least one sensor, wherein the real time scan data comprises at least one depth map indicative of an environment around the vehicle, each pixel of the at least one depth map being associated with a position in the reference plane associated with the navigable element, and the pixel including a depth channel representing the distance to a surface of an object in the environment along the predetermined direction from the associated position of the pixel in the reference plane as determined using the at least one sensor and position coordinates indicative of a position in a longitudinal direction along the navigable element and an elevation above ground;
determine a function indicative of a variation in a lateral alignment offset between corresponding pixels of the localisation reference and real time sensor data depth maps with respect to longitudinal position of the pixels along the depth maps; and
use the determined function to adjust the deemed current heading of the vehicle to determine the heading of the vehicle relative to the digital map.

14. A computer readable storage medium storing instructions that, when executed by one or more processors, cause the one or more processors to perform a method for determining a position of a vehicle relative to a digital map, the digital map comprising data representative of navigable elements of a navigable network along which the vehicle is travelling, the method comprising:
obtaining localisation reference data associated with the digital map for a deemed current position of the vehicle along a navigable element of the navigable network, wherein the location reference data comprises at least one depth map comprising a plurality of pixels in an image format that are indicative of an environment around the vehicle projected on to a reference plane, the reference plane being defined by a reference line associated with the navigable element, each pixel of the at least one depth map being associated with a position in the reference plane associated with the navigable element along which the vehicle is travelling, and each pixel including a depth channel representing the distance to a surface of an object in the environment along a predetermined direction from the associated position of the pixel in the reference plane and position coordinates indicative of a position in a longitudinal direction along the navigable element and an elevation above ground;
determining real time scan data by scanning the environment around the vehicle using at least one sensor, wherein the real time scan data comprises at least one depth map indicative of an environment around the vehicle, each pixel of the at least one depth map being associated with a position in the reference plane associated with the navigable element, and the pixel including a depth channel representing the distance to a surface of an object in the environment along the predetermined direction from the associated position of the pixel in the reference plane as determined using the at least one sensor and position coordinates indicative of a position in a longitudinal direction along the navigable element and an elevation above ground;
determining a function indicative of a variation in a lateral alignment offset between corresponding pixels of the localisation reference and real time sensor data depth maps with respect to longitudinal position of the pixels along the depth maps; and
using the determined function to adjust the deemed current heading of the vehicle to determine the heading of the vehicle relative to the digital map.

* * * * *